(12) United States Patent
Purre et al.

(10) Patent No.: US 12,026,209 B2
(45) Date of Patent: Jul. 2, 2024

(54) SYSTEMS AND METHODS FOR SMART CAPTURE TO PROVIDE INPUT AND ACTION SUGGESTIONS

(71) Applicant: SAMSUNG ELECTRONICS CO., LTD., Suwon-si (KR)

(72) Inventors: Naresh Purre, Karnataka (IN); Sriram Shashank, Karnataka (IN); Sri Lakshmi Punuru, Karnataka (IN); Barath Raj Kandur Raja, Karnataka (IN); Vanraj Vala, Karnataka (IN); Aayush Yadav, Karnataka (IN); Aditi Anil Kagane, Karnataka (IN); Sudeep Kumar Kodali, Karnataka (FJ); Rishabh Kumar, Karnataka (IN); Srinivasa Rao Siddi, Karnataka (IN); Manjunath Bhimappa Ujjinakoppa, Karnataka (IN); Mansoor Variyathapara Mohammed, Karnataka (IN); Hemant Tiwari, Karnataka (IN); Dwakara Bhamidipati Sreevatsa, Karnataka (IN); Ankita Bhardwaj, Karnataka (IN); Vipin Rao, Karnataka (IN); Likhith Amarvaj, Karnataka (IN); Vibhav Agarwal, Karnataka (IN); Yashwant Singh Saini, Karnataka (IN); Himanshu Arora, Karnataka (IN); Muthu Kumaran, Karnataka (IN); Seungseok Kang, Suwon-si (KR); Sanguk Jeon, Suwon-si (KR); Jaehoon Park, Suwon-si (KR); Pilsik Choi, Suwon-si (KR); Hojun Jaygarl, Suwon-si (KR); Shweta Ratanpura, Karnataka (IN); Mritunjai Chandra, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/961,315

(22) Filed: Oct. 6, 2022

(65) Prior Publication Data
US 2023/0103311 A1    Apr. 6, 2023

Related U.S. Application Data

(63) Continuation of application No. PCT/KR2022/011893, filed on Aug. 10, 2022.

(30) Foreign Application Priority Data

Aug. 18, 2021   (IN) .............................. 202141037550
Aug. 23, 2021   (IN) .............................. 202141018905
Apr. 23, 2022   (IN) .............................. 202141018905

(51) Int. Cl.
*G06F 16/00*         (2019.01)
*G06F 16/901*        (2019.01)
(Continued)

(52) U.S. Cl.
CPC ...... *G06F 16/9535* (2019.01); *G06F 16/9027* (2019.01); *G06F 16/9538* (2019.01); *G06N 5/022* (2013.01)

(58) Field of Classification Search
None
See application file for complete search history.

(56) References Cited

U.S. PATENT DOCUMENTS 9,703,541 B2   7/2017   Sharifi et al.
10,963,630 B1  3/2021   Sharifi et al.
(Continued)

OTHER PUBLICATIONS

Search Report dated Dec. 5, 2022 in International Patent Application No. PCT/KR2022/011893.
(Continued)

*Primary Examiner* — Anhtai V Tran
(74) *Attorney, Agent, or Firm* — Nixon & Vanderhye, P.C.

(57) ABSTRACT

Example systems and methods provide input suggestions to a user to improve user experience on user devices. The input suggestions can be fill information from another app on (Continued)

device to the present app being used by user, information for performing a search (without the user having to copy-paste data or entering the data manually), responses to a message/notification received by the user, information/content/data to be shared between apps (without switching between apps), and emojis/GIFs that can be used by the user. The method includes analyzing one or more content of one or more screen displayed on device, generating at least one of a logical tree structure and a data mashup model of the one or more analyzed content for each screen, and providing a recommendation to a user. The recommendation can be a connected action or an input suggestion.

13 Claims, 74 Drawing Sheets

(51) Int. Cl.
*G06F 16/9535* (2019.01)
*G06F 16/9538* (2019.01)
*G06N 5/022* (2023.01)

(56) References Cited

U.S. PATENT DOCUMENTS

| | | | |
|---|---|---|---|
| 2011/0282888 | A1 | 11/2011 | Koperski et al. |
| 2015/0143435 | A1 | 5/2015 | Kim et al. |
| 2016/0048500 | A1 | 2/2016 | Hebert |
| 2016/0335316 | A1* | 11/2016 | Riva ............... G06F 16/285 |
| 2017/0357716 | A1* | 12/2017 | Bellegarda ........ G06F 16/345 |
| 2018/0039610 | A1 | 2/2018 | Litvak et al. |
| 2019/0188251 | A1* | 6/2019 | Liu ................. G06F 40/274 |
| 2019/0392035 | A1 | 12/2019 | Indenbom |
| 2020/0050637 | A1 | 2/2020 | Rajendran et al. |
| 2020/0117325 | A1 | 4/2020 | VanBlon et al. |
| 2021/0027203 | A1 | 1/2021 | Sharifi et al. |

OTHER PUBLICATIONS

Extended Search Report dated Mar. 11, 2024 in European Patent Application No. 22858665.7.
Examination Report dated Jan. 18, 2024 in Indian Patent Application No. 202141018905 and English-language translation.

* cited by examiner

Conversation Screen:
 · Derive-Package Name
 · Component Name
 · Message Text
 · Message Time
 · Message Type(sent/Received)
 · Conversation Title.
 · Sender(if received message)

Browser Article/blog:
 · Website URL
 · Article title
 · Highlights if available
 · Time
 · Keywords(TFIDF)/Nouns.

Media Playback Screen:
- Media Title
- Likes/Dislikes(if available)
- Rating
- Channel(in case of YouTube)
- No. of subscribers
- Language info(if available)
- Date/time Shopping app:
 · Package
 · Search field content
 · Browsed product info
   Name, Cost etc

SYSTEMS AND METHODS FOR SMART CAPTURE TO PROVIDE INPUT AND ACTION SUGGESTIONS

CROSS-REFERENCE TO RELATED APPLICATIONS

This application is a continuation application, claiming priority under § 365(c), of an International application No. PCT/KR2022/011893, filed on Aug. 10, 2022, which is based on and claims the benefit of an Indian Provisional Specification patent application number 202141037550, filed on Aug. 18, 2021, in the Indian Intellectual Property Office, of an Indian Provisional Specification patent application number 202141018905, filed on Aug. 23, 2021, in the Indian Intellectual Property Office, and of an Indian Complete Specification patent application number 202141018905, filed on Apr. 23, 2022, in the Indian Intellectual Property Office, the disclosure of each of which is incorporated by reference herein in its entirety.

BACKGROUND

Field

The disclosure relates to improving a user experience on user devices and, more particularly, to improving the user experience on user devices by providing input suggestions to the user, by connecting actions using the consolidation of content across the device.

Description of Related Art

Currently, a user can provide inputs using a keyboard (which can be a physical keyboard or a digital keyboard or virtual keyboard or the like) to various sources displayed on the user device. For example, the user of the user device can provide contact information such as a home address, phone number, email address, bank details, or the like for multiple applications including various pages/forms. Further, the user can experience difficulty in everyday situations like filling in data entry fields, searching for information, and responding. The user of the user device must copy and paste the contents or manually provide the data by referring to the contents received from other applications or pages received on the user device. The user must manually type and retype the same thing while searching or browsing across different related pages/forms included in the applications. Thus, it is difficult for the user to share relevant information or type the same information multiple times on the different pages/forms on the user device. Further, the users must constantly switch between the applications/pages/ forms to search and share the same set of information multiple times.

Further, page/forms/applications with different layouts and displays can make reviewing screen content to derive meaningful information quite challenging. In some cases, difficulties can arise from retrieving information from input fields in forms/pages that are specified to be non-editable. Text-based or view-based techniques may not work in cases where the screen includes mainly images. For example, on social media platforms, various fields such as text, images, and the like are not accessible and the contents cannot be captured, and thus it can be difficult to use such information for purposes such as Visual Question Answering (VQA) for Bixby® Commands, etc. Existing solutions, based on image analysis, use complex architectures.

Also, user devices receive multiple sources of information in the form of notifications, images, user-created data, and copied data. However, these multiple sources have not been consolidated to provide actions to permit users to accomplish tasks quickly. When multiple options are available (App, App Actions), no mechanism exists to provide the best possible option. Further, the user response has not been considered when providing the actions based on the previously chosen options.

The actions suggested in the existing methods are based on selected content only, and an action suggestion model is trained on a remote server and pushed to device for predicting action. The suggestions in prior art are generated based on search records and whitelisting websites which does not provide dynamism in the actions. In the existing methods, the suggestions include only matching entities which are discoverable in the current screen and one entity-action which are mapped previously. Conventional systems talk about looking for other similar entities (restaurant name to other restaurant name). Also, conventional systems transmit the actions to a secondary device through sharing, but don't consider other device data to modify actions.

The issues present in the conventional mechanisms may include screenshot/image-based boundary extraction of screen content without any intelligence based on screen type. The existing methods are not suitable on the user device at runtime for continuously engaged screen content like an ongoing conversation. Inference time 3.98s on a central processing unit (CPU). The conventional systems can scale to only limited number of content types on the user device/server. Size of the model increases with the increase in number of classes on the server/user device.

Also, the drawbacks in image analysis-based approach classifies a view or content type, unable to understand relation between the content on the screen. Existing methods are not suitable on device at runtime for continuously engaged screen content like an ongoing conversation. In terms of field classification, the existing methods cannot classify the field type, and can only detect if the input field takes sensitive data. Average time for analysis per app is 5.7 secs suitable for offline analysis of layouts for the given application. Not feasible for commercialization.

The existing prior art takes input such as the Application screen/Response context (Layout shown on the screen) and provides output as Augmented Application Screen/Response Context (Interact-able Hyperlinks). The conventional systems perform intent association, analyze all available/accessible contextual inputs, including named entities (songs, movies etc.) and phrases (time/date, translated phrases). These conventional systems mainly analyze what is visible on the screen, for example named entities, text displayed on the screen but cannot provide structured interpretation of screen content Example: Conversation screen understanding: what are sent messages, what are received messages, which message is of high priority, which message should the user respond to, etc.

Other conventional systems take input as screen displayed on the device and provide output in the form of natural voice interaction on the user screen. These systems include a context orchestrator that analyses the screen (UI elements that are displayed on the screen) and builds knowledge graph. It includes understanding of text, images displayed on the screen, their position, relation between the content etc. The conventional systems do not provide structured interpretation of screen content which is visible on the screen. Example: Conversation screen understanding. Also, it cannot classify fields displayed on the screen. Example: there will be multiple input fields in various applications (Name, Bank account number, Address field, etc.). Without classifying these fields, input suggestions cannot be provided.

Another conventional system includes modeling personal entities on a mobile device using embedding which provides recommendations based on personal entity on the screen, talks about identifying personal entity on the screen and building/updating personal knowledge base. Further using personal entity modelling and personal knowledge base to provide recommendations, recommendation includes personalized assistance to a user: determine completions for input, identify clusters or groups of similar personal entities (Ex: sports groups), suggest advertisements, etc.

FIGS. 1, 2 and 3 are diagrams of conventional art depicting deep layout, screen recognition and architecture involved in suggesting the actions based on the analyzed contents on the screen, according to embodiments as disclosed herein.

In FIG. 1, a model is trained to predict a pixel-wise probability map and a simple post-processing procedure is utilized to generate final detection bounding boxes and their corresponding labels and confidence scores. The sequence of steps involved are pre-processing to downsample the image, inference through DNN, and post-processing for connected component analysis.

The issues in the FIG. 1 have screenshot/image-based classification of screen content. No intelligence based on-screen type. The method is not suitable on device at runtime for continuously engaged screen content like an ongoing conversation. Inference time requires 3.98s on CPU and can scale to an only limited number of content types. The size of the model increases with an increase in number of classes. Fragmentary text regions, Inseparable non-text regions, Poor results as number of classes increase.

As illustrated in FIG. 2, the Single Shot MultiBox Detector model based on MobileNetV120 MB model, 10 ms inference time Covers 13 classes—Checkbox (Selected), Checkbox (Unselected), Container, Dialog, Icon, Picture, Page Control, Segmented Control, Slider, Text, Text Field, Toggle (Selected), and Toggle (Unselected).

Issues arise from the conventional approach in FIG. 2, which is an image analysis-based approach intended to classify a view or a content type. The content cannot be interpreted to differentiate between Title and body, comments, labels etc. and relation between the content on screen cannot be understood. Method not suitable on the device at runtime for continuously engaged screen content like an ongoing conversation.

As illustrated in FIG. 3, a tool for offline analysis is based on layout files in an apk, detects if an input field takes sensitive user data, works based on keyword based dataset. The input to the module is apk files. The issues in this conventional approach may include that it cannot classify the field type or detects if the input field takes sensitive data. Therefore, average time for analysis per app is 5.7 secs, which is suitable for offline analysis of layouts for the given apk. Thus, it is not feasible for commercialization.

Thus, it is desired to address the above-mentioned disadvantages or other shortcomings or at least provide a useful alternative.

SUMMARY

Embodiments of the disclosure provide methods, systems, and a user device for smart capture to provide input and action suggestions.

Various example embodiments provide methods, a user device and systems for improving a user experience on user devices by providing input suggestions to a user, wherein the input suggestions can fetch information from the previously or recently accessed forms/pages/applications to the current form/page/application being used by the user. In an embodiment, the input suggestions are for performing a search, without the user having to copy-paste or manually provide the data to a message/notification received by the user. Also, information/content/data to be shared between various forms/pages/applications without switching between various media contents can be provided. Further, suggestions can be provided to the user by means of emojis/GIFs and the like that can be used by the user, and so on.

Various example embodiments provide methods, a user device and systems for providing connected actions by consolidation of content that the user device receives (e.g., notification, screen data, clipboard, text selected or the like), core app data (e.g., messages, notes, media, contact etc.), application activity (app actions/usage), device data, near-by device and user context through data-mashup.

Various example embodiments relate to methods and systems for improving the user experience on user devices by providing input suggestions to the user, wherein the input suggestions can be determined based on deep screen capture.

Various example embodiments provide that, after classifying related classes (e.g., Dates, contacts, accounts, etc.) by analyzing various sources such as messages, images, files, and notifications, an operation that can be linked (predicted to the user's next operation) is proposed to the user.

Various example embodiments identify duplicate data received from multiple sources like message, images, files, notification and construct single entry for connected actions.

Various example embodiments provide methods and systems for connecting actions using the consolidation of content across the device.

In an embodiment, a method for providing at least one recommendation includes collecting, by a user device, at least one data from a plurality of sources on the user device; feeding, by the user device, the collected data to a data mashup model; identifying, by the user device, a plurality of types of the data using the data mashup model; determining, by the user device, one or more relationships among the types the data using the data mashup model; predicting, by the user device, one or more possible actions to be performed by a user as an outcome of the determined relationships using the data mashup model and providing, by the user device, a suggestion to the user to pursue the one or more actions from the prediction.

In an embodiment, a method includes analyzing, by a user device, at least one content displayed on one or more screens of the user device; generating, by the user device, at least one logical tree structure from the analyzed at least one content; detecting, by the user device, relationship and co-references between the analyzed contents by resolving anaphors and antecedents based on at least one logical tree structure of the analyzed at least one content; detecting, by the user device, anaphors displayed on the screen of the user device; resolving, by the user device, the detected anaphors with antecedents on the screen; fetching, by the user device, candidate contents to be suggested from a knowledge base and providing, by the user device, a recommendation, the fetched contents for at least one input by the user of the user device.

In an embodiment, a method includes analyzing, by a user device, contents of one or more screens displayed on the user device; generating, by the user device, at least one logical tree structure of the analyzed contents for each screen; classifying, by the user device, interest portion of the screen from at least one logical tree structure; detecting and classifying, by the user device, at least one input field requiring user input in a screen displayed on the device; fetching, by the user device, candidate contents to fill the detected input field from the logical tree structure, based on the detected interest portion of the screen and providing, by the user device, a recommendation, the fetched contents for the input by the user.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
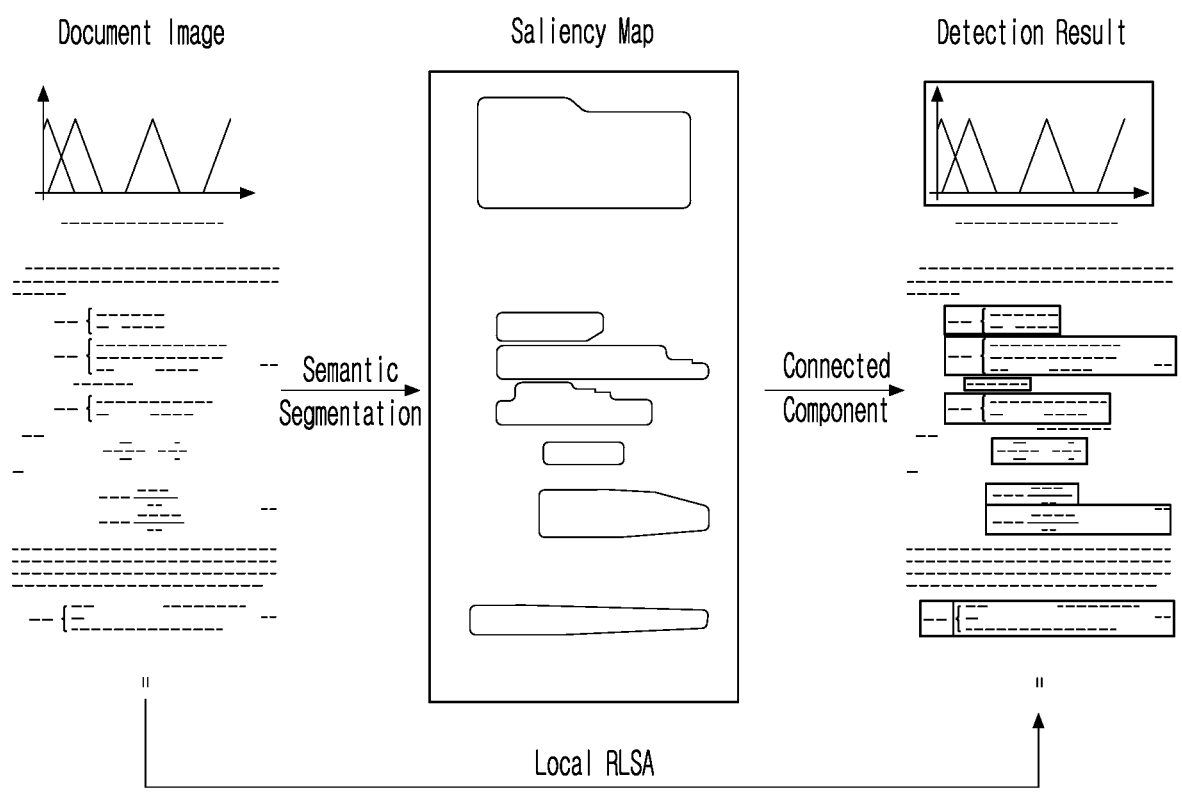
FIGS. 1, 2 and 3 are conventional art diagrams depicting deep layout, screen recognition and architecture involved in suggesting the actions based on the analyzed contents on the screen, according to prior art.
Figure 2:
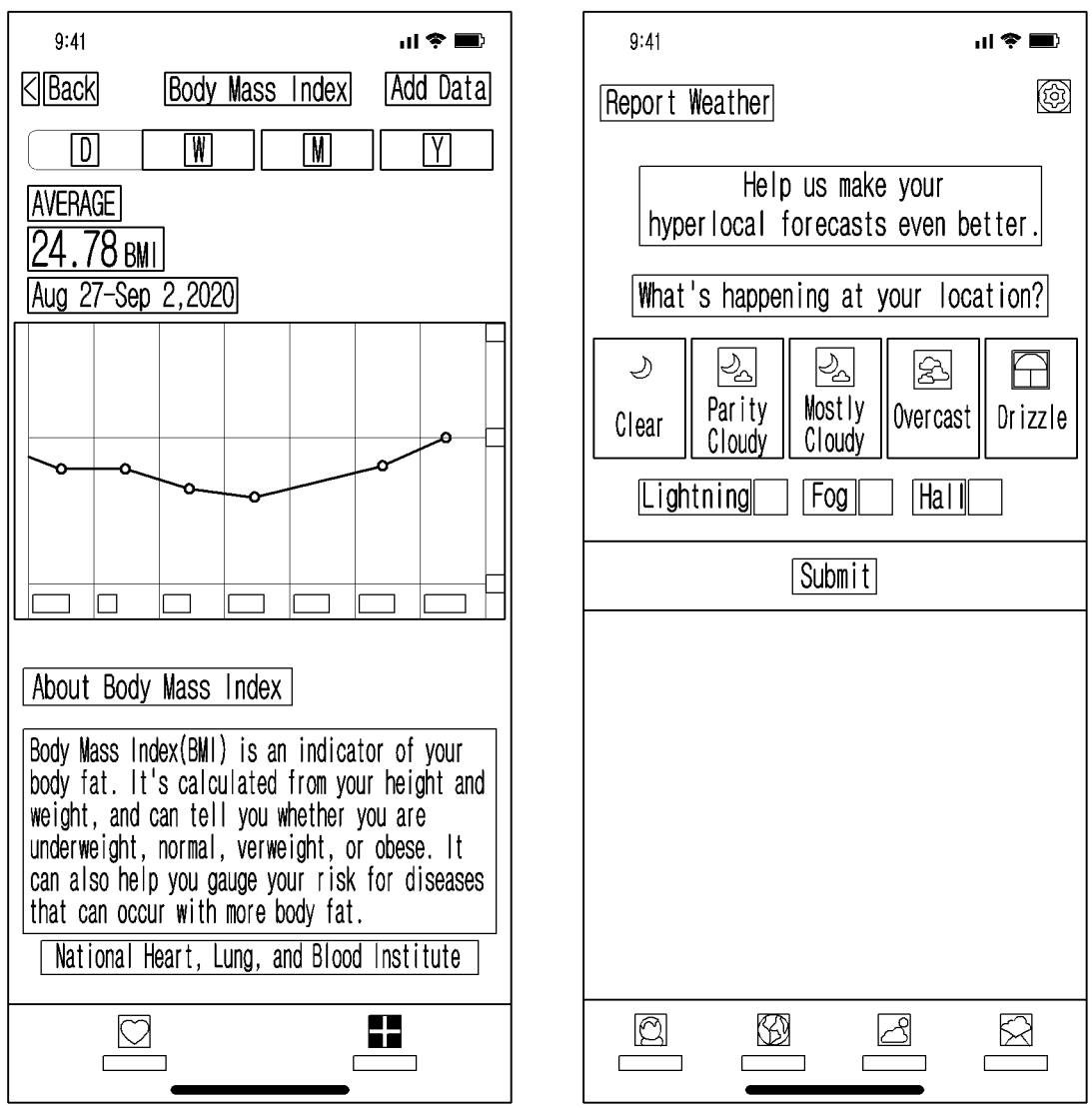
Figure 3:
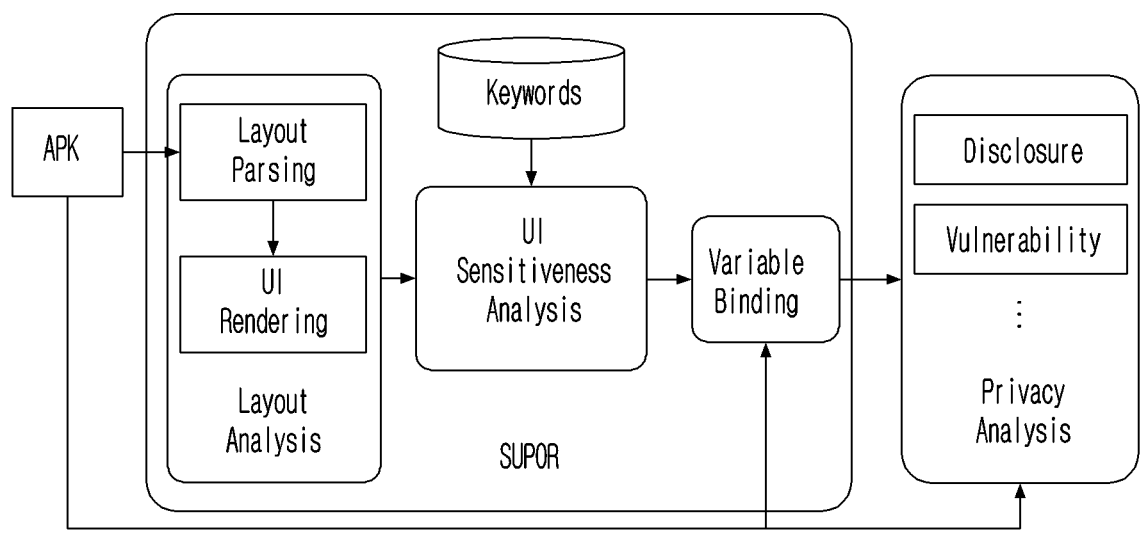

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The terms "user device" and "electronic device" are used interchangeably in the patent disclosure.

The various embodiments of the disclosure provide input suggestions or recommendations to a user to improve a user experience on user devices. Various example embodiments are described with reference to the drawings, and more particularly to FIGS. 1 through 46, in which similar reference characters denote corresponding features.

Various embodiments provide methods and systems for providing recommendations for output by a user device based on the analyzed contents on the screen of the user device. The contents can be captured from a plurality of sources displayed on the screen, wherein the plurality of sources may include, but are not limited to social media applications such as Whatsapp®, Facebook®, notification screen data, clipboard, text selection from the web browser, device data, nearby device, and user context. Various embodiments generate a logical tree structure of the analyzed contents for each application. Various embodiments can detect and classify one or more input fields requiring user input in an application currently being displayed on the user device. Various embodiments can automatically fetch from the logical tree structure candidate contents to be filled in the detected input fields. Therefore, the various embodiments can provide recommendations of the fetched contents for the input to the user.

The various embodiments can improve a user experience on user devices by providing input suggestions to the user, wherein the input suggestions can, for example, fill information from another app on the user device to a present app being used by the user, information for performing a search (without the user having to copy-paste data or entering the data manually), responses to a message/notification received by the user, information/content/data to be shared between apps (without switching between apps), emojis/GIFs that can be used by the user, and so on. Various embodiments provide methods and systems for improving a user experience on user devices by providing input suggestions to the user, wherein the input suggestions can be determined based on deep screen capture. The input suggestions can be based on information extracted from image/text/data/content. The input suggestions can be based on information from at least one previous screen accessed/view by the user. The input suggestions can be based on information from incoming messages. The input suggestions can be based on recently accessed content/data.

Figure 4:
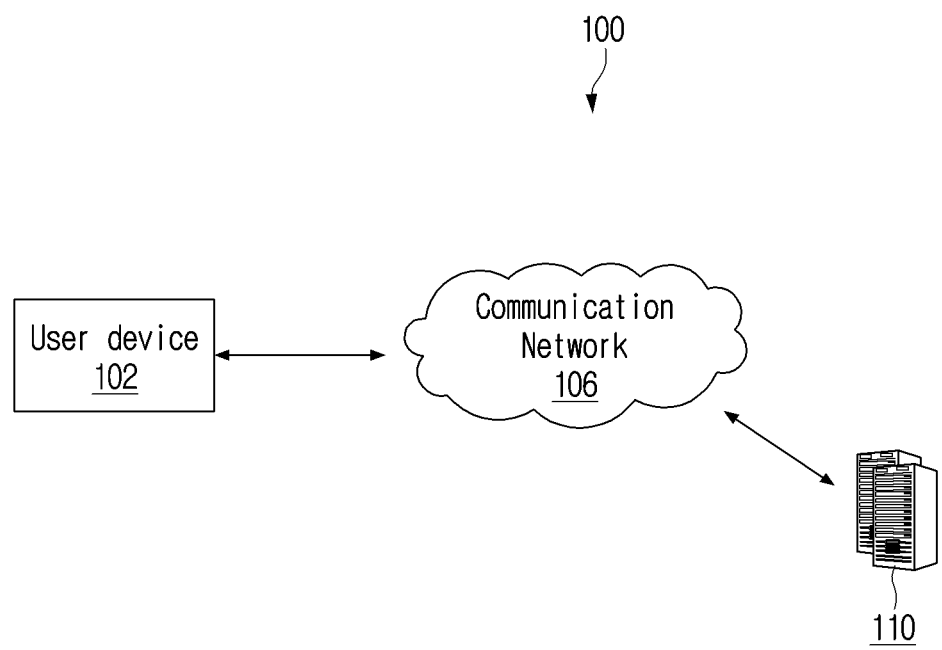
FIG. 4 illustrates an example environment for providing recommendations, according to various example embodiments.

FIG. 4 illustrates an example environment for providing recommendations, according to various embodiments. As illustrated in FIG. 4, environment 100 includes a user device 102 connected to a communication network 106 and a server 110. In an embodiment, the user device 102 may be connected to the server 110 through the communication network 106 and/or at least one other communication network (not shown). The user device 102 can be, for example, but is not limited to, a laptop computer, a desktop computer, a notebook computer, a Device-to-Device (D2D) device, a vehicle to everything (V2X) device, a smartphone, a foldable phone, a smart TV, a tablet computer, an immersive device, or an internet of things (IoT) device. The server 110 can be, for example, but is not limited to, a cloud server, an edge server or the like.

The communication network 106 may include at least one of, but is not limited to, a wired network, a value-added network, a wireless network, a satellite network, or a combination thereof. Examples of the wired network may include, but are not limited to, a Local Area Network (LAN), a Wide Area Network (WAN), an Ethernet, and so on. Examples of the wireless network include, but are not limited to, a cellular network, a wireless LAN (Wi-Fi), BLUETOOTH™, Bluetooth low energy, Zigbee, Wi-Fi Direct (WFD), Ultra-wideband (UWB), infrared data association (IrDA), near field communication (NFC), and so on. In an embodiment, the user device 102, and databases 212 may be connected with each other directly and/or indirectly (for example, via direct communication, via an access point, and so on). In an embodiment, the user device 102, and the databases may be connected with each other via a relay, a hub, and a gateway. User device 102 and the databases may be connected to each other in any of various manners (including those described above) and may be connected to each other in two or more of various manners (including those described above) at the same time.

The user device 102 may, for example, be a device that enables user(s) to analyze contents on the user device 102. The contents can, for example, be from various sources of the user device 102, which may include, but are not limited to, notifications, screen data, clipboard, text selection, core application data such as messages, notes, media, contact, application activity device data, nearby device and the like. The user device 102 can intelligently provide actions for a given input by constructing associated actions with reasoning by finding related received contents across the device.

The user device 102 can dynamically suggest future actions by considering a next set of actions/things performed by the user after consuming suggestions. The user device 102 can provide suggestions for in an application by finding related other application data and modify suggestions based on the important events occurring at that time. The suggestions are provided using contents of similar applications such as orders made, viewed content, activities done at location. Based on the proposed method, the connected actions are derived from one device's data to other connected device data based on the user context.

Figure 5:
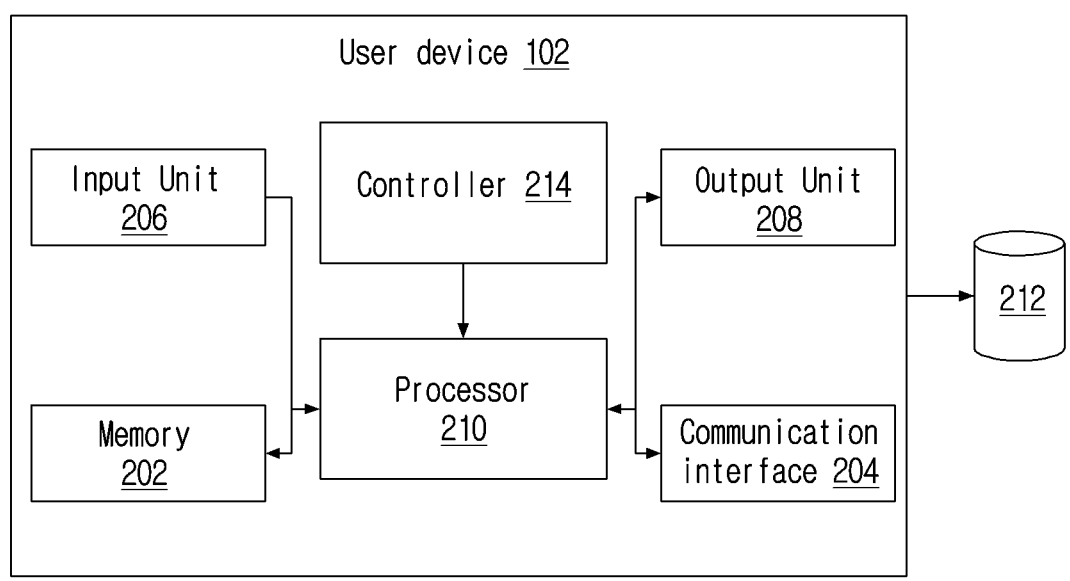
FIG. 5 is a block diagram of an example user device, to provide recommendations, according to various embodiments.

FIG. 5 is a block diagram illustrating various units of a user device, to provide recommendations, according to various embodiments. The user device 102 includes a memory 202, a communication interface 204 (e.g., including communication circuitry), an input unit 206 (e.g., including input circuitry), a processor 210 (e.g., including processing circuitry), an output unit 208 (e.g., including output circuitry), a database 212, and a controller (e.g., including control circuitry) 214.

The memory 202 may include, for example, at least one type of storage medium, from among a flash memory type storage medium, a hard disk type storage medium, a multimedia card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The memory 202 can store various sources displayed on a screen of the user device 102 which may include, but are not limited to, notification(s), screen data, media, social media application(s), contacts, clipboard(s), text selection(s), notes, media, device data, nearby device(s), and the like. The memory 202 can store an interest region of a user in performing various actions.

For example, if a user receives an email invitation, the invitation can be registered in a schedule. The registering of the invitation is an example of a "connected action". When a user receives a message to confirm a flight reservation, the flight reservation can be connected to a restaurant nearby a destination location. The connecting of the flight reservation to a restaurant is an example of a second connected action. When an address mentioned in the received message is linked to the map app, the address information of the message is linked.

After analysing and storing account information received by text message, if it is a text input that requires account information, a suggestion to enter a stored account may be provided [Input Suggestion]. For example, if a search for a movie is conducted on a particular social media platform and that social media platform does not include any reviews of the searched for movies, the search may be automatically conducted on another social media platform by linking to that platform. [Input Suggestion].

The memory 202 may also include a management module to manage contents for providing suggestions to the user. Embodiments herein may refer to a controller 214 and the management module interchangeably, wherein both the terms refer to the controller 214.

The memory 202 may also store a learning module 308 (see FIG. 7) of a neural network. The learning module 308 of the neural network can be processed by controller 214 to obtain the input from a capturing unit of the user device 102. The learning module 308 can be provided with a suggestion of the user's choice of consuming actions or inputs to the user device. The learning module can be continuously provided with the user's choice/decision on consuming contents.

Examples of the neural network, the recommendation module 312 may be, but are not limited to, an Artificial Intelligence (AI) model, a multi-class Support Vector Machine (SVM) model, a Convolutional Neural Network (CNN) model, a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression-based neural network, a deep reinforcement model (with ReLU activation), a deep Q-network, and so on. The neural network may include a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients. A topology of the layers of the neural network may vary based on the type of the respective network. In an example, the neural network may include an input layer, an output layer, and a hidden layer. The input layer receives a layer input and forwards the received layer input to the hidden layer. The hidden layer transforms the layer input received from the input layer into a representation, which may be used for generating the output in the output layer. The hidden layers extract useful/low-level features from the input, introduce non-linearity in the network and reduce a feature dimension to make the features equivalent to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The recommendation module 312 (see FIG. 7) may be trained using at least one learning method. Examples of the learning method may be, but are not limited to, supervised learning, unsupervised learning, semi-supervised learning, reinforcement learning, regression-based learning, and so on. The recommendation module 312 may be neural network models in which several layers, a sequence for processing the layers, and parameters related to each layer may be known and fixed for performing the intended functions. Examples of the parameters related to each layer may be, but are not limited to, activation functions, biases, input weights, output weights, and so on, related to the layers. A function associated with the learning method may be performed through the non-volatile memory, the volatile memory, and/or the controller 214. The controller 214 may include one or a plurality of processors. The one or a plurality of processors may, for example, be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

Here, being provided through learning means that, by applying the learning method to a plurality of learning data, a predefined operating rule, or the neural network, the recommendation module 312 of the desired characteristic is made. Functions of the neural network, recommendation module 312 may be performed in the user device 102 itself in which the learning according to an embodiment is performed, and/or maybe implemented through a separate server/system (e.g., server 110).

Returning to FIG. 5, the communication interface 204 (e.g., including communication circuitry) may include one or more components, which enable the user device 102 to communicate with another device (e.g., server 110) using communication methods supported by the communication network 106. The communication interface 204 may include the components such as a wired communicator, a short-range communicator, a mobile/wireless communicator, and a broadcasting receiver.

The wired communicator may enable the user device 102 to communicate with the other devices using communication methods such as, but not limited to, wired LAN, Ethernet, and so on. The short-range communicator may enable the user device 102 to communicate with the other devices using communication methods such as, but not limited to, Bluetooth low energy (BLE), near field communicator (NFC), WLAN (or Wi-fi), Zigbee, infrared data association (IrDA), Wi-Fi Direct (WFD), UWB communication, Ant+(interoperable wireless transfer capability) communication, shared wireless access protocol (SWAP), wireless broadband internet (Wibro), wireless gigabit alliance (WiGiG), and so on. The mobile communicator may transmit/receive wireless signals with at least one of a base station, an external terminal, or a server on a mobile communication network/cellular network. For example, the wireless signal may include a speech call signal, a video telephone call signal, or various types of data, according to transmitting/receiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 102 may or may not include the broadcasting receiver.

The input unit 206 (e.g., including input circuitry) may be configured to enable the user to interact with the user device 102. The input unit 206 may, for example, include a capturing unit configured to capture media contents such as notification(s), messages, clipboard contents, notes, contacts, device data and the like received by the user device 102. The capturing unit/input unit referred to herein can be any kind of device used to capture inputs (video input, image input, or any media input) from the various sources of the device.

The input unit 206 can include be any kind of device used to capture media. The input unit 206 can be, but is not limited to, a digital camera, a media capturing device, a web camera, Single-lens reflex (SLR) cameras, Digital SLR (DSLR) cameras, mirrorless cameras, compact cameras, video recorders, digital video recorders, and the like. The media referred to herein can be, but not limited to video, images, and the like.

The output unit 208 (e.g., including output circuitry) may be configured to provide recommended suggestions to the user based on contents previously received by the user device 102.

For an instance, on-device AI method for providing connected actions by consolidation of the content that user receives in a device framework data like (Notification, Screen Data, Clipboard, Text Selected), Core App Data (Messages, Notes, Media, Contact etc.), App Activity (App Actions/Usage), Device Data, Near By Device and User Context through DataMashup.

Dynamism in providing Connected Action through User Behavioral Pattern/reasoning, next set of things user does after Consuming/Acting upon Suggestions. Similar Application data/usage has been considered while constructing the Suggestion (User Behavioural Reasoning & Similar Application Data).

Intelligent mechanism which can identify the duplicate data received from multiple sources like Message, Images, Files, Notification and Construct Single entry for Connected Actions (Multi Modal Data Similarity to Single Connected Actions). The controller 214 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

Figure 6:
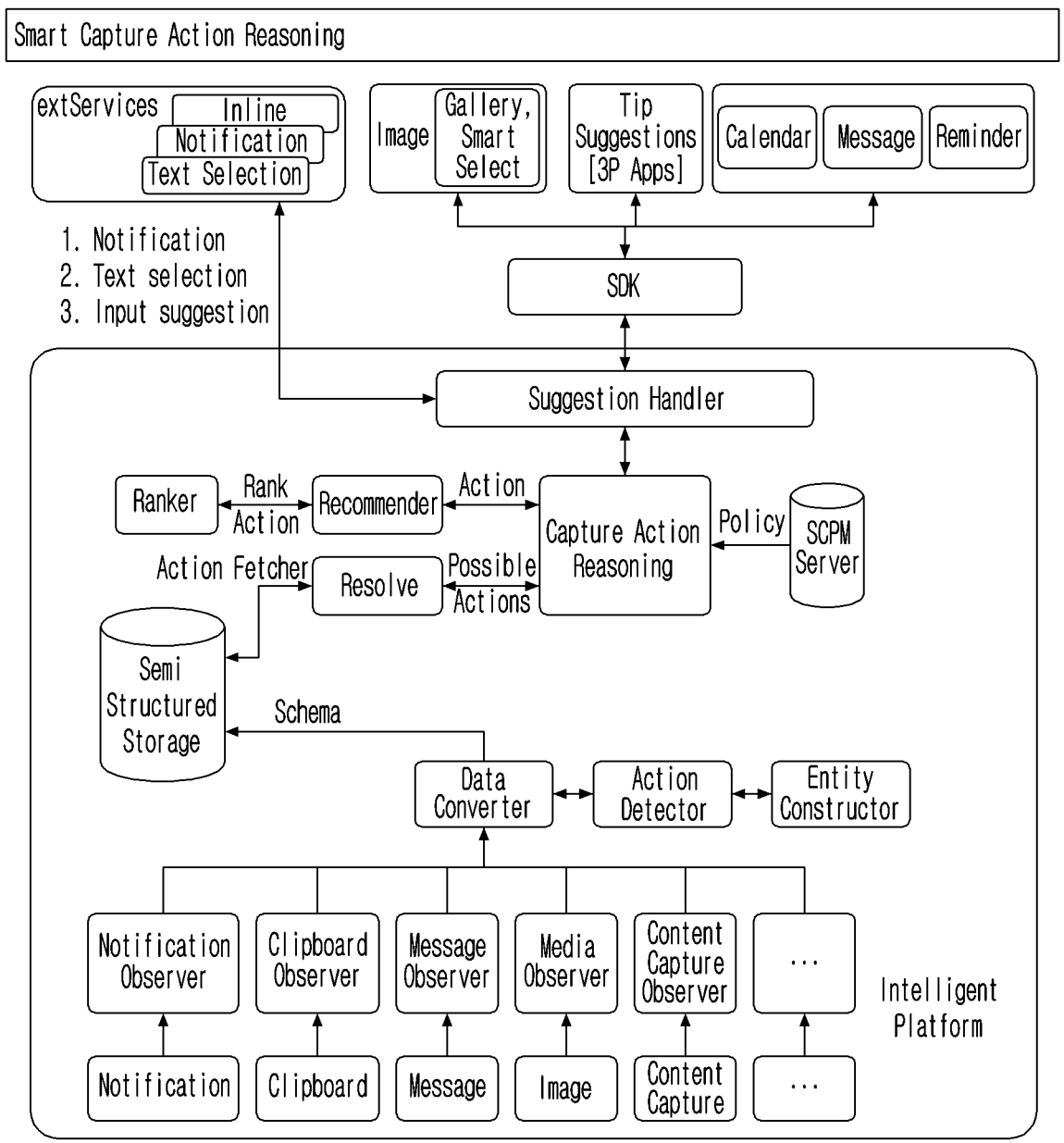
FIG. 6 is a block diagram of various hardware components of an example controller, according to various embodiments.

FIG. 6 is a block diagram of various hardware components of controller 214, according to various embodiments. In an embodiment, the controller includes a ranker, resolver, a recommender, a data converter, an action detector, an entity constructor, a notification observer, a clipboard observer, a message observer, a media observer, and a content capture observer. The notification observer monitors notification(s) displayed on the screen. The clipboard observer monitors copied data displayed received on the screen, the message observer monitors message(s) displayed on the screen, a media observer monitors media displayed on the screen, and a content capture observer observes content displayed on the screen. The resolver resolves the context related data and the action related data. The data converter includes a data extortion unit to extract the data from the content. The action detector detects the action on the screen. The components in FIG. 6 may be implemented, for example, using various circuitry and/or programmable components.

Figure 7:
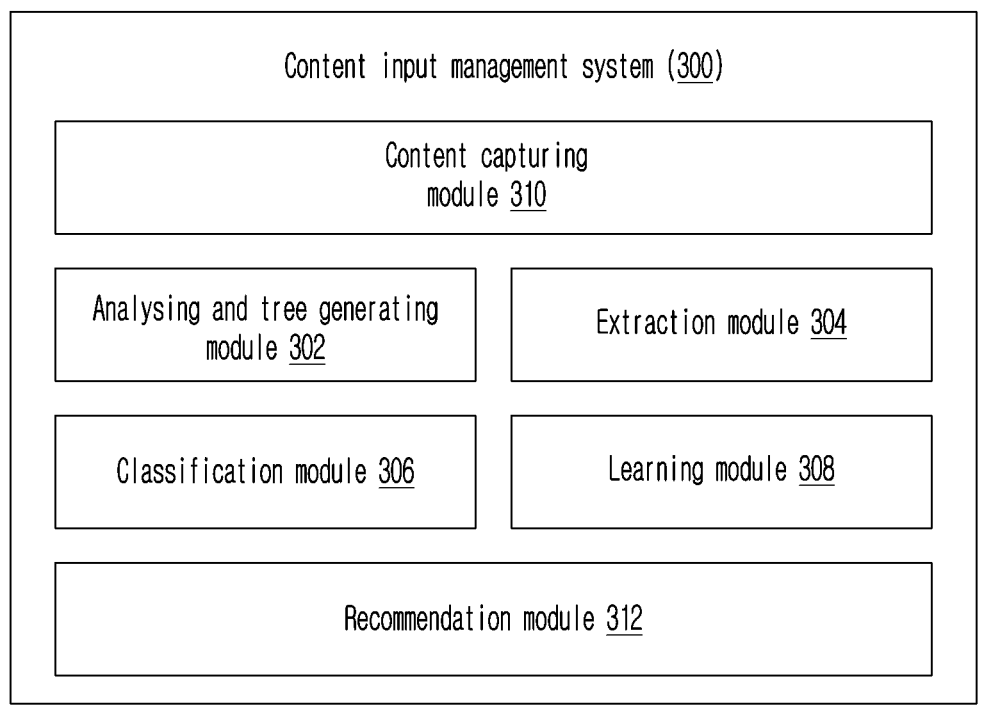
FIG. 7 is a block diagram of an example user device to provide recommendations, according to various embodiments.

FIG. 7 is a block diagram illustrating various units of the user device 102 to provide recommendations, according to embodiments as disclosed herein. As depicted in FIG. 7, the content input management system 300 comprises content capturing module 310, analyzing and tree generating module 302, extraction module 304, classification module 306, learning module 308 and recommendation module 312.

Content capturing module 310 can capture the contents of the screen by a deep screen capture mechanism using a screen understanding framework including: Screen Understanding, Field classification on the screen. Screen Understanding: in-depth understanding of the screen content for various screen types (Conversation Screen Understanding, Media Screen Understanding, etc.)

Classification module 306 can perform field classification by understanding screen content—TF-IDF based extraction by mapping the views using N-Array Depth First traversal, Field Classification as system component to enable system wide user cases.

Screen-Field Matrix (SFM) is a sparse matrix, that stores the composite weight for each input field , in each screen. The matrix column title represents tokens (words) in each screen, the matrix row title represents input fields, the SFM stores the weight of each of input field across different screens.

Extraction module 304 can resolve co-references within screen and extract relationship (Screen based Co-reference Resolution, after structured interpretation). Extraction module 304 can extract interest region on the screen, upon structured interpretation of screen content and extract content on the screen based on screen's identified interest region.

The learning module 308 of the neural network can be processed by controller 214 to obtain the input from the capturing unit of the user device 102. The learning module 308 can be provided with the suggestion of a user's choice of consuming actions or inputs to the user device 102. The learning module can be continuously provided with the user's choice/decision on consuming contents.

Recommendation module 312 can provide suggestions to recommend input to the users and action suggestions which can be performed by the user based on received or consumed contents by the user. The recommendation module 312 can fetch most recently used contents based on the identified context and region of interest extracted by the device.

FIGS. 8A, 8B, 8C, 8D, and 8E are is flow diagrams illustrating an example method for providing recommendations for the user device 102, according to various embodiments. Referring to the FIG. 8A, at step 802, the method includes collecting at least one data from the plurality of sources on the user device 102. At step 804, the method includes feeding the collected data to a data mashup model.

At step 806, the method includes identifying a plurality of types of the data using the data mashup model.

At step 808, the method includes determining one or more relationships among the types the data using the data mashup model.

At step 810, the method includes predicting, by the user device 102, one or more possible actions to be performed by a user as an outcome of the relationships determined using the data mashup model.

At step 812, the method includes providing a suggestion to the user to pursue the one or more actions from the prediction.

Figure 8A:
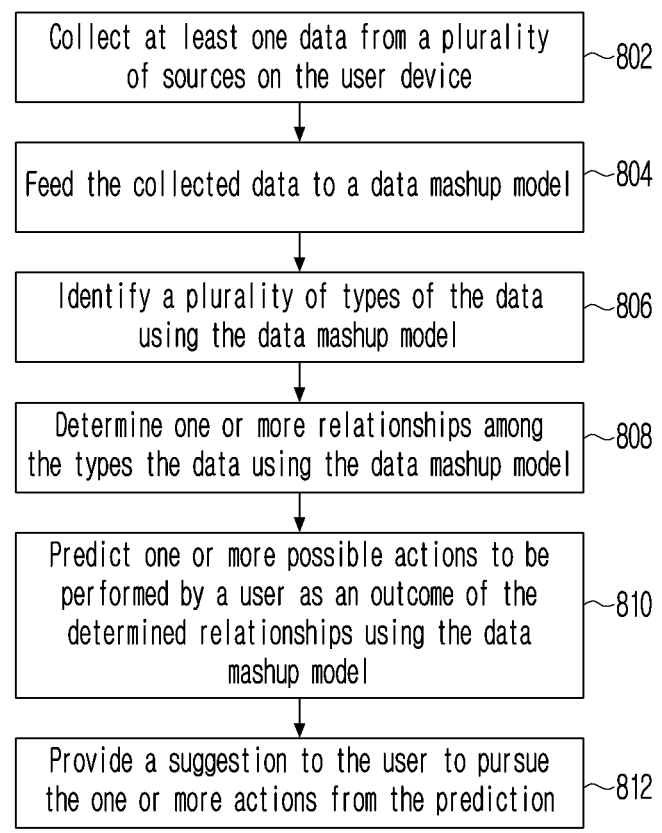
FIGS. 8A, 8B, 8C, 8D, and 8E are flow diagrams illustrating an example method for providing recommendations to the user device, according to various embodiments.
Figure 8B:
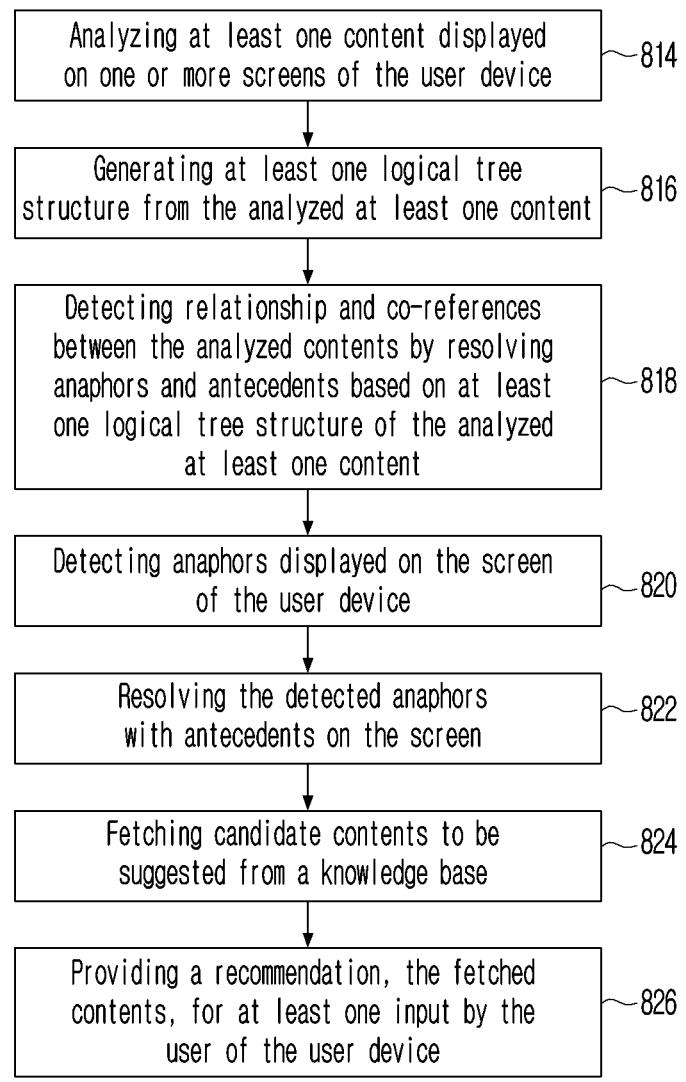

Referring to FIG. 8B, at step 814, the method includes analyzing the at least one content displayed on one or more screens of the user device 102. At step 816, the method includes generating the at least one logical tree structure from the analyzed at least one content. At step 818, the method includes detecting the relationship and co-references between the analyzed contents by resolving anaphors and antecedents based on at least one logical tree structure of the analyzed at least one content. At step 820, the method includes detecting the anaphors displayed on the screen of the user device 102. At step 822, the method includes resolving the detected anaphors with antecedents on the screen. At step 824, the method includes fetching candidate contents to be suggested from the knowledge base. At step 826, the method includes providing the recommendation, corresponding to the fetched contents, for at least one input by the user of the user device 102.

Figure 8C:
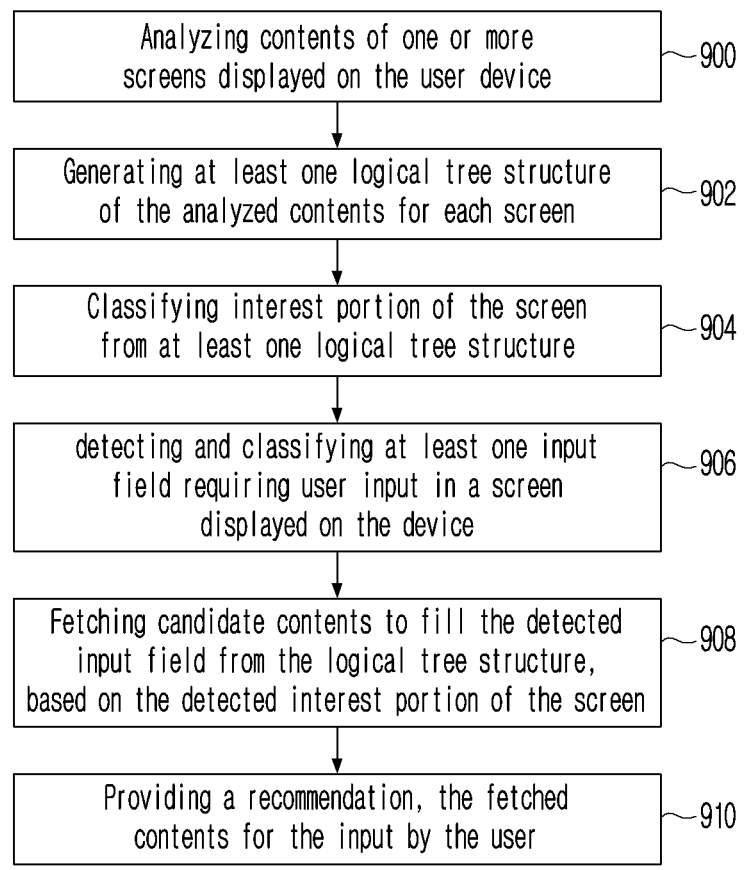

Referring to FIG. 8C, at step 900, the method includes analyzing the contents of one or more screens displayed on the user device 102. At step 902, the method includes generating at least one logical tree structure of the analyzed contents for each screen. At step 904, the method includes classifying interest portion of the screen from the at least one logical tree structure. At step 906, the method includes detecting and classifying at least one input field requiring user input in a screen displayed on the device. At step 908, the method includes fetching candidate contents to fill the detected input field from the logical tree structure, based on the detected interest portion of the screen. At step 910, the method includes providing the recommendation, the corresponding to fetched contents, for the input by the user.

Figure 8D:
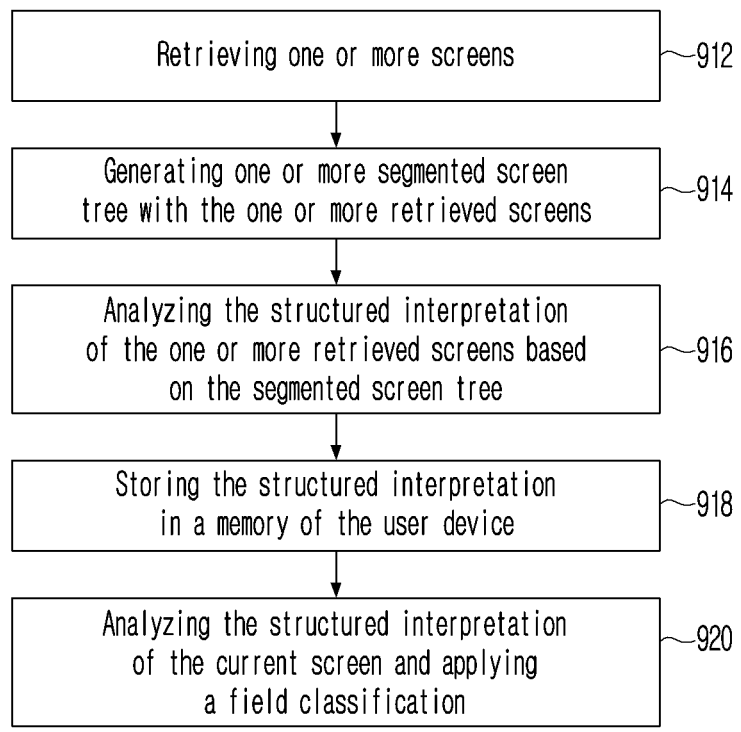

Referring to FIG. 8D, at step 912, the method includes retrieving one or more screens. At step 914, the method includes generating one or more segmented screen trees with the one or more retrieved screens. At step 916, the method includes analyzing a structured interpretation of the one or more retrieved screens based on the segmented screen tree. At step 918, the method includes storing the structured interpretation in the memory of the user device 102. At step 920, the method includes analyzing the structured interpretation of the current screen and applying the field classification.

Figure 8E:
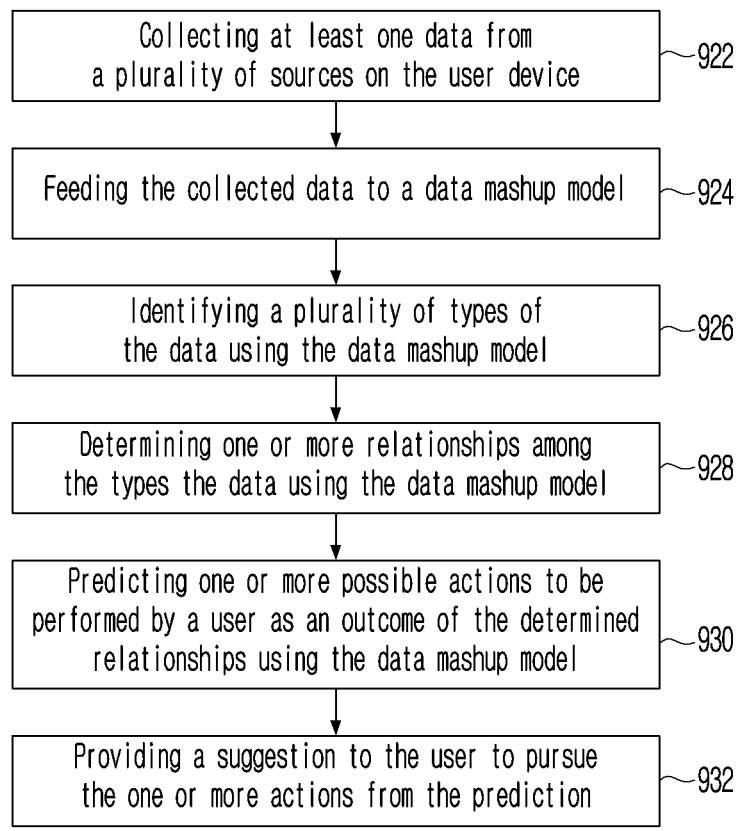

Referring to FIG. 8E, at 922, the method includes collecting at least one data from a plurality of sources on the user device 102. At 924, the method includes feeding the collected data to the data mashup model. At 926, the method includes identifying the plurality of types of the collected data using the data mashup model. At 928, the method includes determining one or more relationships among the types the data using the data mashup model. At 930, the method includes predicting one or more possible actions to be performed by the user as an outcome of the determined relationships using the data mashup model. At 932, the method includes providing the suggestion to the user to pursue the one or more actions from the prediction.

Figure 9:
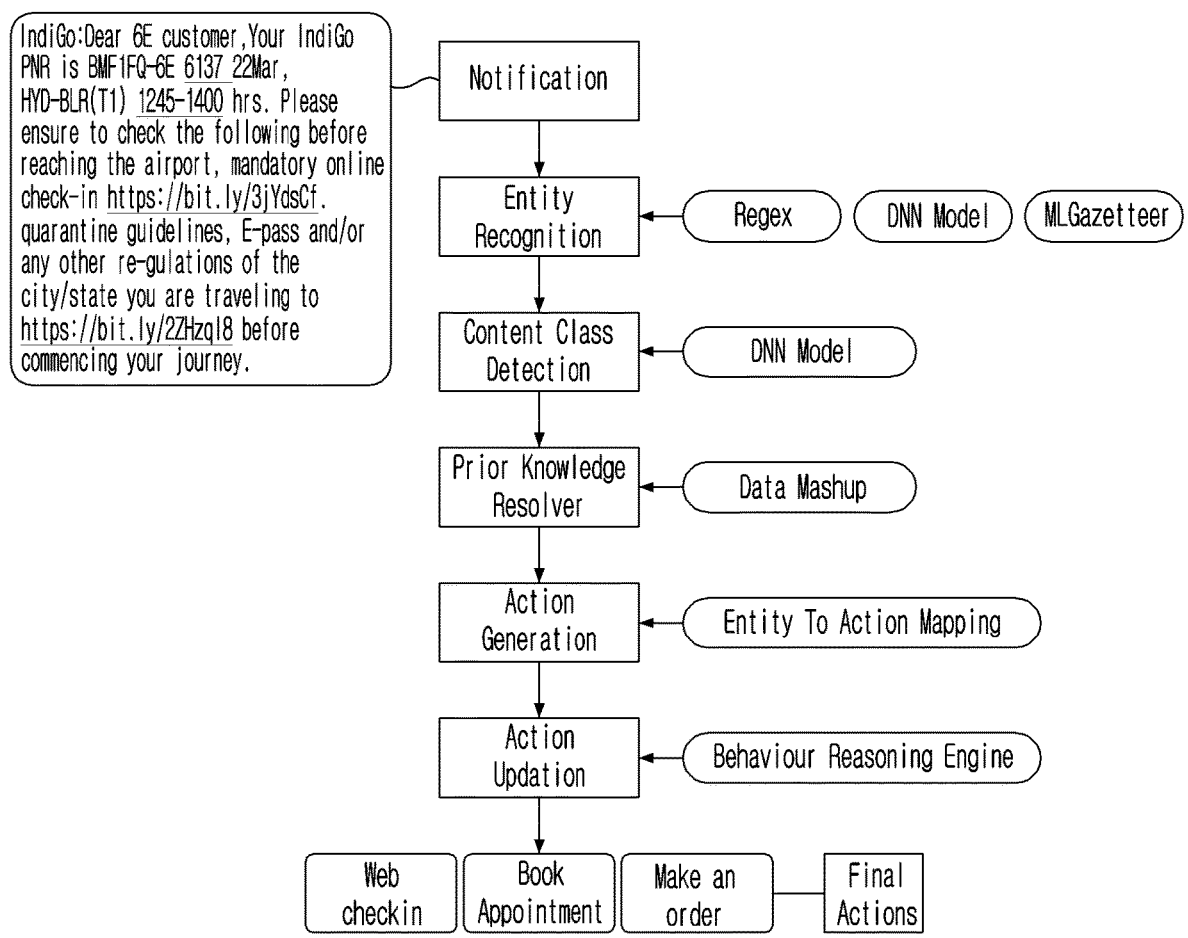
FIG. 9 illustrates an example architecture for providing recommendations to the user device, according to various embodiments.

FIG. 9 illustrates an architecture diagram for providing recommendations to the user device 102, according to various embodiments. As illustrated, providing connected actions can be performed in the user device 102 by the consolidation of the contents that the user receives in the device framework data like (Notification, Screen Data, Clipboard, Text Selected), Core App Data (Messages, Notes, Media, Contact etc.), App Activity (App Actions/Usage), Device Data, Near By Device and User Context through Data Mashup.

As illustrated in FIG. 9 actions are intelligently provided for given input by constructing associated actions with reasoning by finding related received content across device. There is a mechanism for dynamism in suggesting future actions by considering next set of actions/things user does after consuming suggestions. Suggestions in an application can be provided by finding related other application data and modifying a suggestion based on the important events occur at that time.

Therefore, making use of similar application's contents like orders made, viewed content, activities done at location, propagation actions derived from one device's data to other connected devices based on the context user is in actions will be suggested with best possible Application through Content Parsing and previous data received from the applications.

Therefore, intelligent system which can differentiate the same data received from multiple sources like (invitation for event through message, image card, files, notification, etc.) for the uniqueness detection which avoids duplicate actions propagation.

As shown in the FIG. 9, in an example, the user device 102 receives a notification and identifies the entity and the content class (e.g., <PNR : BMF1FQ-6E 6137, Date:Mar. 22, 2021 12:45—1400, Check in Link : https://bit.1y/3jYd-sCf, Info Link: https://bit.1y/2ZHzqI8, Destination : Bangalore, Origin : Hyderabad >). Based on the content class, the user device 102 determines the content type (e.g., Travel, Reminder) using the prior knowledge resolver and the data mashup model. Based on the content yype, the user device (102) link the various activity of the user (i.e., <Screen Activity : Browser, Clipboard : RT-CPR, Notes—Business Trip >, <App Capability : (Medical Test : Practo, Shopping : Amazon Taxi : Ola) >). Based on the link generation, the user device 102 suggests the action (i.e., <Possible Actions : Web CheckIn, Book Appointment, Taxi Booking, Weather at Bangalore, Make Order>) and prioritizes the order or updates the order based on the user requirement.

Figure 10A:
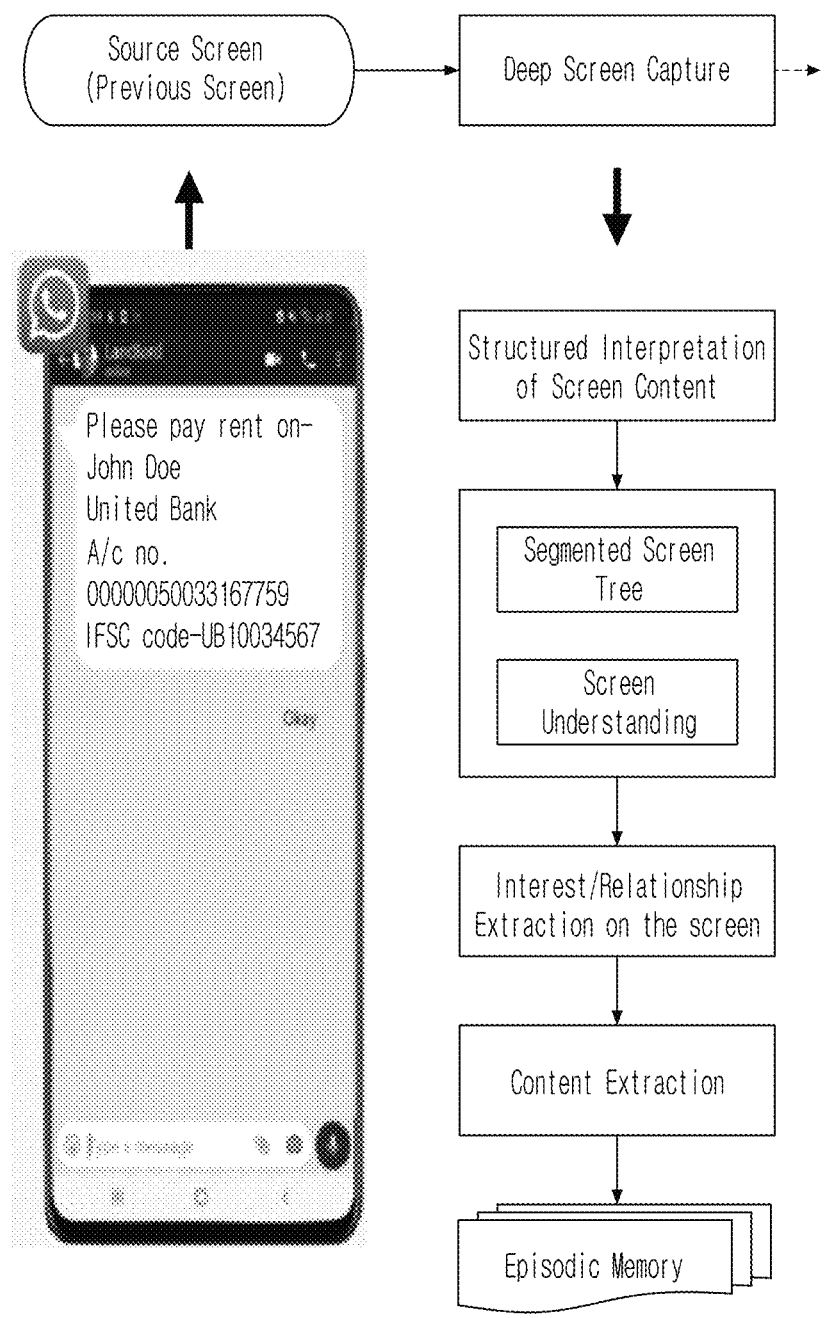
FIGS. 10A and 10B are diagrams depicting example deep screen capturing of the contents from various sources of the user device, according to various embodiments.
Figure 10B:
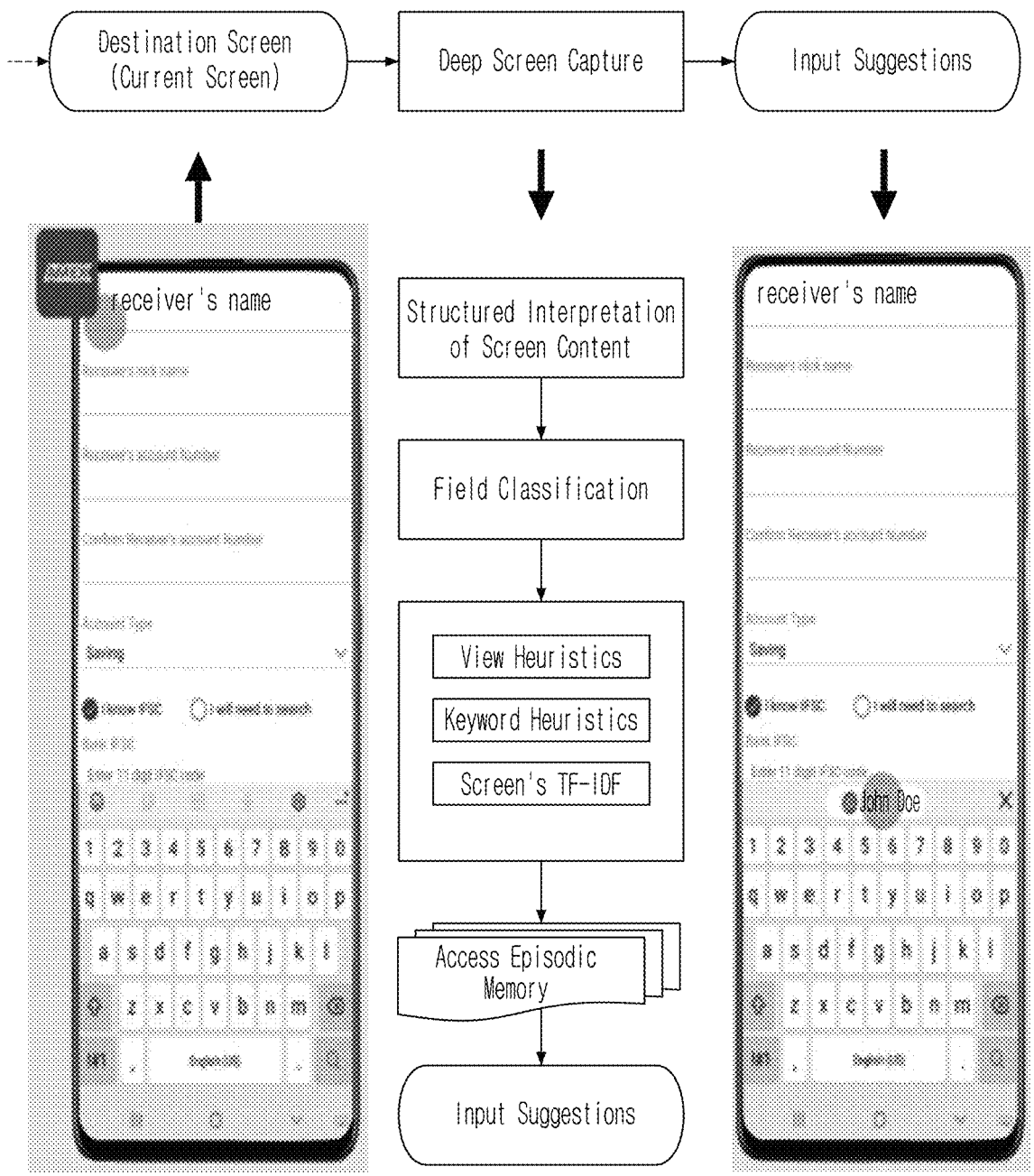

FIGS. 10A and 10B are diagrams depicting example deep screen capturing of the contents from various sources of the user device 102, according to various embodiments. As illustrated in FIG. 10A, on receiving notification in a social media platform, user experience is enhanced by deep screen capturing, which performs in-depth screen understanding. Further, deep screen capturing is sent as an input to structural interpretation of the screen content, which generates a segmented screen tree to understand the screen. Also, a user's interest or relationship is extracted on the screen, in which the content is extracted and stored in the episodic memory.

As illustrated in FIG. 10B, the input from FIG. 10A is captured by deep screen capturing which can be suggested to the user on the current screen. Deep screen capturing is sent to structured interpretation of screen content which is classified based on the fields. Field classification on the screen involves viewing heuristics, keyword heuristics and screen's TF-IDF, which is then stored in success episodic memory which is later provided to the user as an input suggestion.

As illustrated in FIGS. 10A and 10B, the content input management in various sources of the device includes analyzing contents of one or more applications displayed from time to time on the device, generating a logical tree structure of the analyzed contents, for each application, detecting and classifying one or more input fields requiring user input in an application currently being displayed on the device, automatically fetching from the logical tree structure, candidate contents to fill the detected input field and providing as a recommendation, the fetched contents for input by the user.

Figure 11A:
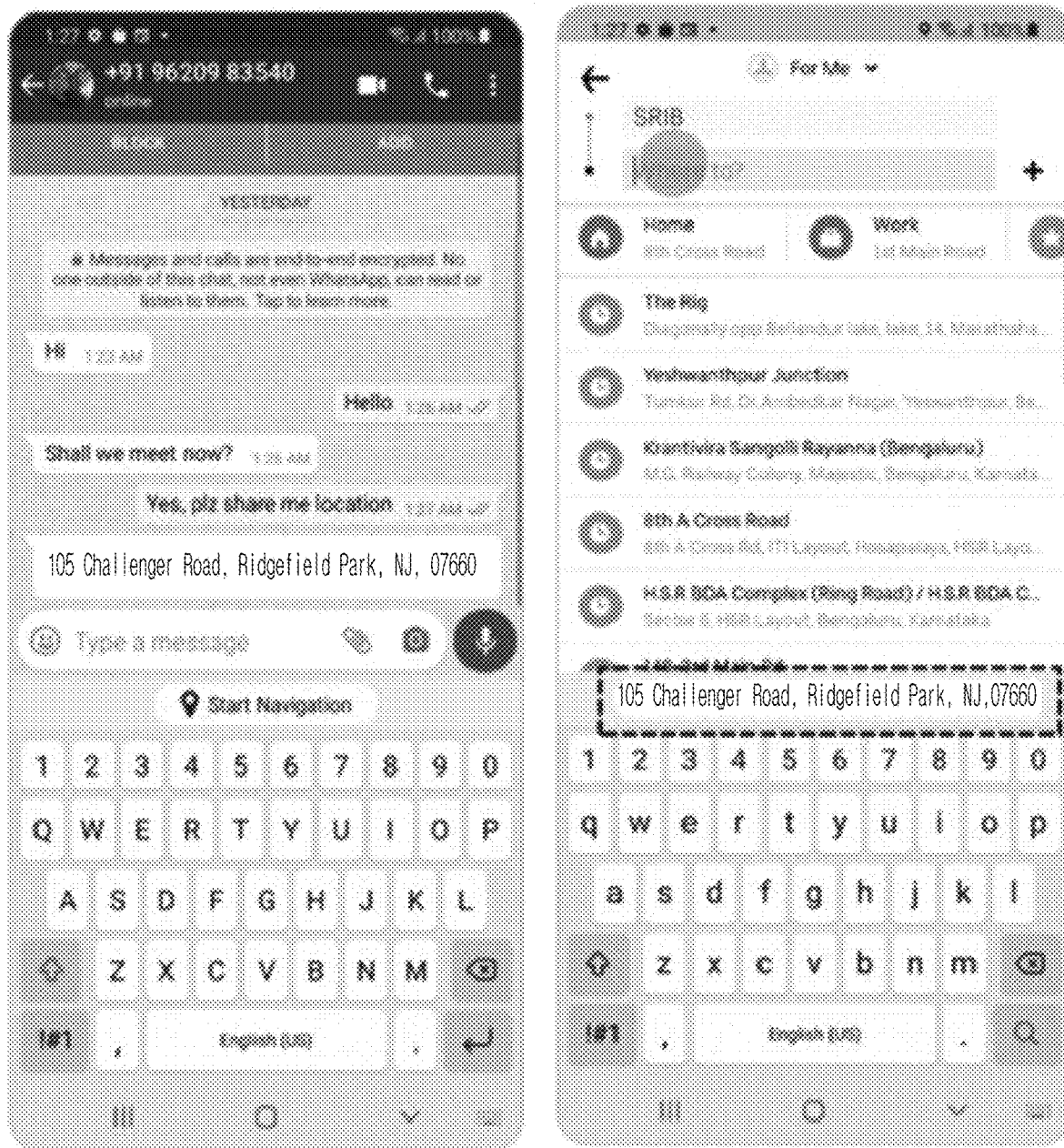
FIGS. 11A, 11B, and 11C are the example diagrams depicting the input suggestions to the user on the user device, according to embodiments as disclosed herein.
Figure 11B:
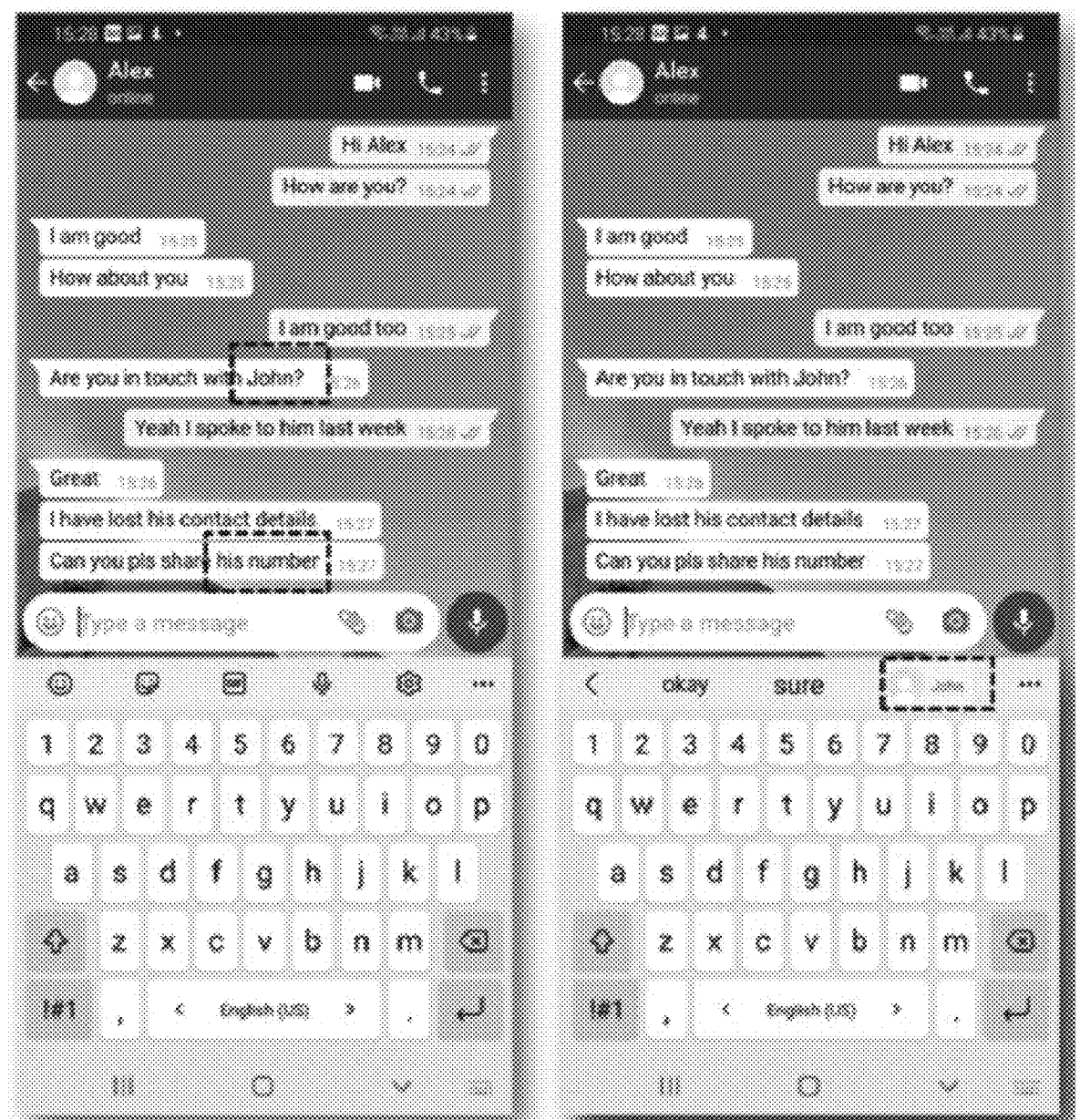
Figure 11C:
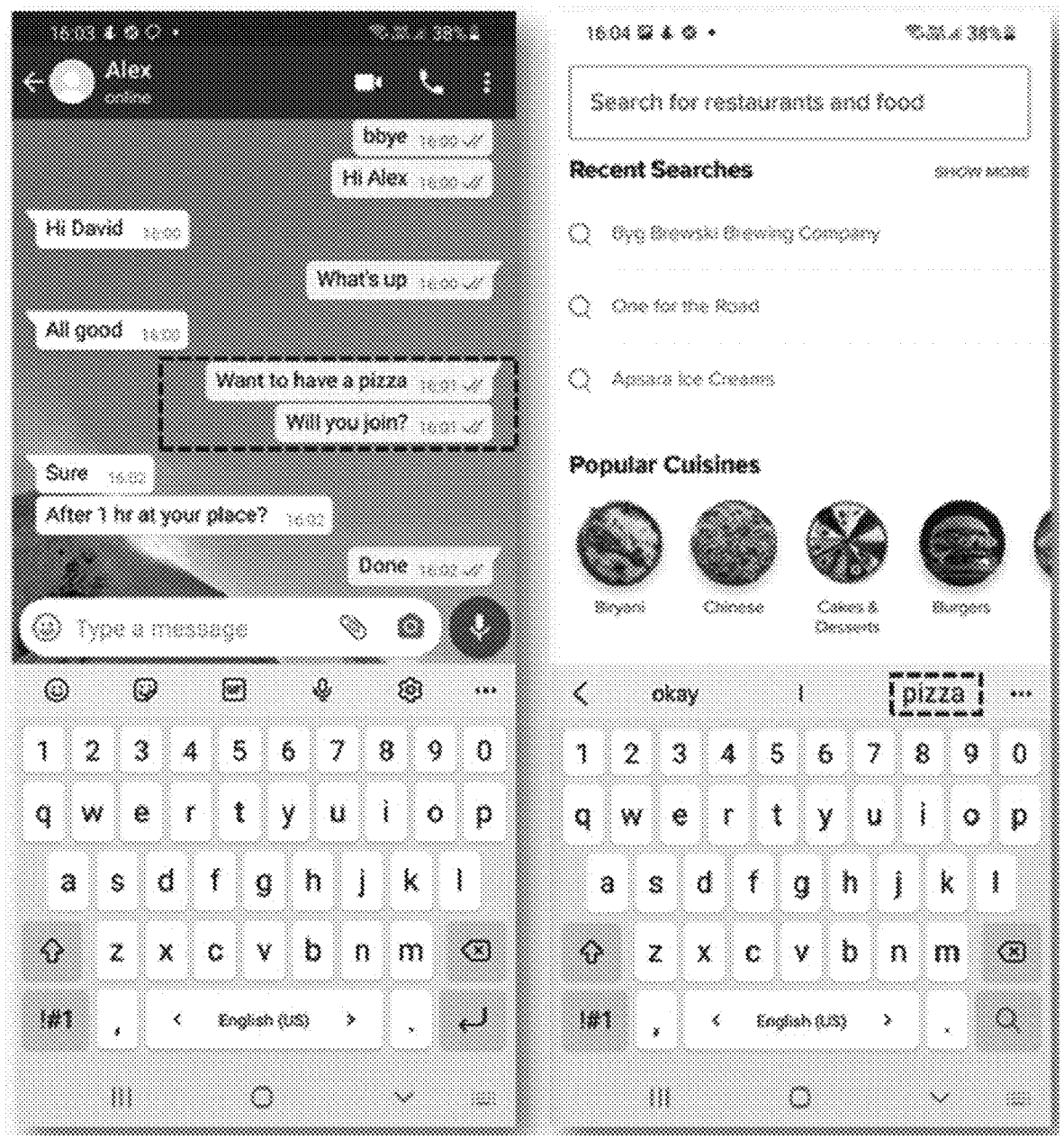

FIGS. 11A, 11B, and 11C are diagrams depicting example input suggestions to the user on the user device 102, according to various embodiments. As illustrated in FIG. 11A, the deep screen capturing of the source screen, e.g.,. from a social media platform, the structured interpretation is performed by parsing different content on the screen by identifying interest and extracting content, stores in the memory which provides actions on the screen on the current screen. The next screen can be a destination screen in which the contents from the source application can be suggested. In the destination screen, field classification is performed which classifies the address field and fetches input suggestion (address) from the previous memory. The destination screen may be a cab booking or location finding related application.

As illustrated content input management in applications, includes analyzing contents of one or more screens displayed from time to time on the device, generating a logical tree structure of the analyzed contents, for each screen (Segmented Screen Tree), detecting and classifying one or more input fields requiring user input in a screen currently being displayed on the device; (Screen based TF-IDF for Field Classification), automatically fetching from the logical tree structure, candidate contents to fill the detected input field and providing as a recommendation, the fetched contents for input by the user.

As illustrated in FIG.11B, relationship is extracted for providing input suggestions. The deep screen captures the source screen and interprets the structured input by parsing received and sent notifications to the user. Further, the screen based co-reference resolution can extract relationships between different screen contents and provide input suggestion (content) based on content extraction. As illustrated in FIG. 11B, the destination screen can receive the input suggestion from the previous screen.

As illustrated in FIG. 11C, interest can be extracted from the source screen and provided to the destination screen based on the interest region of the user. As illustrated, deep screen captures the source screen from the social media platform, which performs structured interpretation by parsing received and sent messages from the source screen. The screen-based relationship extraction extracts relationship between different screen contents based on the interest of the user. Screen based interest extraction extracts interest region of the user.

The destination screen can be a food delivery application or any other application involving the location to deliver. The field classification can classify the search field from the previous screen and provide input suggestion(s) to the destination screen.

FIGS. 12A, 12B, 12C, and 12Dillustrate the suggestion of actions based on the analyzed contents on the screen, according to various embodiment. As illustrated, the example diagrams depict user experience with deep screen capturing using an understanding segmented screen tree with the structured interpretation of the screen contents. An embodiment can provide a structured interpretation of the screen content using a segmented screen tree by receiving a source screen, retrieving a raw dump of content capture events (100s of events per screen), dynamically prepare a segmented screen tree (using 100s of events), identifying and associating an identifier based on screen type or categories (ex: IM, browser, shopping, etc.), dynamically traverse the segmented screen tree using an associated identifier and providing structured interpretation of the screen content.

Figure 12A:
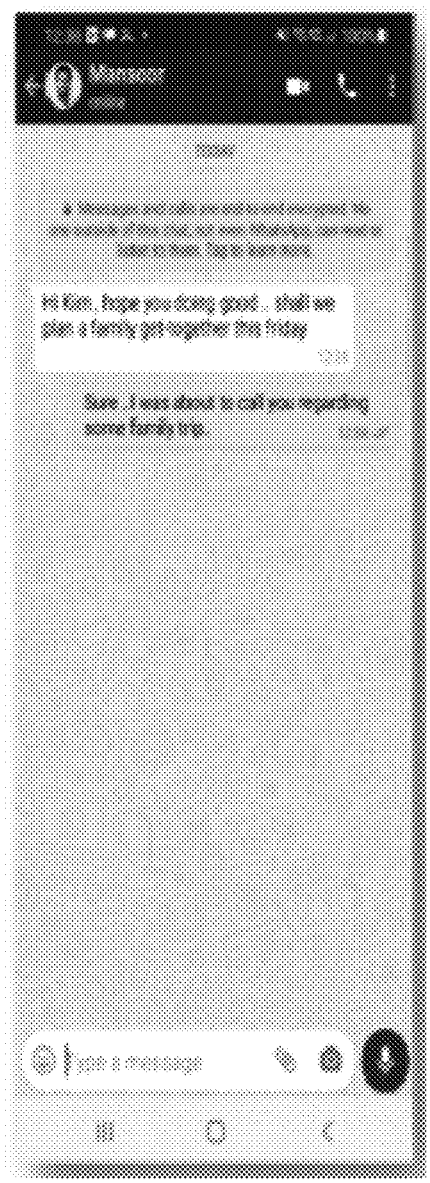
FIGS. 12A, 12B, 12C, and 12D are example diagrams depicting the suggestion of actions based on the analyzed contents on the screen, according to various example embodiments.

As illustrated in FIG. 12A, in an embodiment, ae user having a conversation in any social media platform can be fetched, extracted and the context of the action can be understood. The field classified by the user may include component name, message text, message time, message type, conversation title and sender details.

Figure 12B:
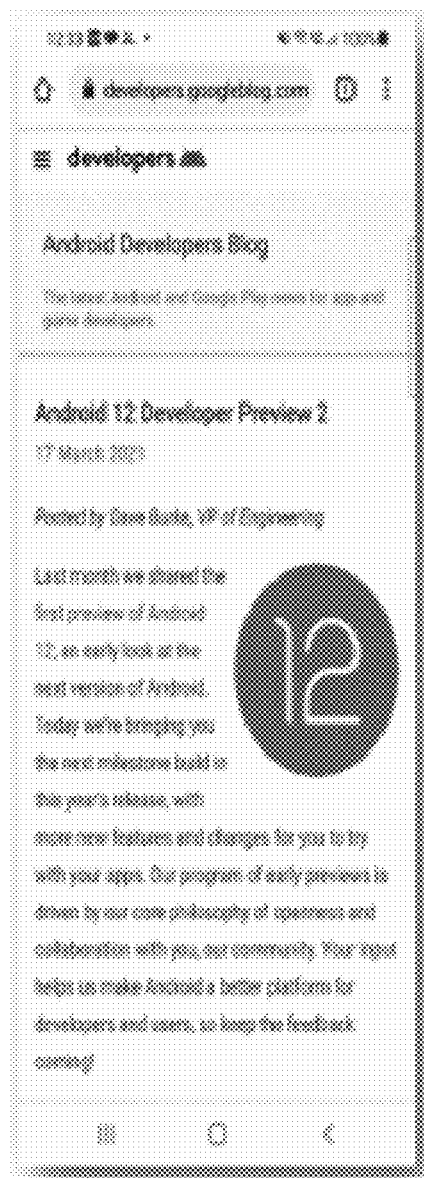

As illustrated in FIG. 12B, in an embodiment in which a user performs a search in a browser, the website URL, article title, highlights, time and keywords can be fetched.

Figure 12C:
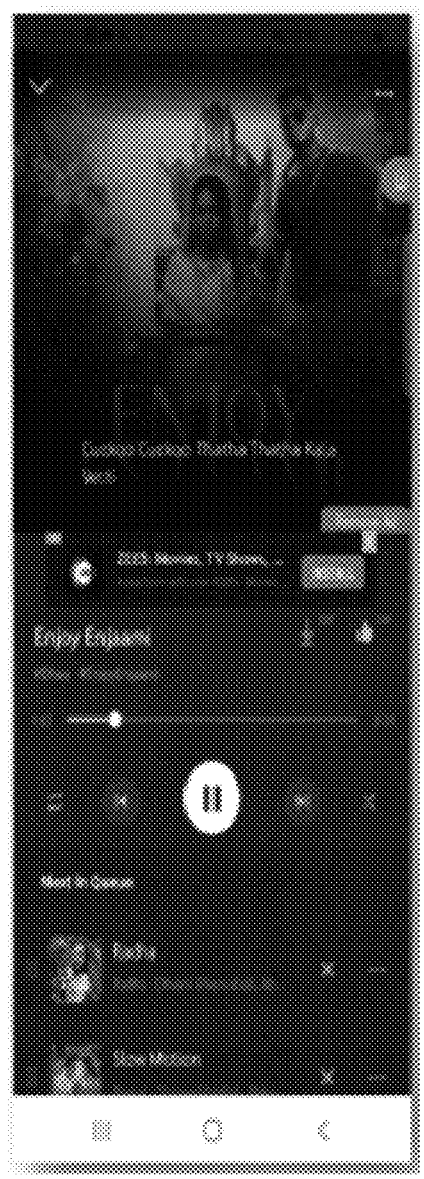

As illustrated in FIG. 12C, in nan embodiment in which a user listens to music using a media playback screen, the media title, likes/dislikes, rating, channel, number of subscribers, language information, date and time can be interpreted.

Figure 12D:
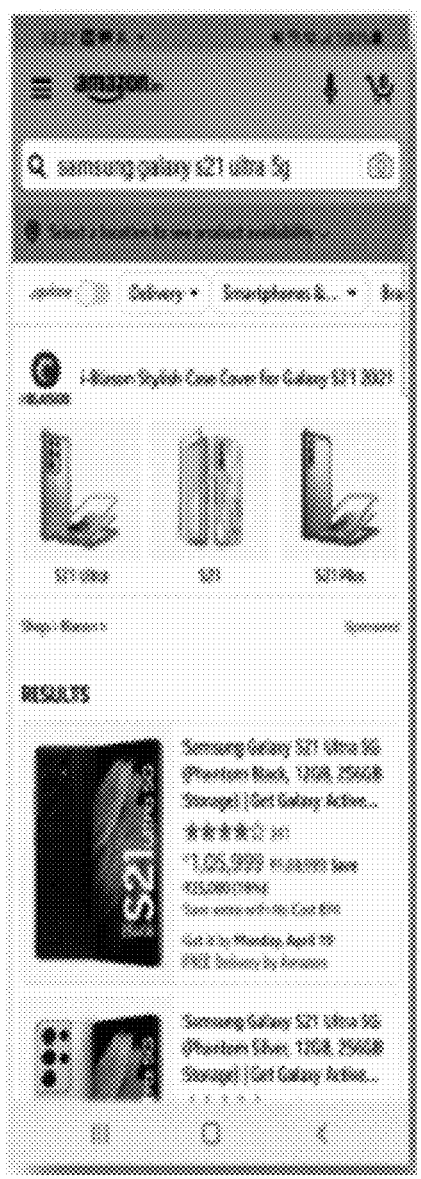

As illustrated in FIG. 12D, an action can be dynamically suggested, for example, a purchase of products based on previous screens of FIGS. 12A and 12B. FIG. 12D can provide a screen with a shopping application with the search field content or browsed products information. Thus, structured interpretation of the screen contents can be provided by segmenting the screen tree.

Figure 13:
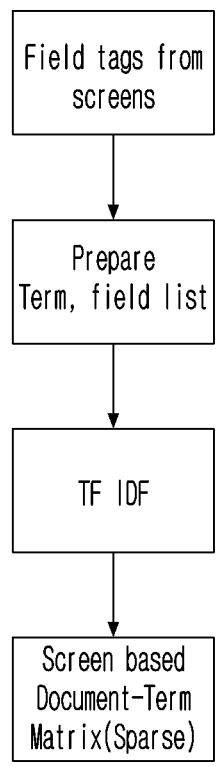
FIG. 13 is an example diagram depicting field classification with screen based TF-IDF to provide recommendation to the user, according to embodiments as disclosed herein.
Figure 13:
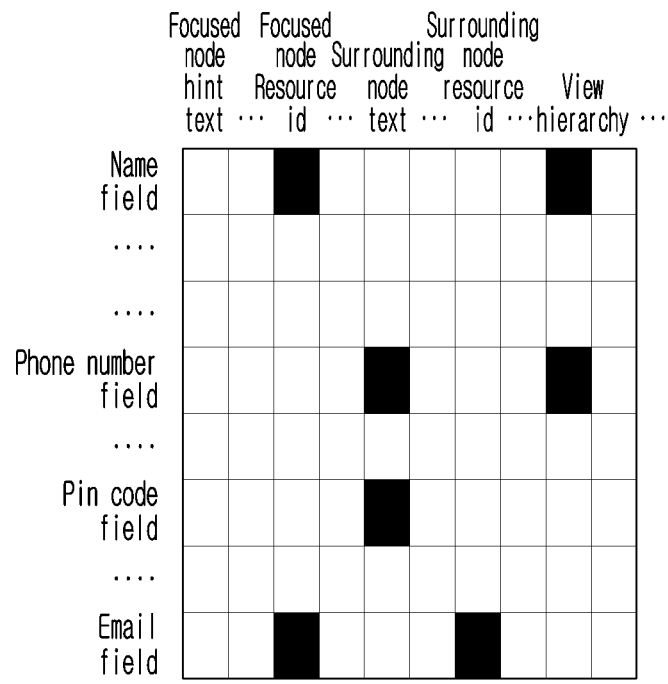
Figure 13:
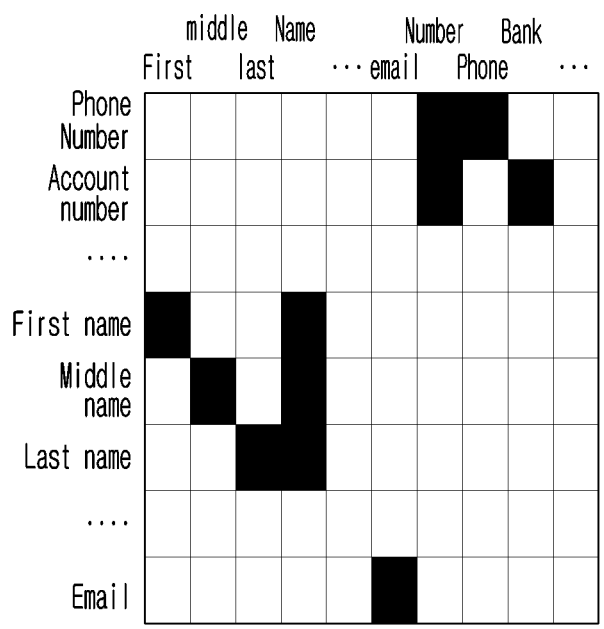

FIG. 13 illustrates example field classification with screen-based TF-IDF to provide a recommendation to a user, according to various embodiments. As illustrated in FIG. 13, input suggestion with deep screen capturing using in-depth screen understanding and intelligence is provided. For example, deep screen capturing involves field classification by classifying fields such as OTP, address, search contents; logging/personal such as first name, last name, nick name, mobile number, e-mail, URL and the like; banking information such as account number, card number (credit/debit card), bank name, recipient name, IFSC, UPI ID; TBY such as travel (bus, flight, train), shopping, booking (hotel) categories.

As illustrated, field classification comprises explicit autofill hints; view heuristics such as view hints, resource in name, text, content description and web view; keyword heuristics such as keyword DB, screen based TF-IDF and view heuristic such as parents and sibling node, activity component name and screen title.

As illustrated, field classification with screen based TF-IDF can be performed by receiving a source screen having input field(s), identifying information from the screen based on input field (e.g., view hierarchy, hints, resource IDs, content description, HTML attributes, activity & component name, screen title, parent and sibling nodes, etc.), retrieving tags from the screen information, prepare term and field list, dynamically preparing sparse screen based TF-IDF' (Term Frequency—Inverse Doc Frequency: Document Term Matrix between input fields and Tags), associating and updating weights iteratively for each term and field, and classifying fields on the source screen, based on screen-based TF-IDF.

Figure 14:
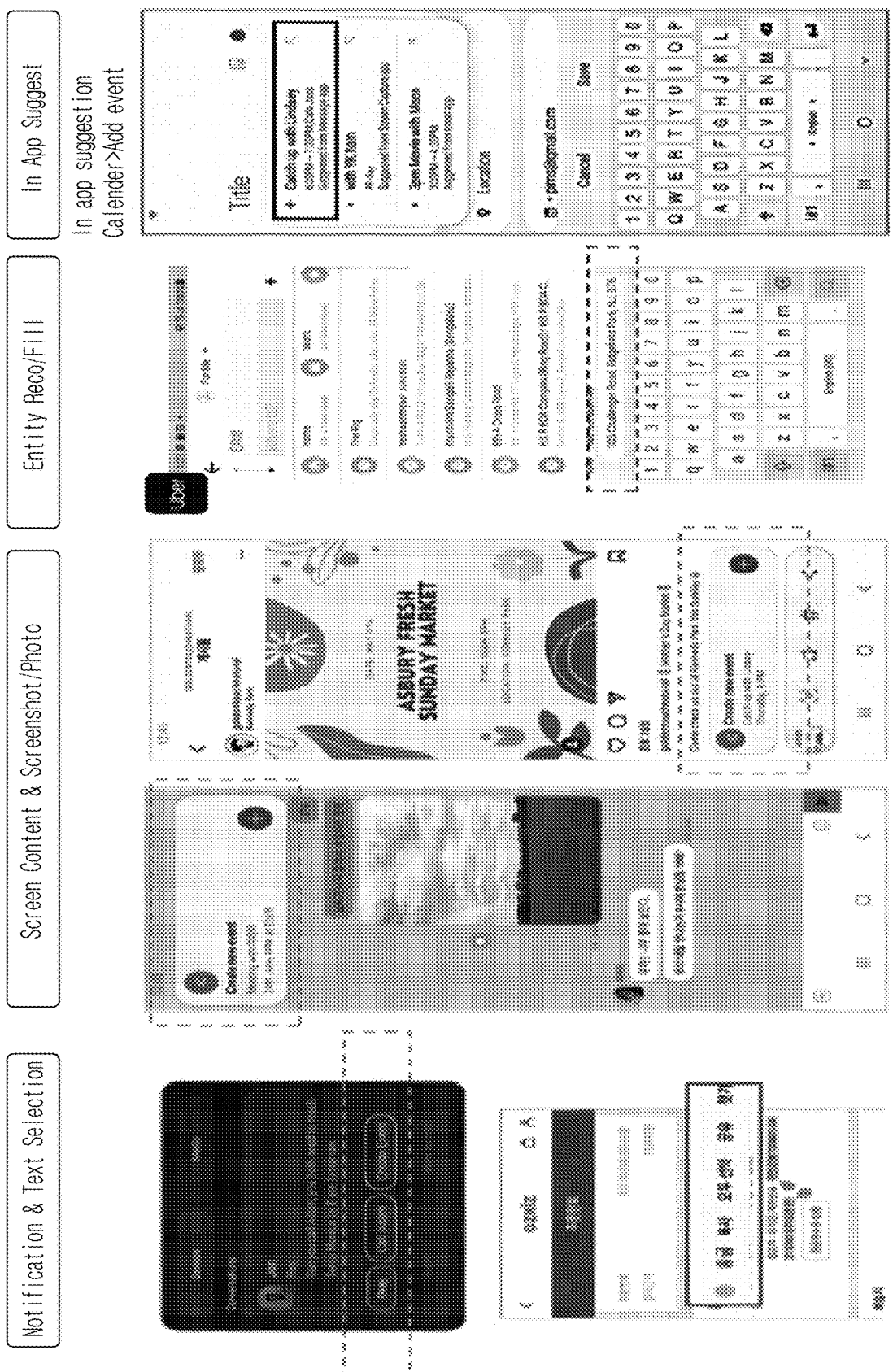
FIG. 14 is an example diagram depicting the suggestion of actions provided to the user, according to embodiments as disclosed herein.
Figure 15A:
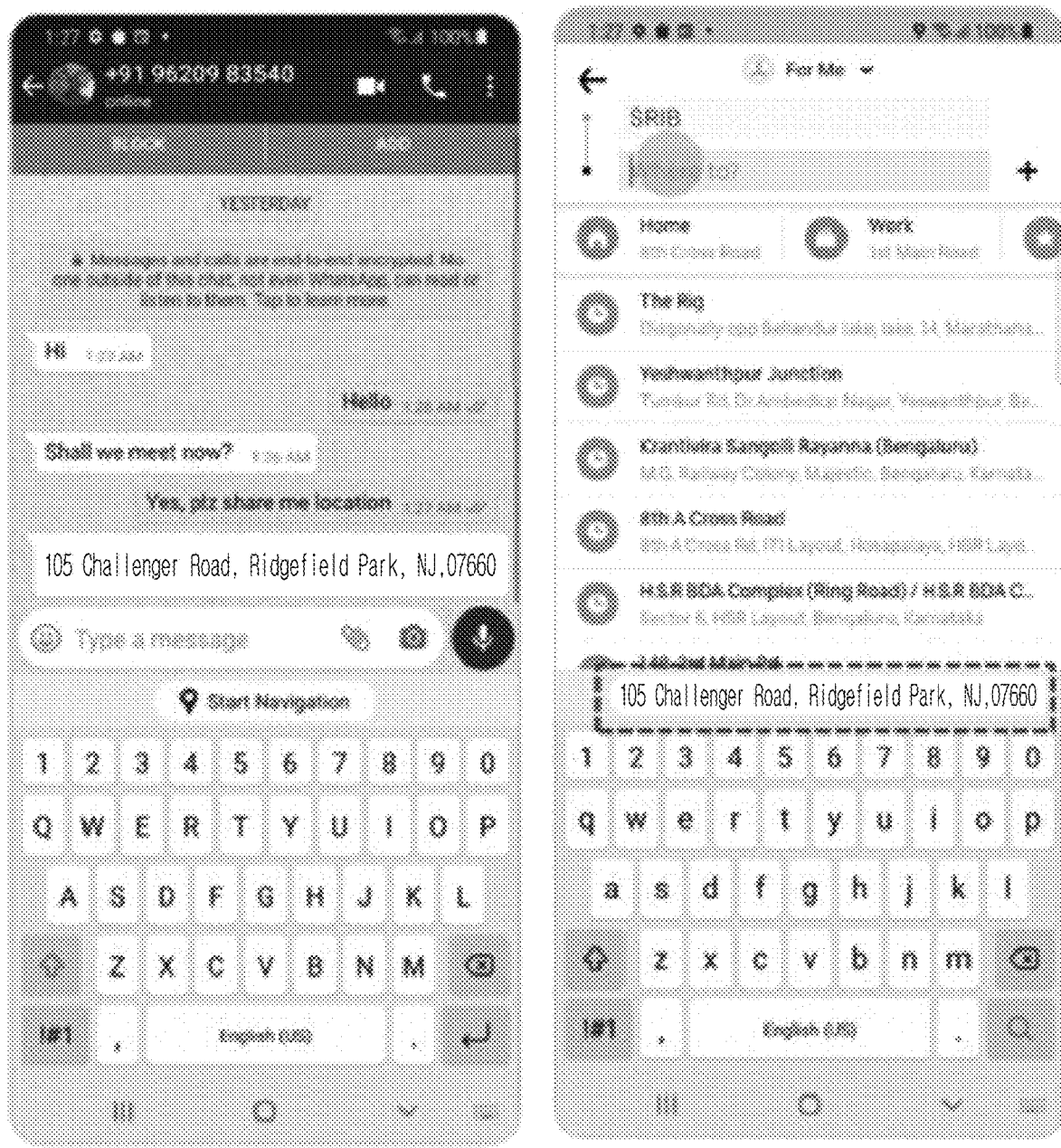
FIGS. 15A, 15B, 15C, and 15D illustrate example combinations of input suggestion and suggested actions based on analyzed contents on a screen, according to various embodiments.
Figure 15B:
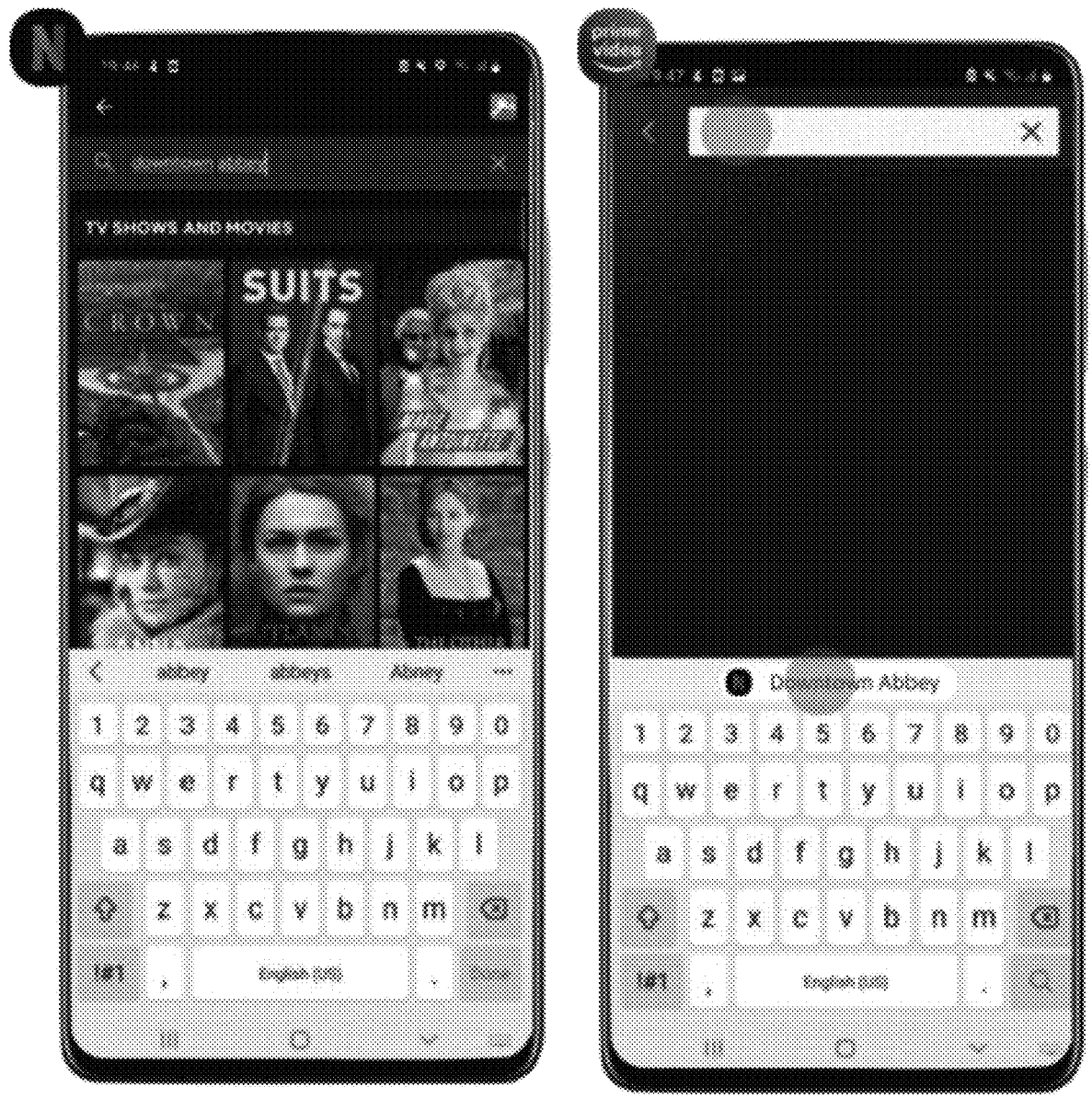
Figure 15C:
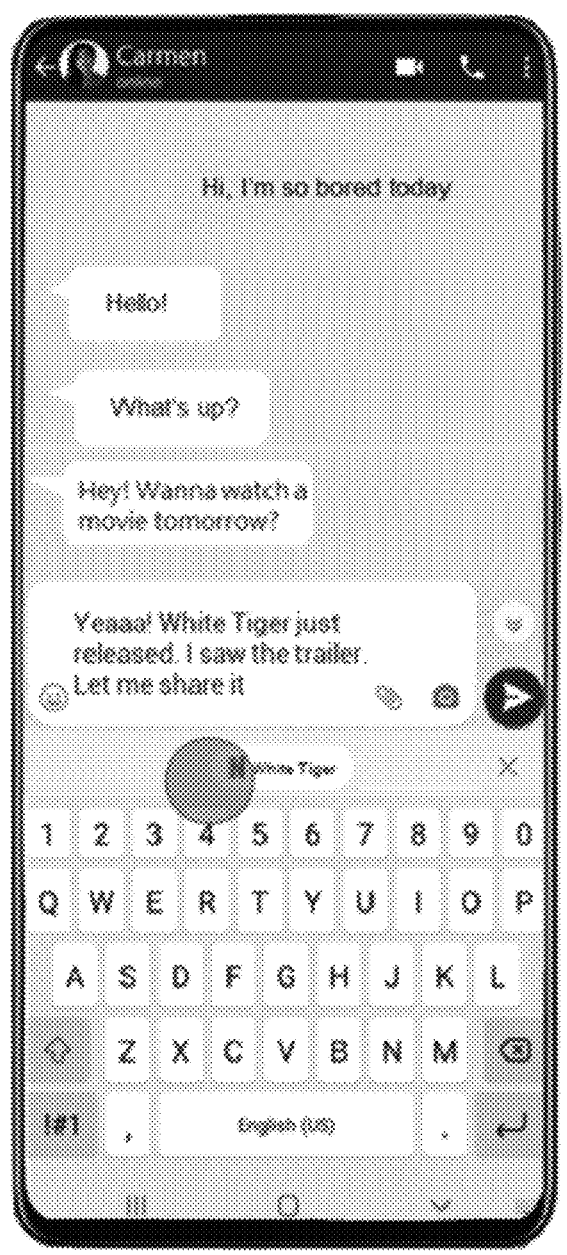
Figure 15D:
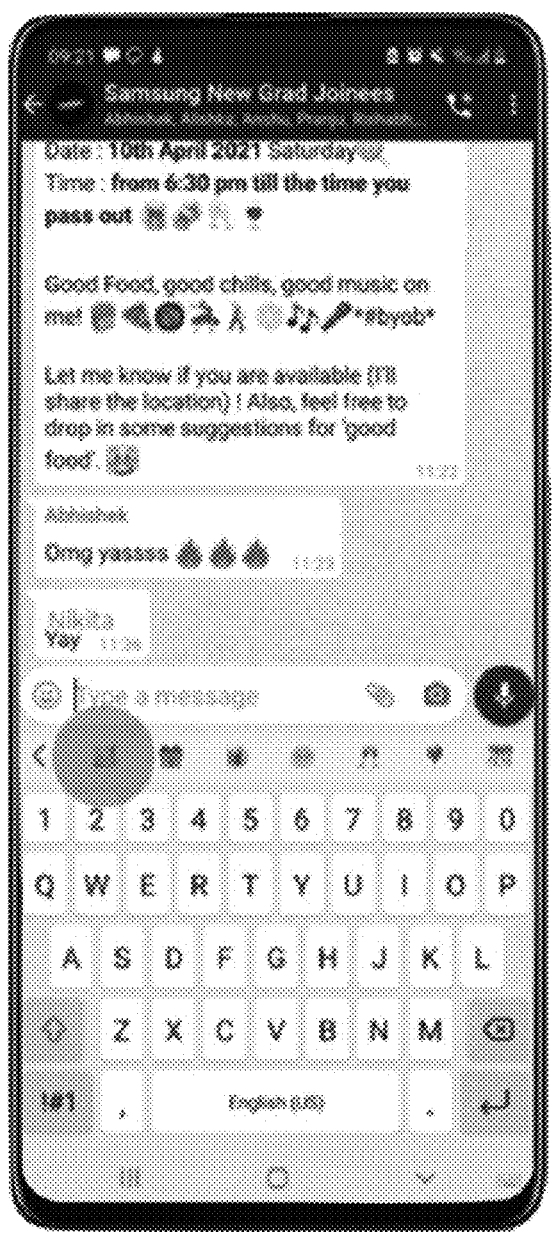

FIG. 14 illustrates example suggestions of actions provided to the user, according to various embodiments. As illustrated, the input suggestions and connections are performed simultaneously. The notification and text selection screen may have actions such as call Adam, create event. The user on selecting create event action can create an event using screen content and a screenshot photo with the location mentioned. Later the action is performed by fetching location from the previous screen with fill option provided to the user. Thus, actions are connected to each other using a relationship and input suggestions are performed on the user device 102.

FIG. 15A, 15B, 15C, and 15D illustrate an example combination of input suggestion and suggested actions based on the analyzed contents on the screen, according to various embodiments. As illustrated, the example shows input suggestions for fill suggest (FIG. 15A), search suggest (FIG. 15B), share suggest (FIG. 15C) and providing emoji suggest (FIG. 15D) in various actions. As illustrated, input suggestions and actions are performed simultaneously in various scenarios.

Figure 16A:
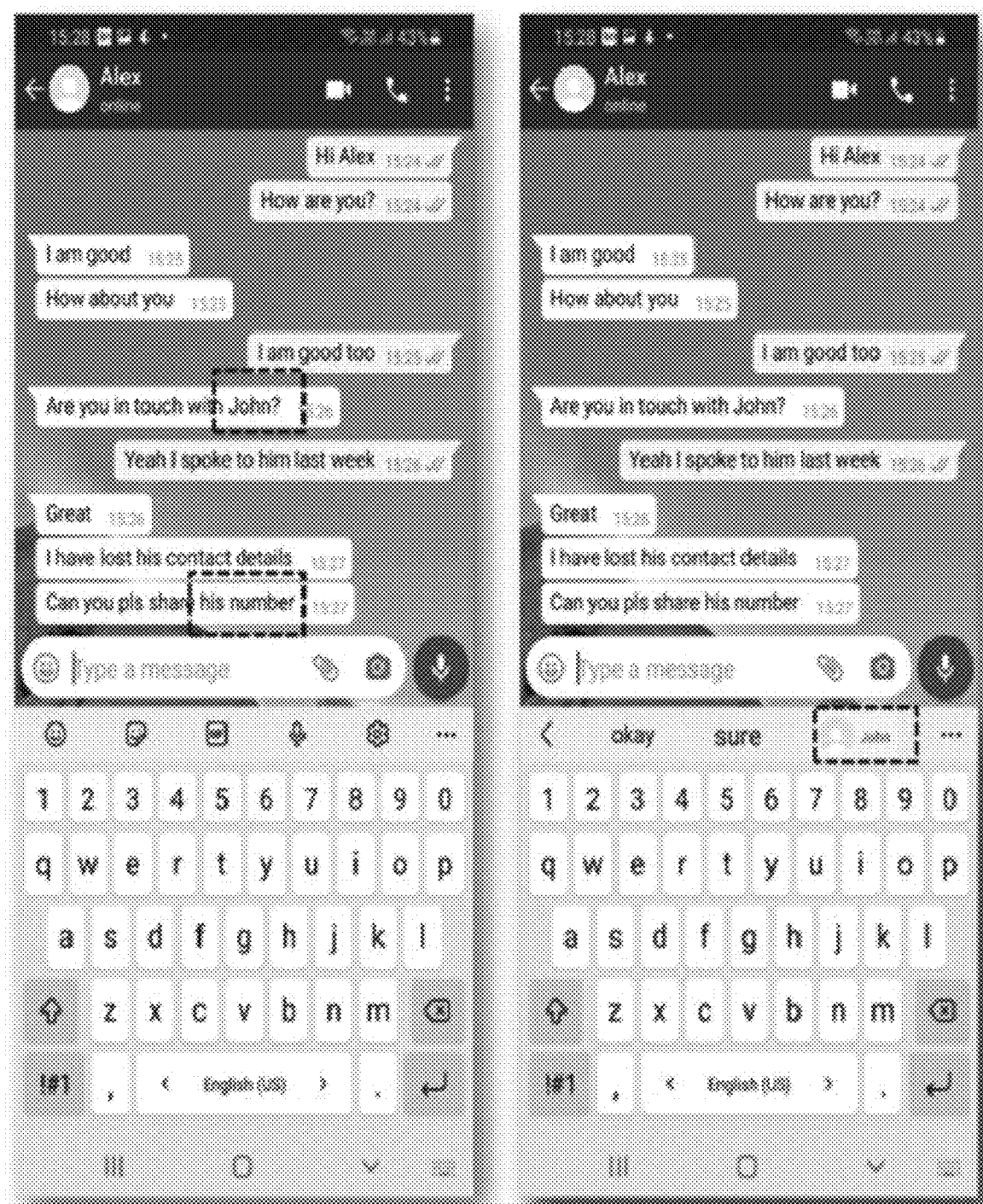
FIGS. 16A, 16B, and 16C illustrate example combinations of input suggestion and suggested actions based on analyzed contents on a screen, according to various embodiments.
Figure 16B:
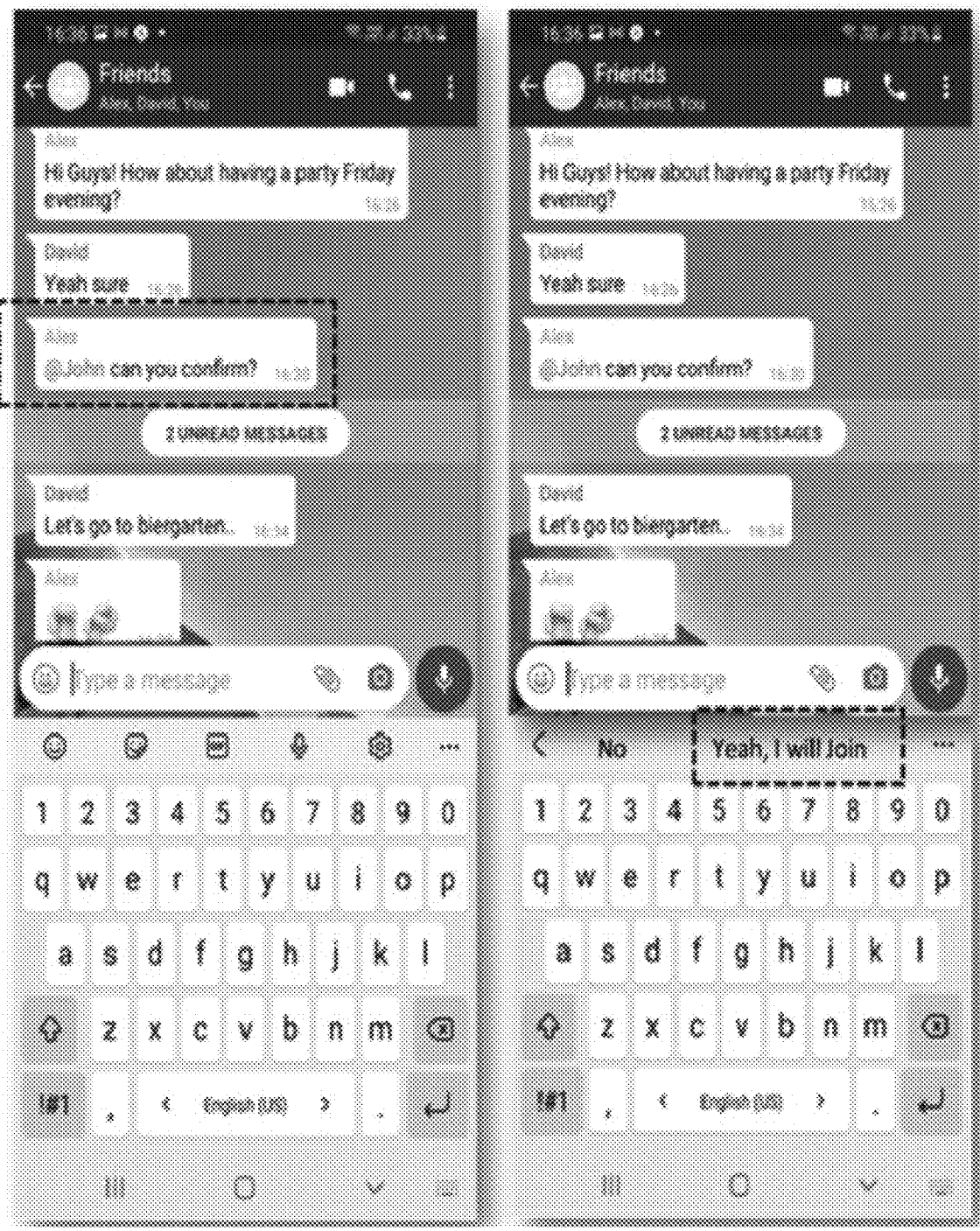
Figure 16C:
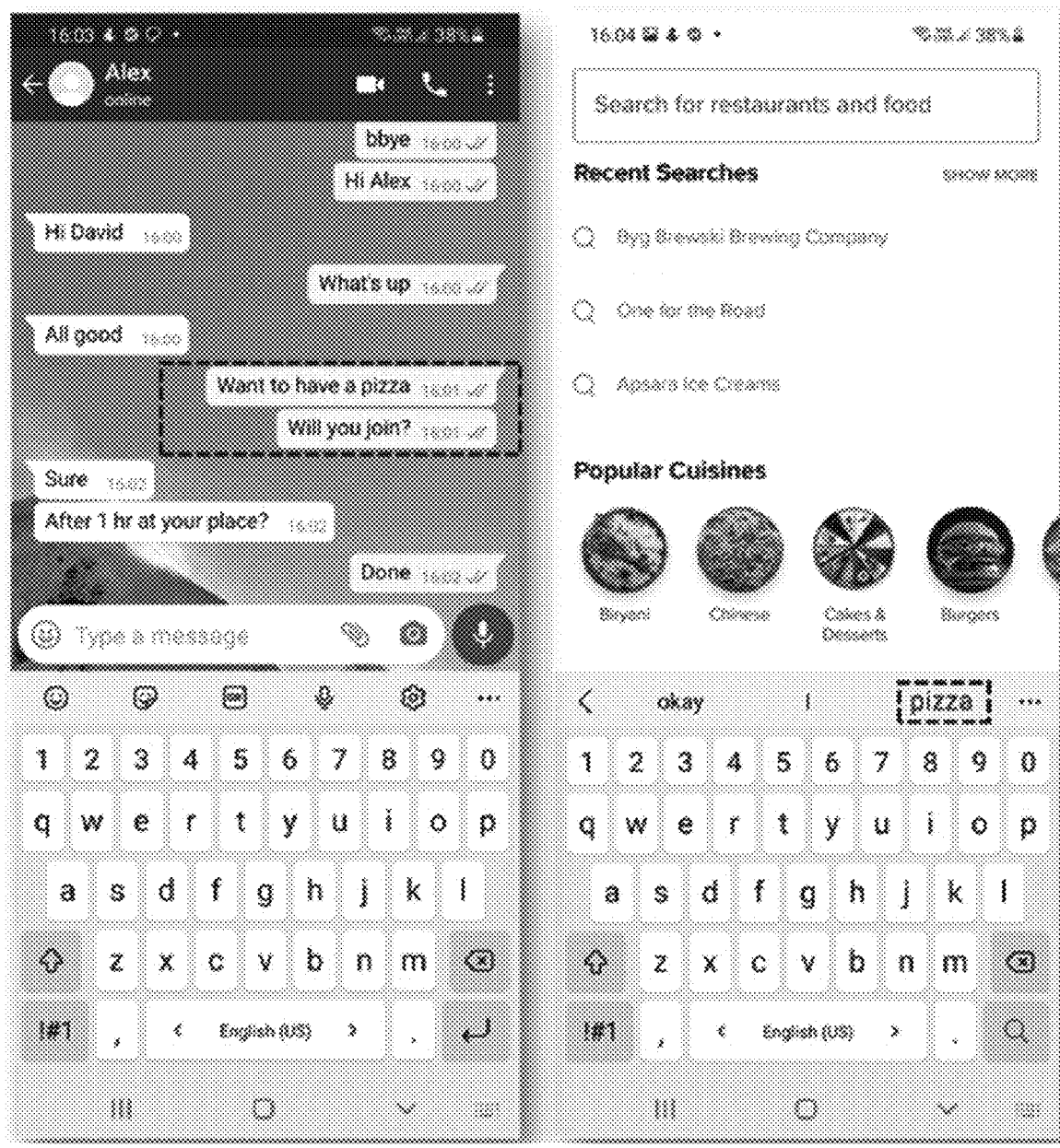

Also, FIGS. 16A, 16B, and 16C illustrate an example recommendation of input suggestion and connecting the actions simultaneously. As illustrated, input suggestions can be relationship extraction (FIG. 16A), interest extraction by response suggest (FIG. 16B) and fill suggest (16C).

Figure 17A:
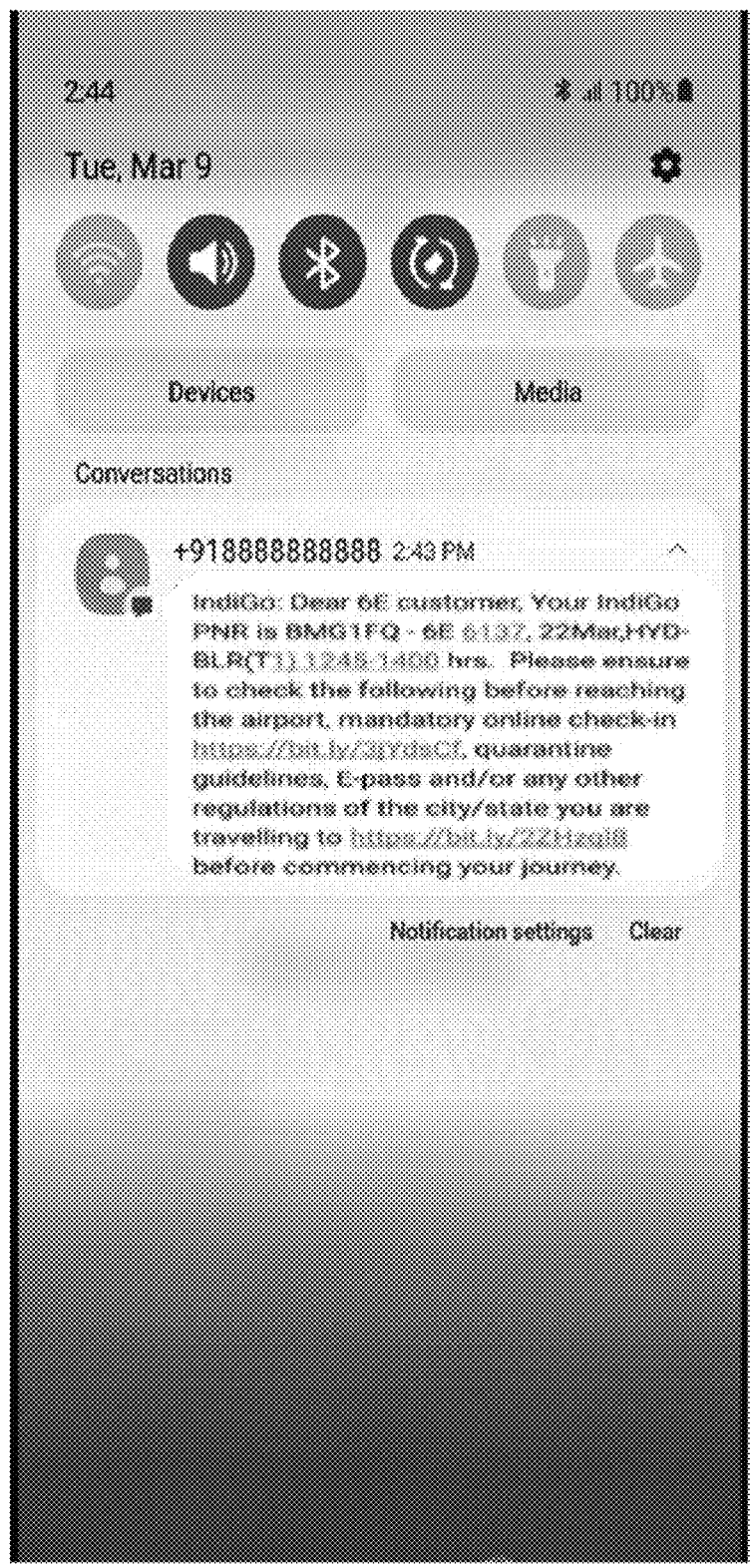
FIG. 17A illustrates an example in which the user device provides connected actions, according to various embodiments.

FIG. 17A illustrates an example in which a user device provides connected actions, according to various embodiments. Based on the existing method, upon receiving the content present in a notification text on the display screen of the user device 102, only web check-in action is shown/performed at present on the electronic device. The existing method performs only a static action or a predefined action only on the user device 102 and does not consider other app data, user behavior and other activity of the user.

Figure 17B:
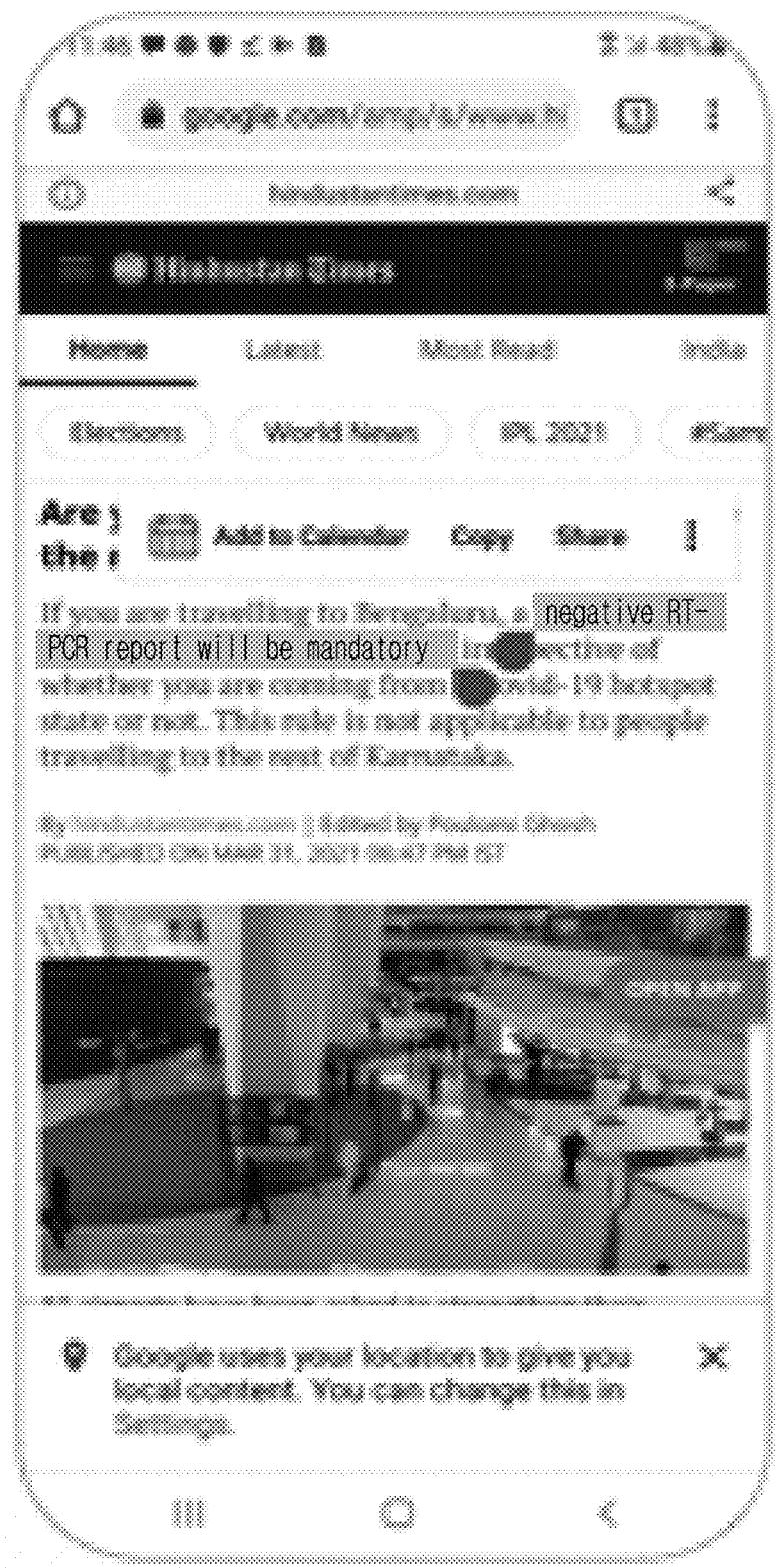
FIGS. 17B, 17C, and 17D illustrate an example in which a user device (i.e., electronic device) provides the connected actions by considering data available across applications, according to various embodiments.
Figure 17C:
Figure 17D:
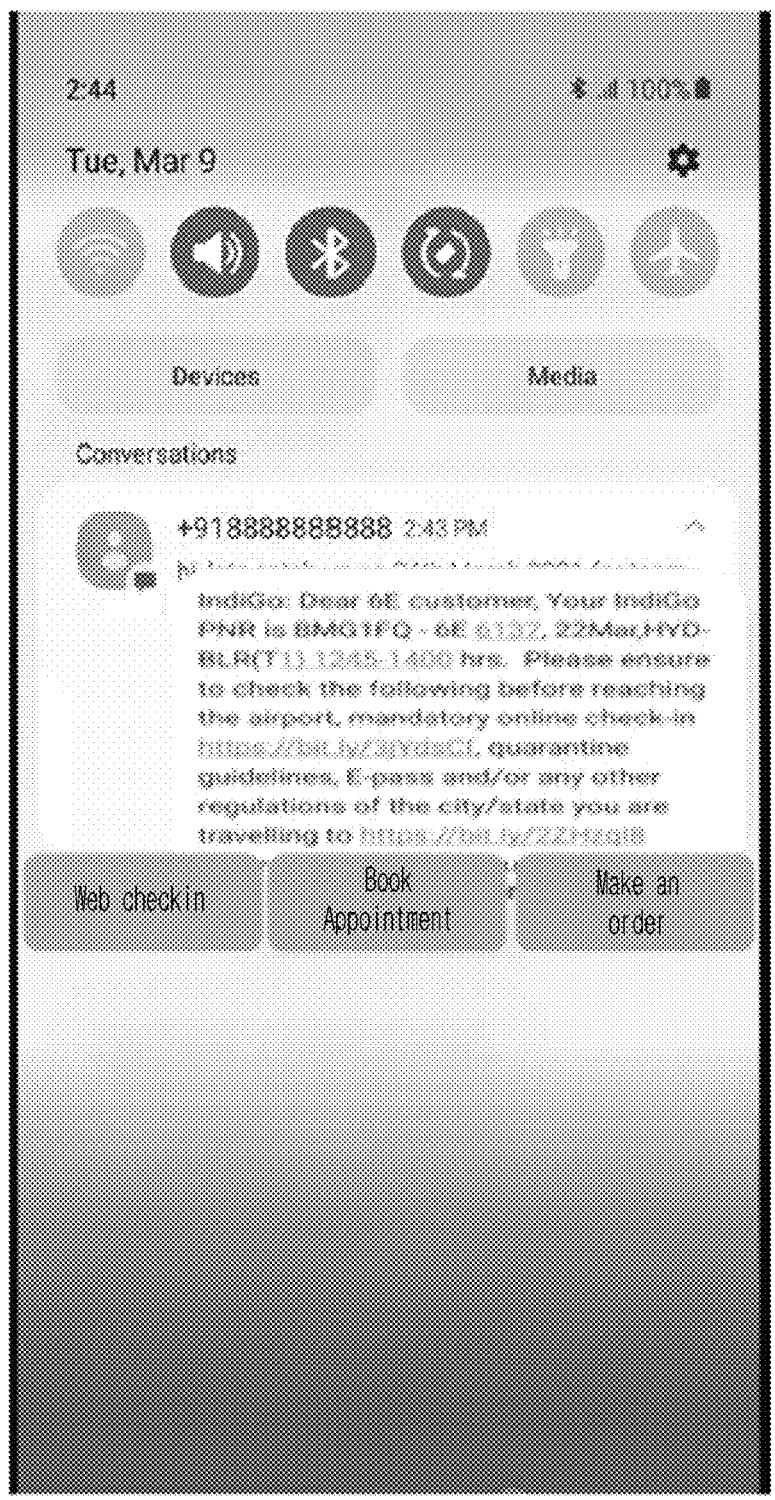
Figure 18:
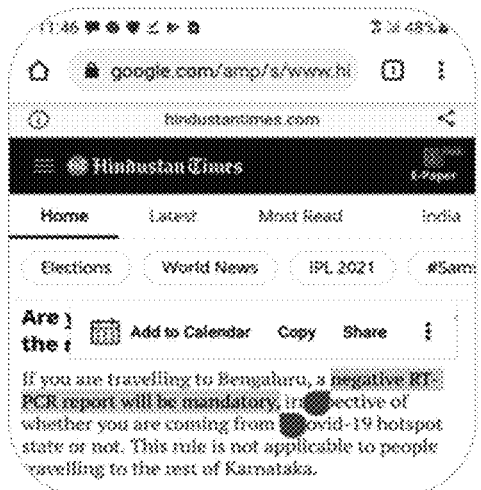
FIG. 18 and FIG. 19 illustrate an example in which an electronic device creates a data mashup model based on an available data, according to various embodiments.
Figure 18:
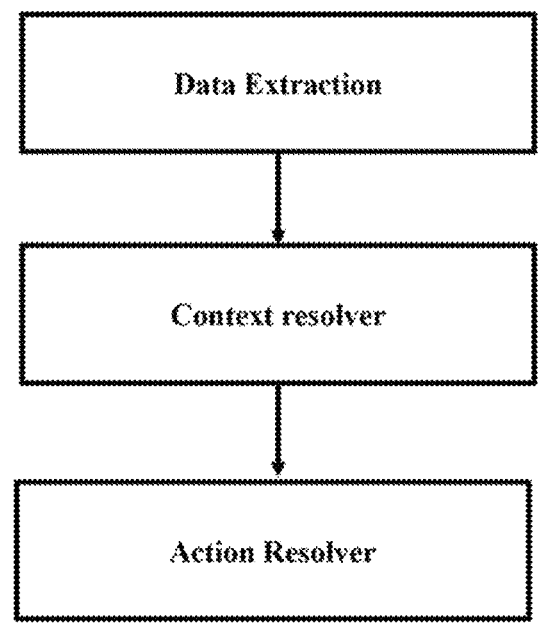
Figure 18:
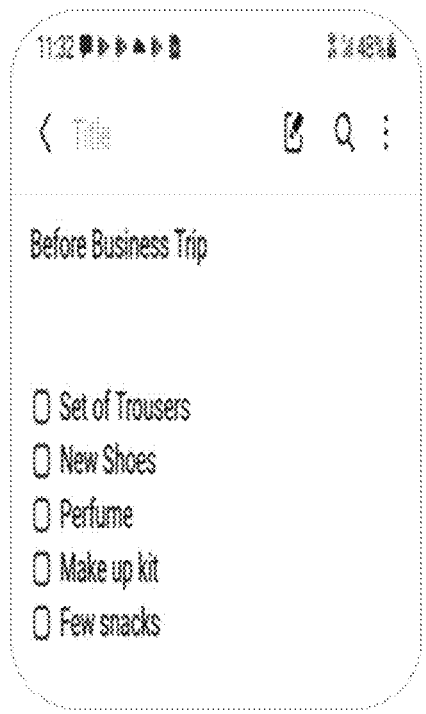

FIGS. 17B, 17C, and 17D illustrate an example of providing connected actions by considering data available across applications, according to various embodiments. Based on an embodiment, the content capture data collector and a clipboard data observer extracts test (RT-CPR) information to be done & city travelling to from copied text and data saved into the first application (e.g., travel booking application or the like). The data collector reads the application data from the databases and saved application data into platform with the type [travel] of information and entities [to shop]. The actions are formed by consolidating data from across apps [travel, city to travel, test to be done, shopping list] which are required at that point of time as shown in FIG. 18 When the user of the electronic device receives a flight notification and/or reminder along with a flight status from a flight service provider, the electronic device understands the previous screen that is read/text copied on the clipboard, which is mandatory to Travel Show Action as Book Appointment in Practo® based on Built In Intent which provides functionality for Clinical Tests(RT-CPR). The electronic device shows the action for "Make an order" [Amazon] by understanding content from Notes which user does before Travel. All actions are formed by consolidating data from across application [Travel, City to Travel, Test to be done, Shopping list] which are required at that point of time of travel.

Figure 19:
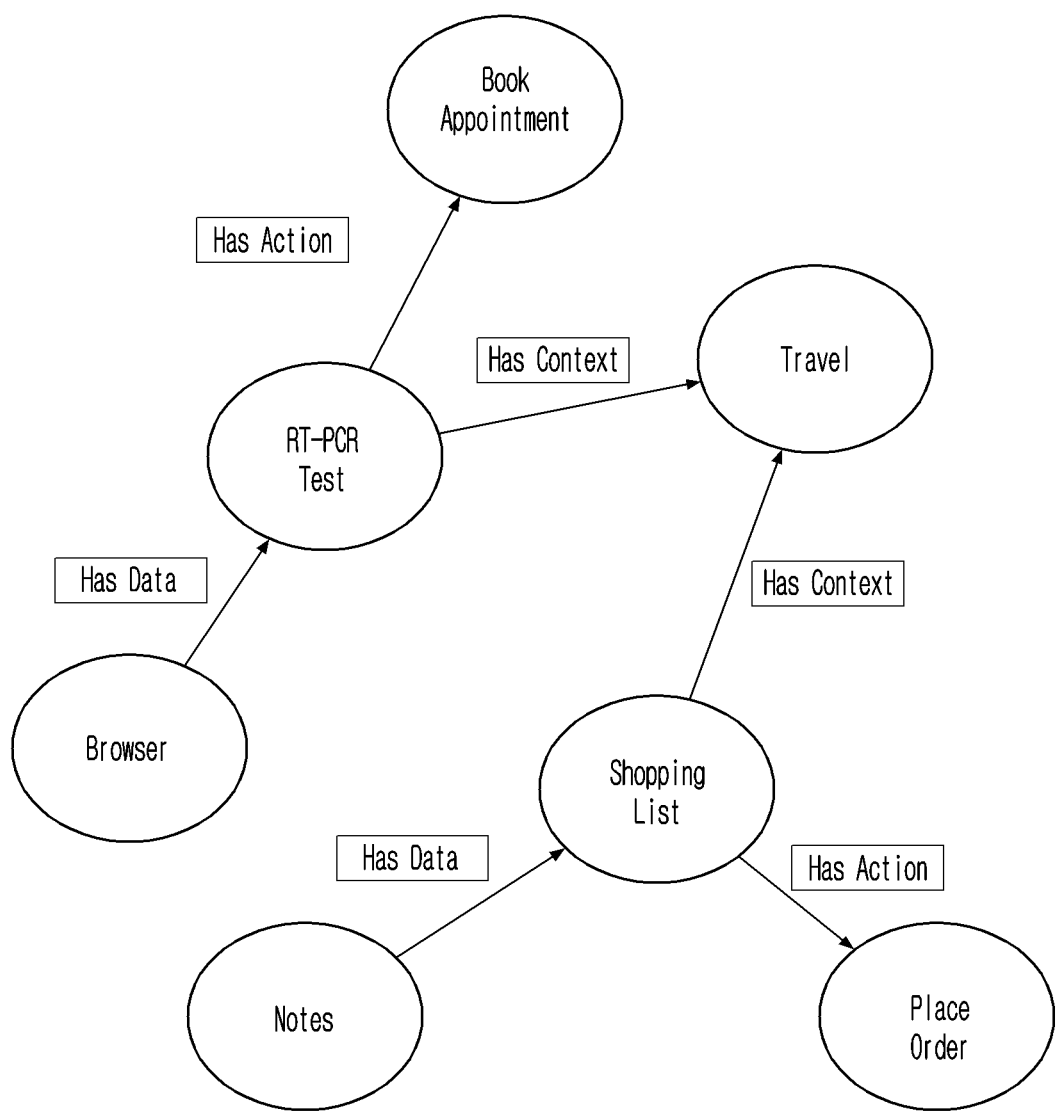

FIG. 18 and FIG. 19 illustrate an example in which an example electronic device creates a data mashup model based on an available data, according to various embodiments. The data converter (see FIG. 6) receives the various information from the different data sources (e.g., information that a PCR report is required while traveling from a news application/browser and a to-do list from a note application while traveling). Based on the received information from the different data sources, the data converter provides the data mashup model by identifying a plurality of types of the data (e.g., RT-PCR Test, shopping list) from the different data sources (e.g., web source, Browser), determining one or more relationships among the types the data, predicting one or more possible actions likely to be performed by a user as an outcome of the determined relationships and providing a suggestion to the user to pursue the one more actions (e.g., book appointment, travel, place order or the like) as a result of the prediction using the data extraction unit, the context resolver unit and the action resolver unit.

Figure 20:
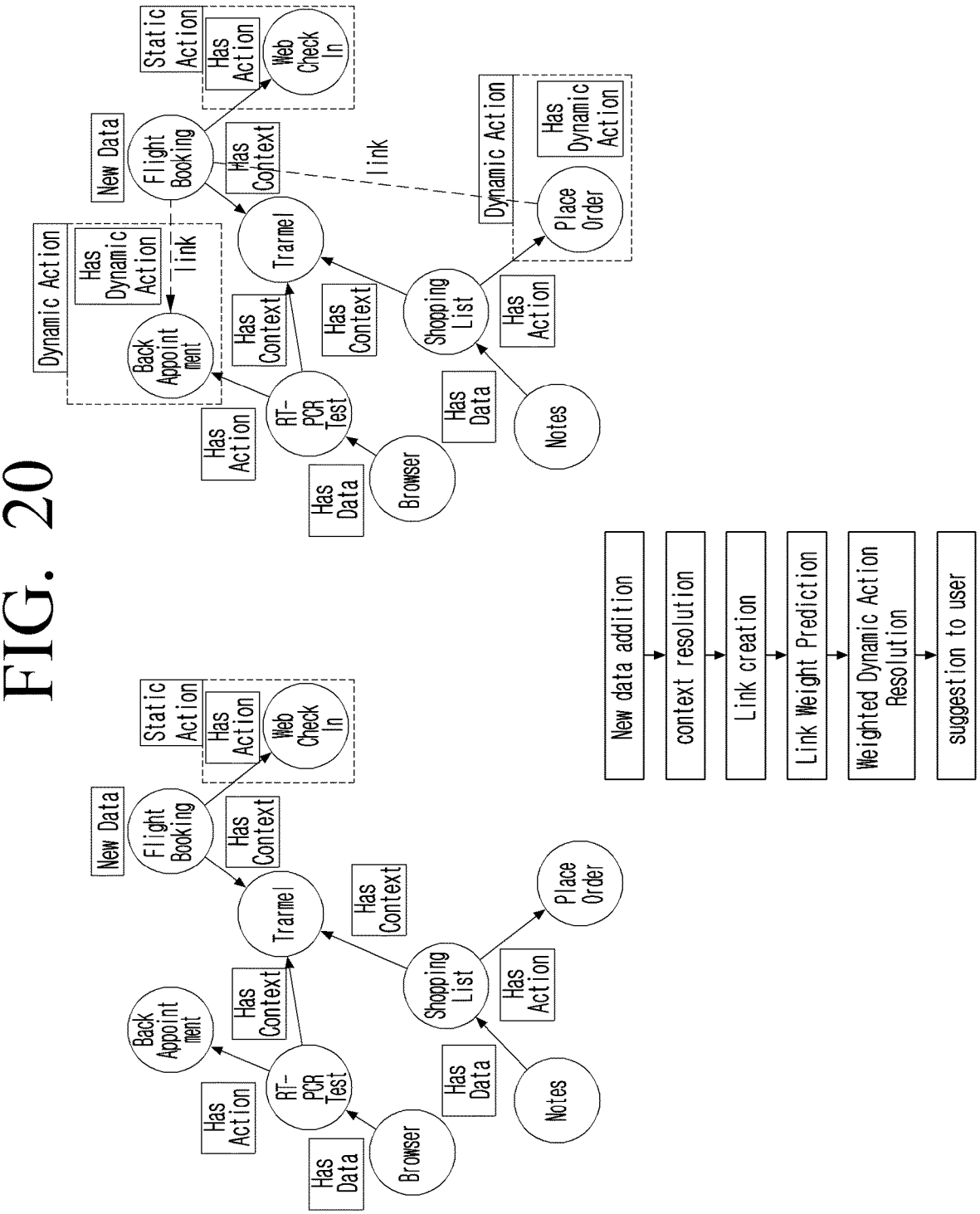
FIG. 20 illustrates an example in which an electronic device creates the data mashup model based on a new data, according to various embodiments.

FIG. 20 illustrates an example in which an electronic device creates the data mashup model based on a new data, according to various embodiments. The user device 102 receives the new data from the data source. Based on the proposed method, the method performs context resolution on the new data, creates a link for the new data, predicts a weight for the link, performs the weighted dynamic action resolution for the link, and provides the suggestion to the user. For example, the user device 102 receives, as new data, flight booking from a travel booking application. Based on the proposed method, the user device 102 determines the context as travel and creates a link between the RT-PCR Test from a news application and a shopping list from a notes application based on the screen based co-reference resolution. Further, the user device 102 suggests the action (e.g., book appointment, place the order or the like) to the user.

As illustrated, link creation makes details for a given input whether it has any context associated with it followed by any user actionable details. Context resolution is responsible for identifying the 2 different that are saved/newly received input text as similar kind of actionable information. Link weight has responsibility of calculating various link weights that are possible based on contexts that are mapped between 2 different Data.

Weighted Dynamic Action Resolution based on the Weights that are calculated which has various possibilities, WDAR maps to final Suggestion through Context association between the Data Nodes.

Figure 21:
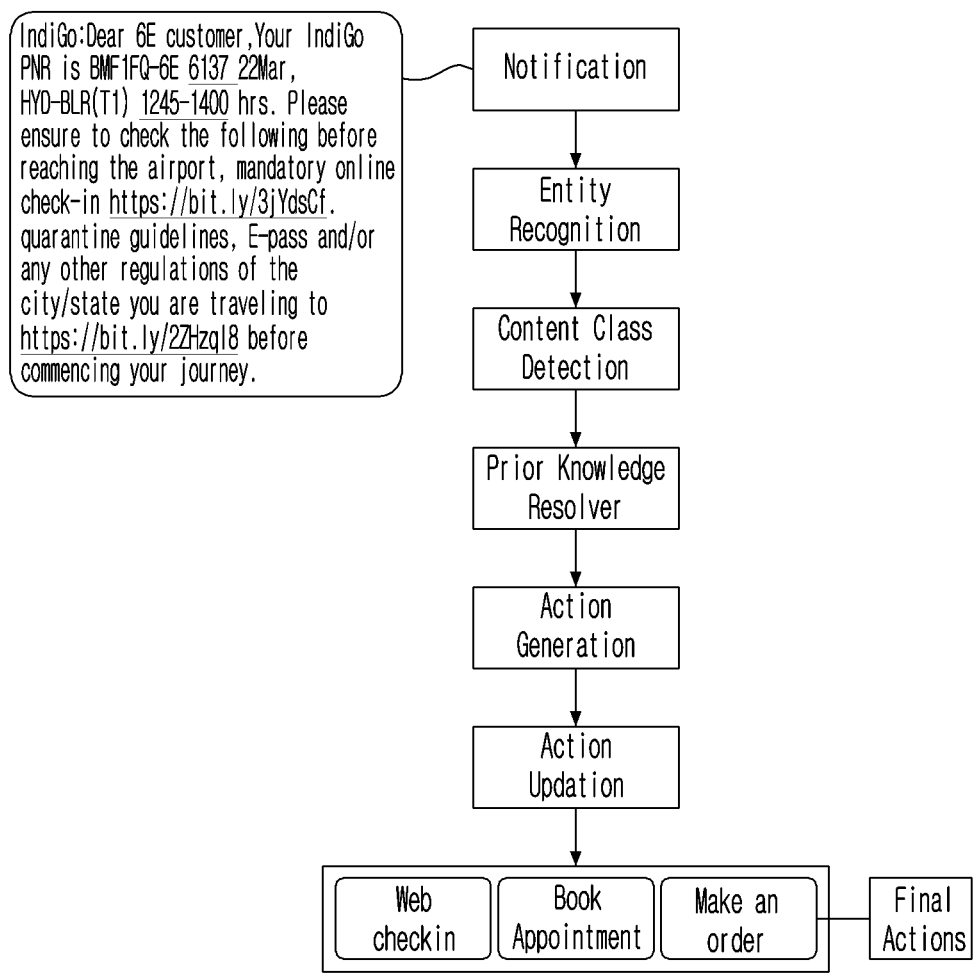
FIG. 21 illustrates an example in which an electronic device provides connected actions by considering data available across the applications, according to various embodiments.

FIG. 21 illustrates an example in which the electronic device provides connected actions by considering data available across the applications, according to various embodiments. Similar to the FIG. 20 example above, the user device 102 receives the notification and identifies the entity and the content class (e.g., <PNR : BMF1FQ-6E 6137, Date : Mar. 22, 2021 12:45—1300, Check in Link : https://bit.1y/3jYdsCf, Info Link: https://bit.1y/2ZHzqI8, Destination : Bangalore, Origin : Hyderabad >). Based on the content class, the user device 102 determines the content type (e.g., Travel, Reminder) using the prior knowledge resolver. Based on the content type, the electronic device links the various activities of the user (i.e., <Screen Activity : Browser, Clipboard : RT-CPR, Notes—Business Trip >, <App Capability : (Medical Test : Practo, Shopping : Amazon Taxi : Ola) >). Based on link generation, the user device 102 suggests the action (i.e., <Possible Actions : Web CheckIn, Book Appointment, Taxi Booking, Weather at Bangalore, Make Order>) and prioritizes the order or updates the order based on user requirements.

Figure 22A:
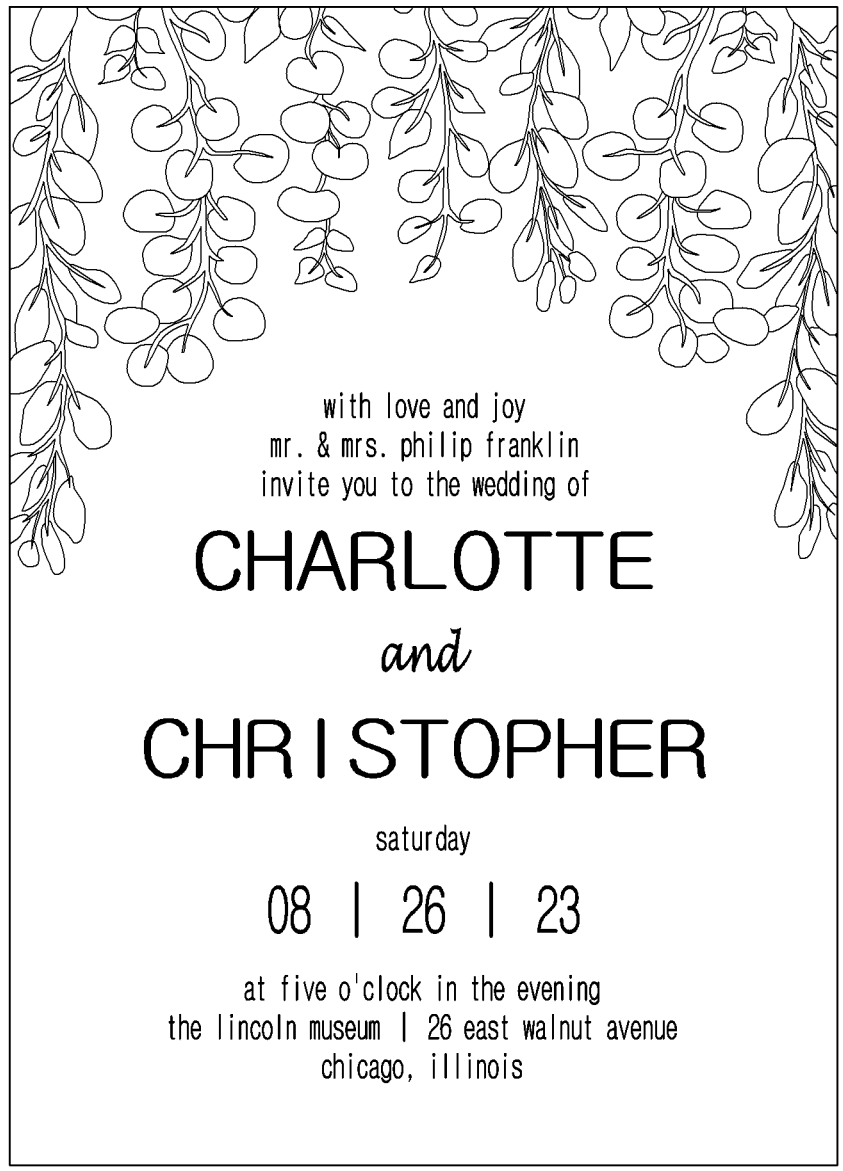
FIGS. 22A, 22B, and 22C illustrate an example in which an electronic device provides connected actions (in application) by considering data available across the applications, according to various embodiments.
Figure 22B:
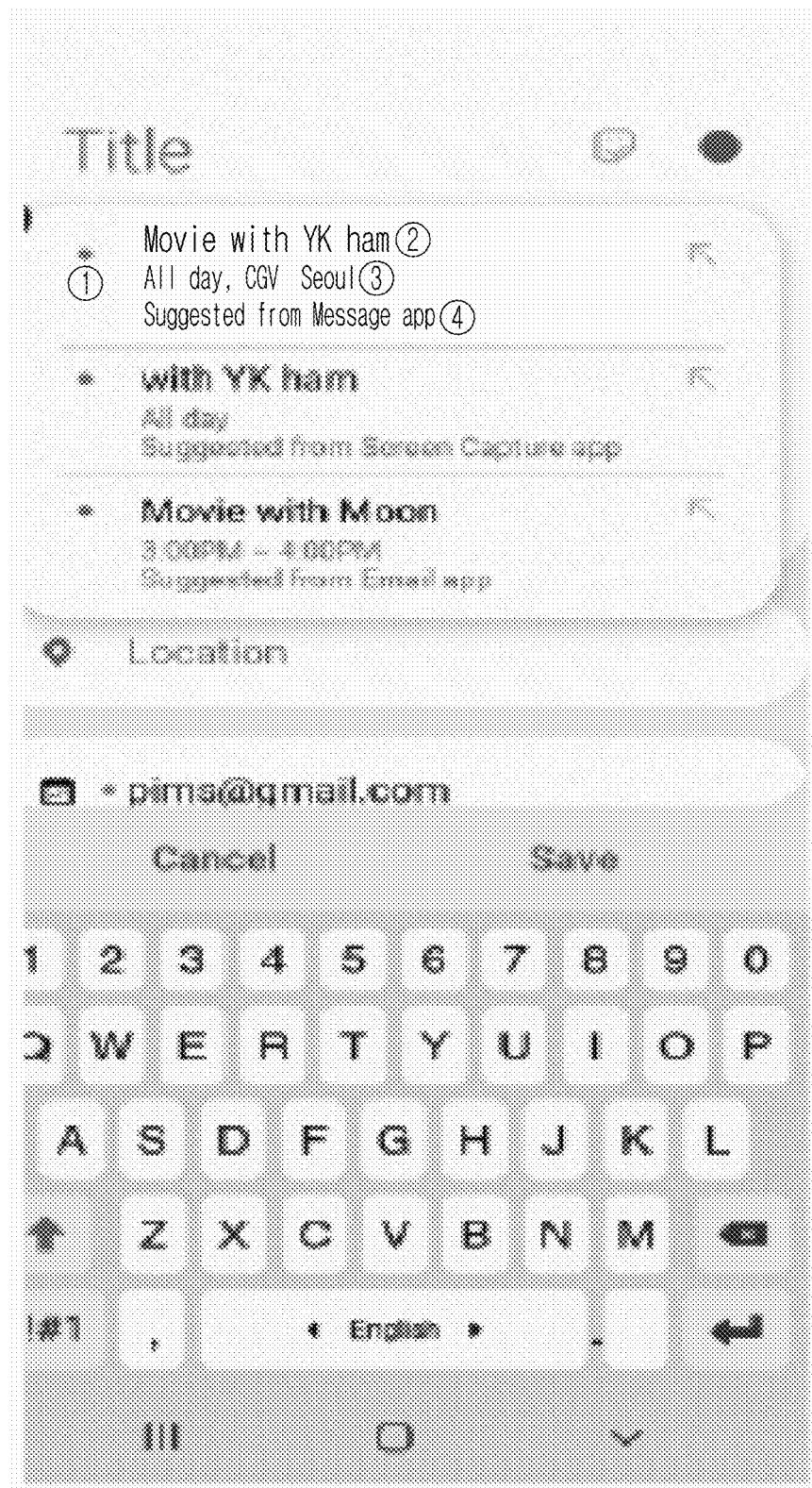
Figure 22C:
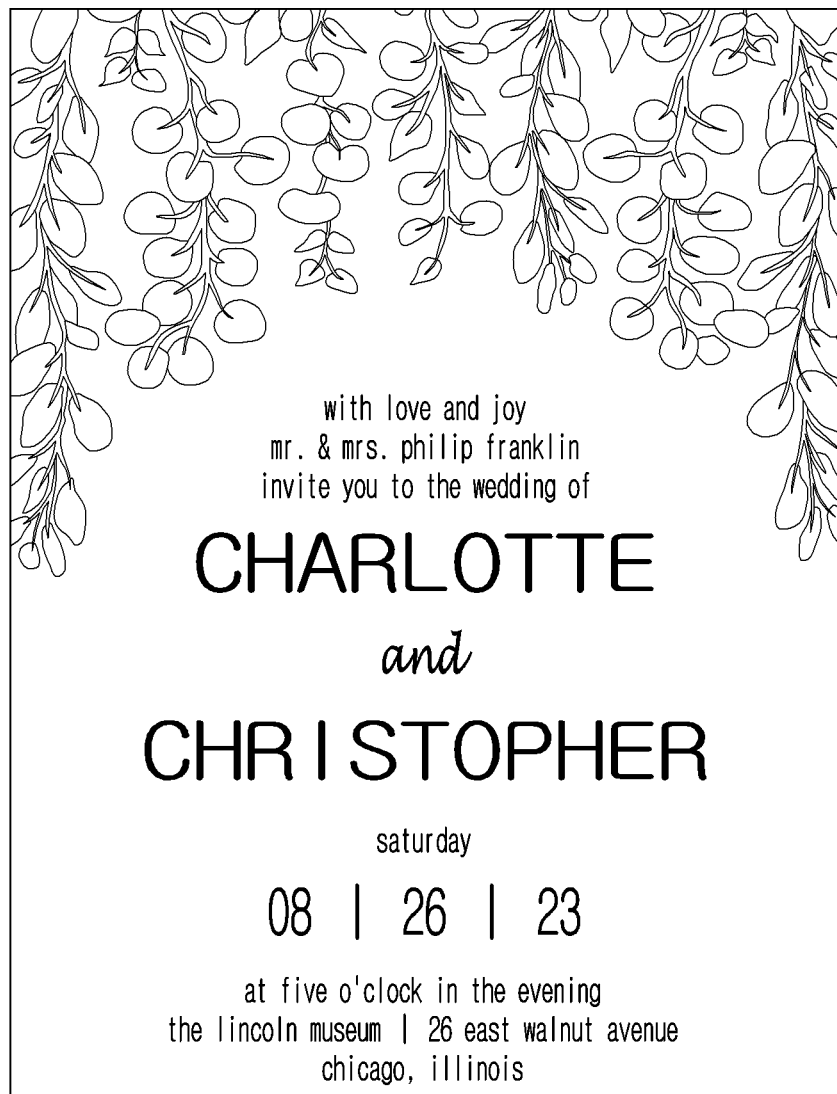

FIGS. 22A, 22B, and 22C illustrate an example in which the electronic device provides connected actions (in application) by considering data available across the applications, according to various embodiments. The user device 102 provides the connected actions (InApplication) by considering data available across applications.

FIG. 22A illustrates the media image received in the user device 102 for a wedding invitation. Based on the received media image, in FIG. 22B, when the user moves to a calendar application, a suggestion will be provided to Create Event based on data received in the background through media image. FIG. 22C, when the user views the media image and event created with image +context, actions for navigation and weather check will be suggested.

Figure 23:
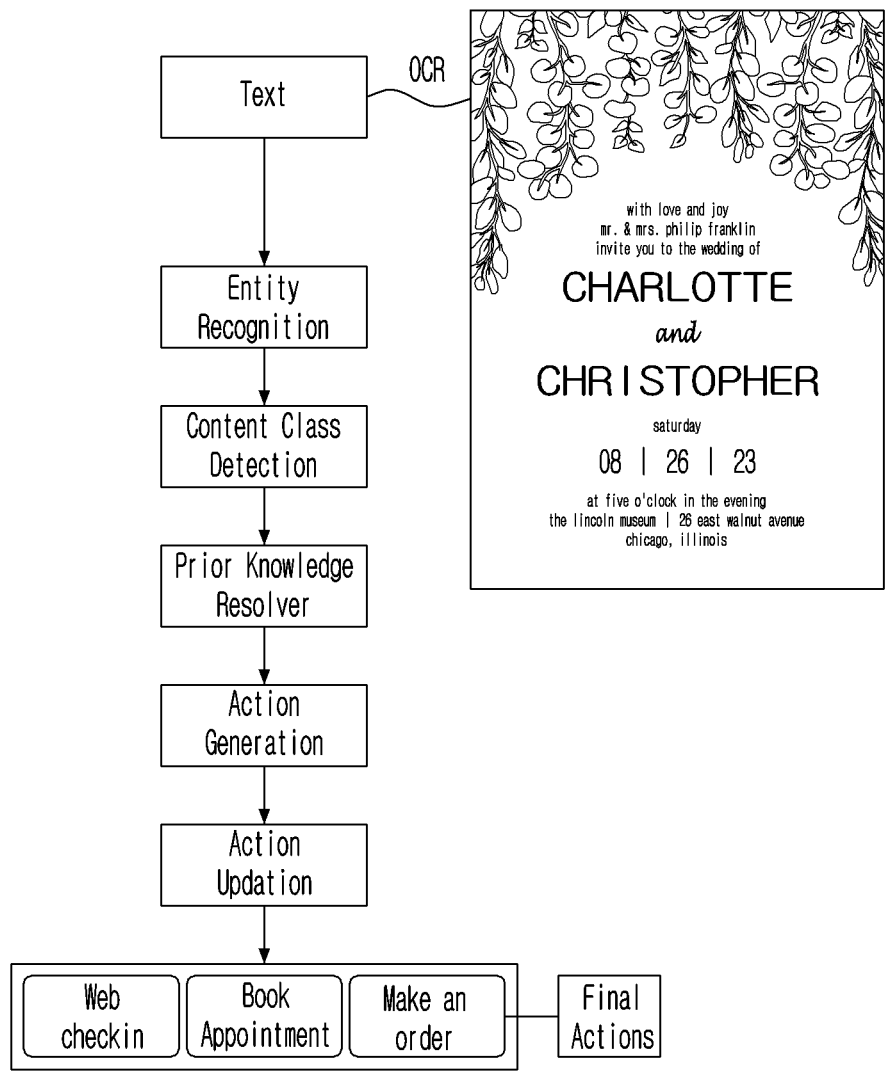
FIG. 23 illustrates an example in which an electronic device provides connected actions by considering data available across applications, according to various embodiments.

FIG. 23 illustrates an example in which the electronic device 102 provides connected actions by considering data available across applications, according to various embodiments. Similar to the example shown in FIGS. 22A, 22B, and 22C, the user device 102 receives the media image and identifies the entity and the content class (e.g., <Person Name : Christopher, Date :Mar. Aug. 26, 2023, Location Lincoln Museum >). Based on the content class, the user device 102 determines the content type (e.g., event creation) using the prior knowledge resolver. Based on the content type, the electronic device links the various activity of the user (i.e., <Screen Activity : Media, Location, ><App Capability : (Create Event: Calendar, Start Navigation : Map Taxi : Ola) >). Based on the link generation, the user device 102 suggests the action (i.e., <Possible Actions : Create Event, Start Navigation, Taxi Booking, Weather Check >) and prioritizes the order or updates the order based on the user requirement.

Figure 24:
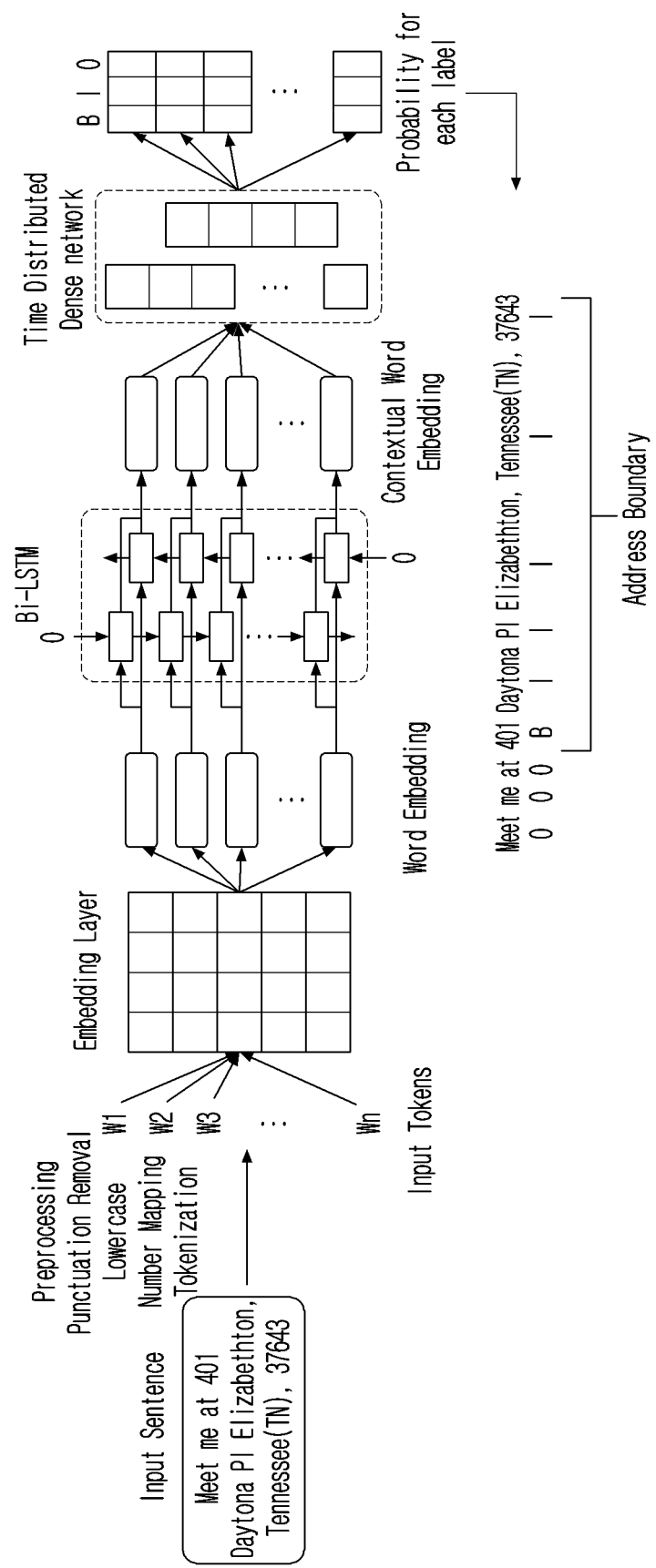
FIG. 24 illustrates an example in which a DNN based Model extracts entities from a received input, according to various embodiments.

FIG. 24 illustrates an example in which a DNN based Model extracts entities from a received input, according to various embodiments. The DNN based Model includes a pre-processing layer, an embedding layer and a time distributed dense network.

The DNN based Model for extracting entities from the Received Input, DNN Machine Learning Model which is used to extract the entities, DNN model to extract entities from a given Input.

Figure 25:
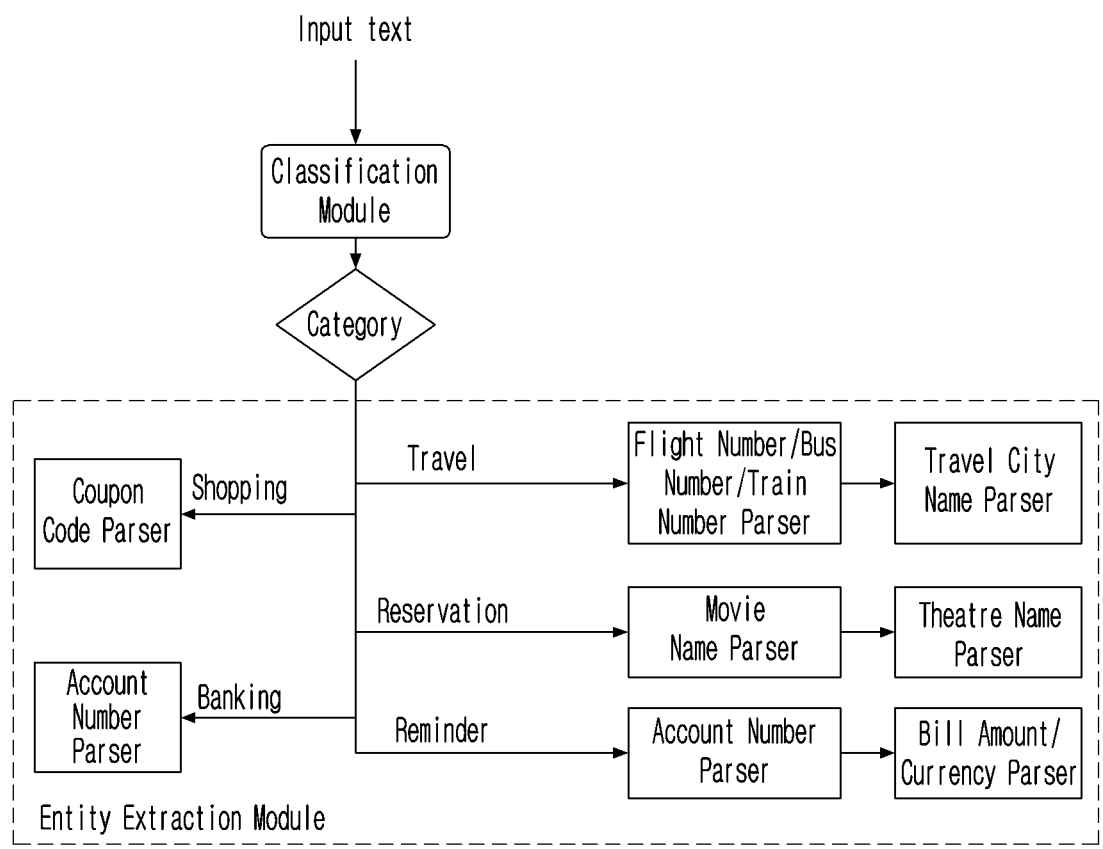
FIG. 25 illustrates an example in which a RegEx based parser extracts entities from a received input, according to various embodiments.

FIG. 25 illustrates an example in which a RegEx based parser extracts entities from a received input, according to various embodiments. The classification model receives the input and determines the category based on the received input. In an example, the category can be, travel, shopping, banking, reminder, reservation or the like. The classification model is trained using ML model or the AI model.

Figure 26:
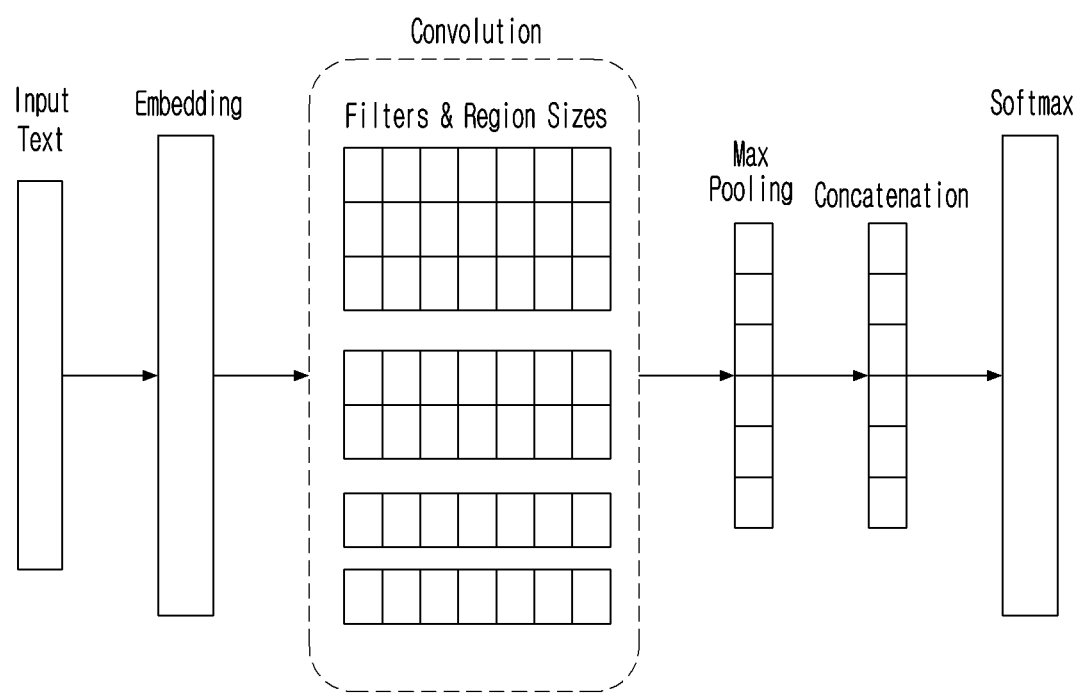
FIG. 26 illustrates a CNN model, according to various embodiments.

FIG. 26 illustrates a CNN model, according to various embodiments. The convolutional neural network includes the embedding layer, the convolutional layer, the max pooling layer, a concatenation layer and a softmax layer. The embedding layer is a class of approaches for representing words and documents using a dense vector representation. The embedding layer is initialized with random weights and will learn an embedding for all of the words in a training dataset. The convolutional layer receives the output of the embedding layer and feeds to the maximum pooling layer.

The maximum pooling layer performs a pooling operation that calculates the maximum, or largest, value in each patch of each feature map. The results are down sampled or pooled feature maps that highlight the most present feature in the patch, not the average presence of the feature in the case of average pooling. A concatenation layer takes inputs and concatenates them along a specified dimension. The Softmax layer performs a mathematical function that converts a vector of numbers into a vector of probabilities, where the probabilities of each value are proportional to the relative scale of each value in the vector.

Figure 27:
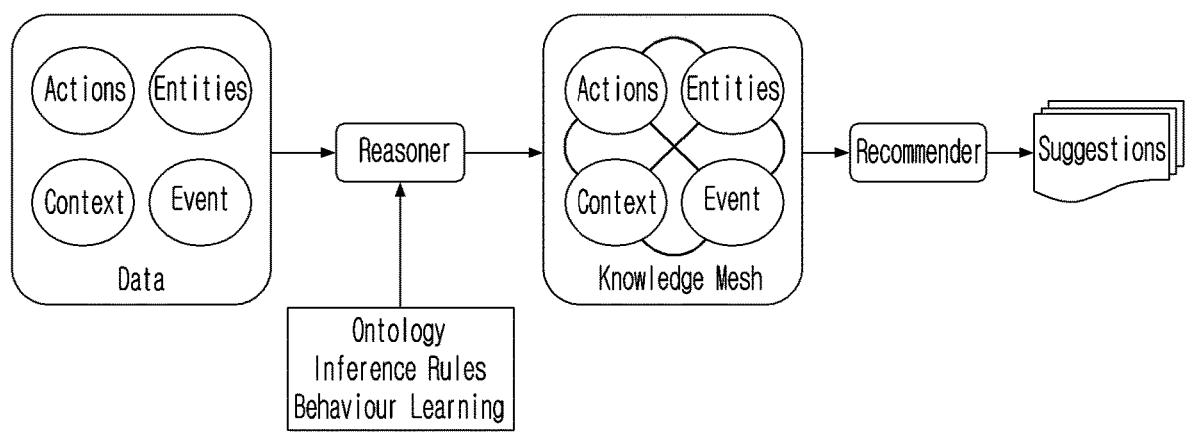
FIG. 27 and FIG. 28 illustrate an example in which an electronic device provides the actionable suggestions from the received data, according to various embodiments.
Figure 28:
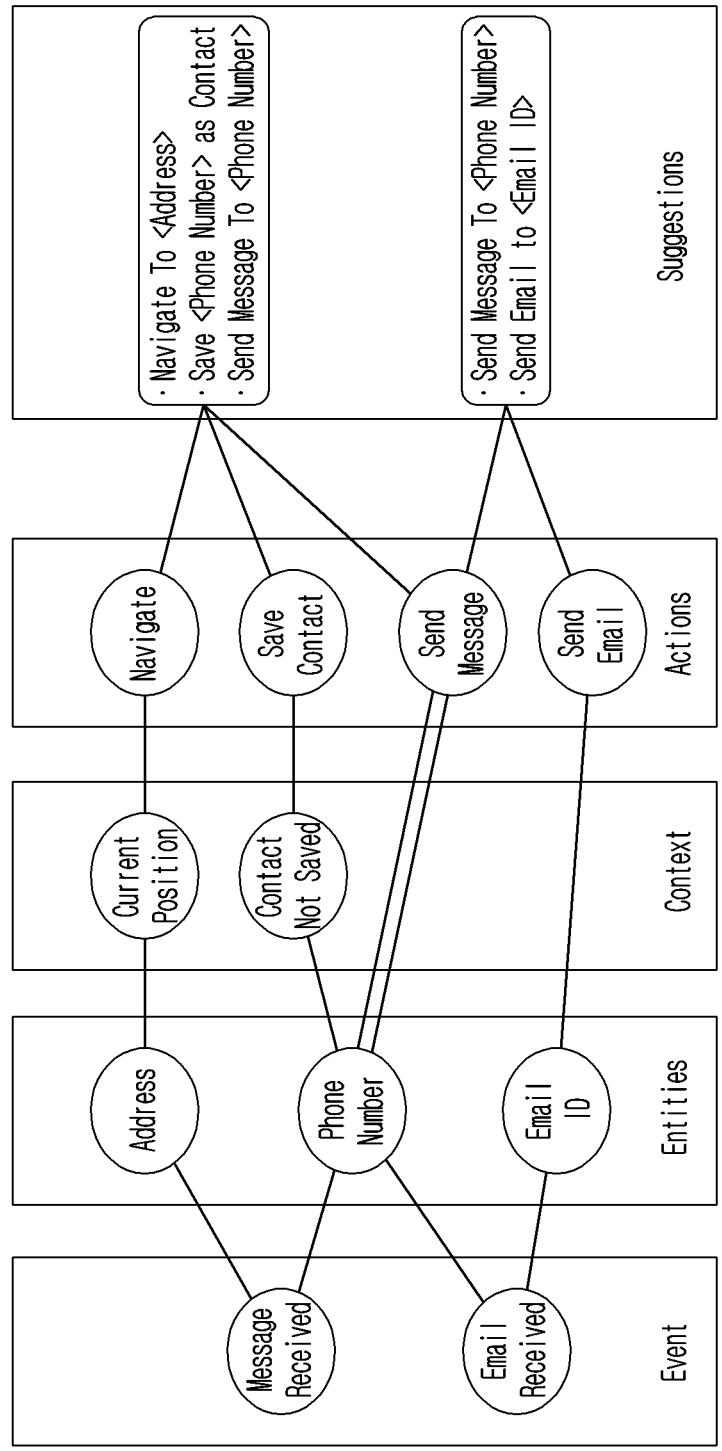

FIG. 27 and FIG. 28 illustrate an example in which the electronic device provides actionable suggestions from the received data, according to various embodiments. The user device 102 receives the data including actions, entities, context and event and generates a knowledge mesh using an ontology inference rules behaviour learning technique. The ontology inference rules behaviour learning technique determines the semantic mapping rules that integrate learning resources from different data sources/systems and that cope with semantic and structural conflicts. The ontology inference rules behaviour learning technique is defined to support a semantic search for heterogeneous learning resources, which are deduced by a rule-based inference. The user device provides the suggestion to user based on the knowledge mesh.

In an example, the user device 102 receives the message and image including the address, phone number and email ID and generates the knowledge mesh for the address, phone number and email ID using an ontology inference rules behaviour learning technique. Based on the knowledge mesh, the user device 102 provides the suggestion (e.g., Navigate, Save Contact, Send Message or Send email) to user.

Figure 29:
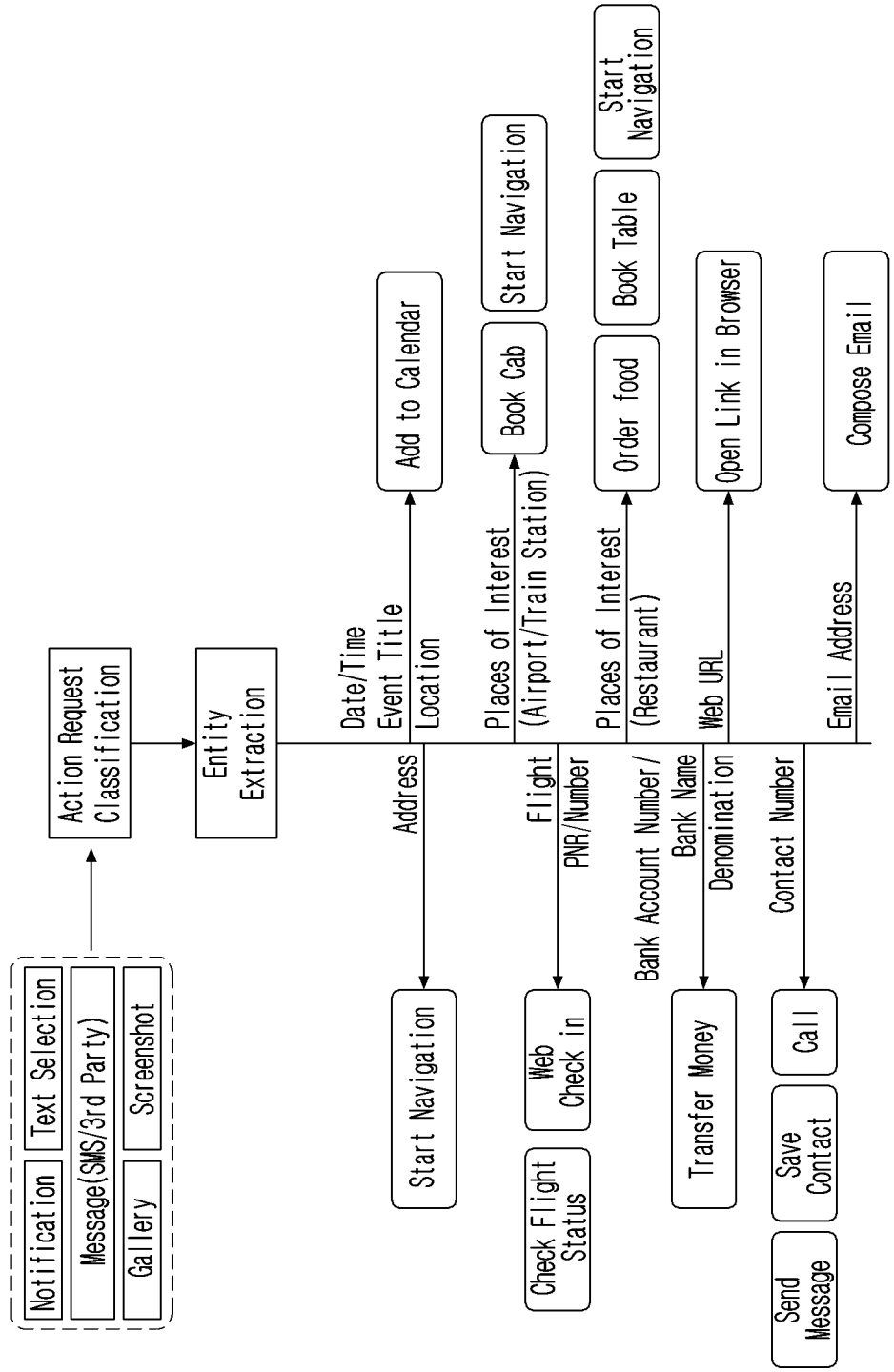
FIG. 29 illustrates an example in which an electronic device performs actions mappings based on the entities available in the contents, according to various embodiments.

FIG. 29 illustrates an example in which the user device 102 performs actions mappings based on the entities available in the contents, according to various embodiments. Based on the suggestion (discussed above), the actions mappings are performed based on the entities available in the contents. The actions mappings can be, for example, but not limited to "add to calendar", "book cab", "order food", "compose email" or the like.

Figure 30:
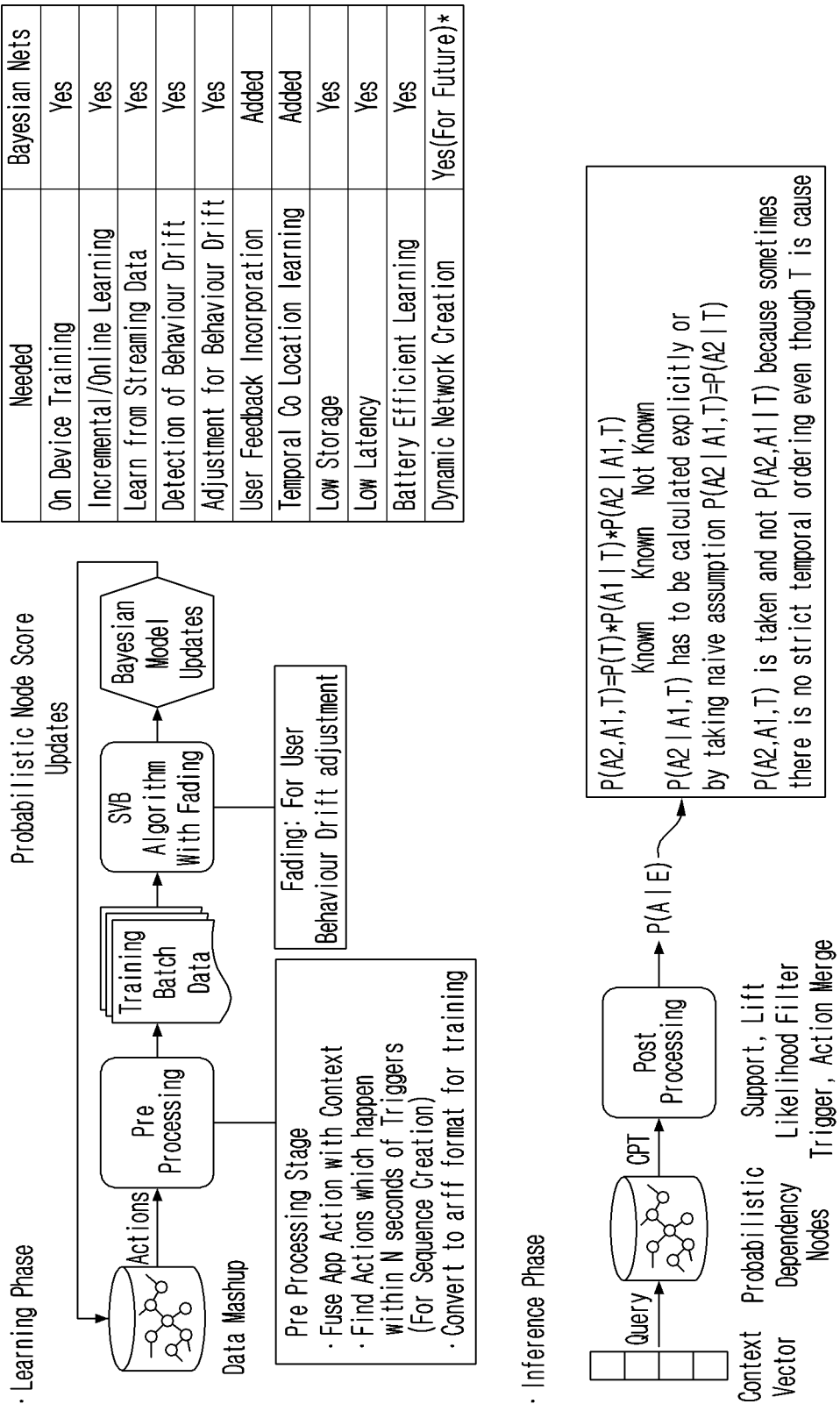
FIG. 30 illustrates an example in which operations of a reasoning engine is depicted, according to various embodiments.
Figure 31A:
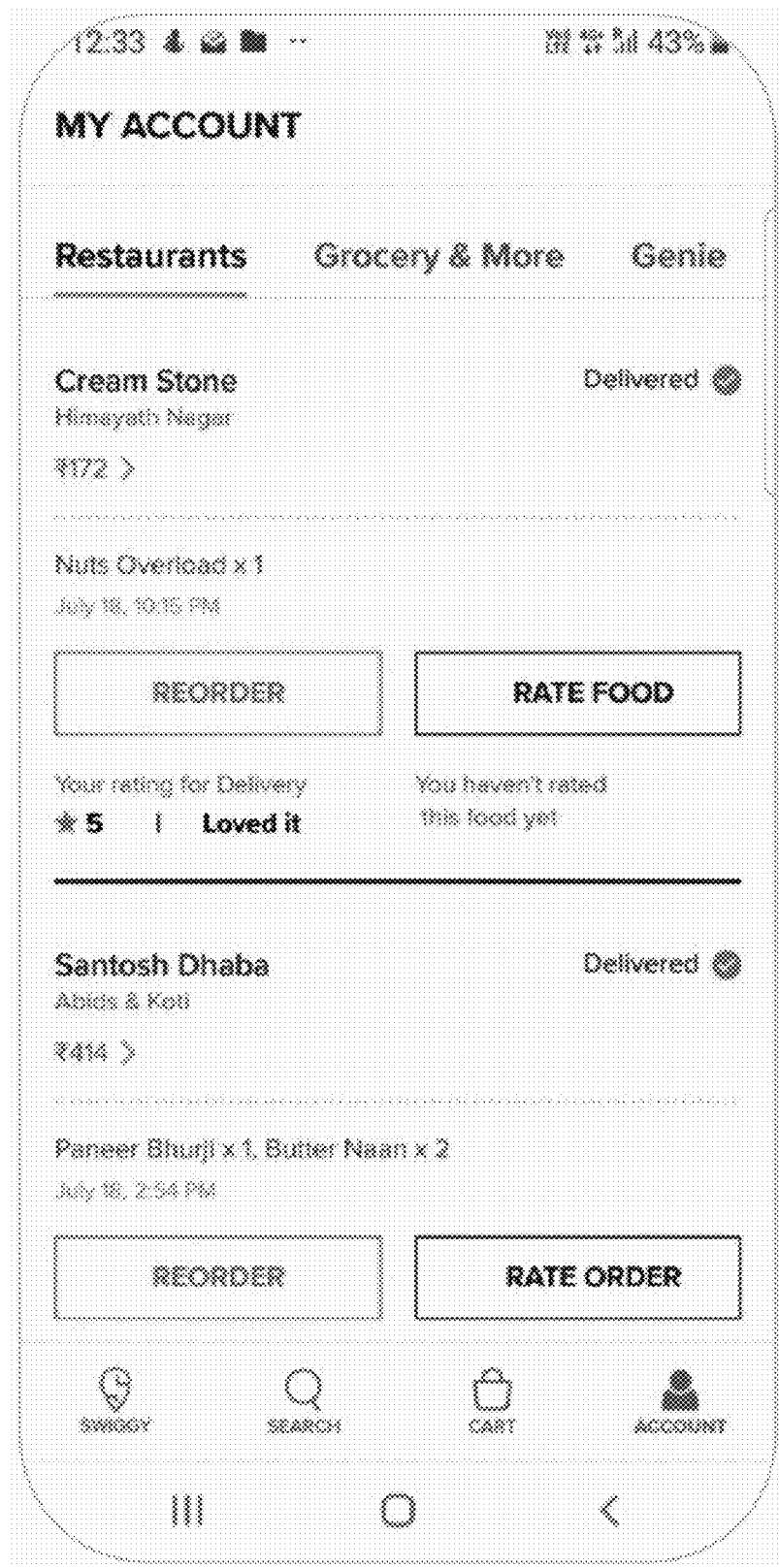
FIGS. 31A, 31B, 32A, and 32B illustrate an example in which an electronic device provides connected actions by considering data available across the applications, according to various embodiments.
Figure 31B:
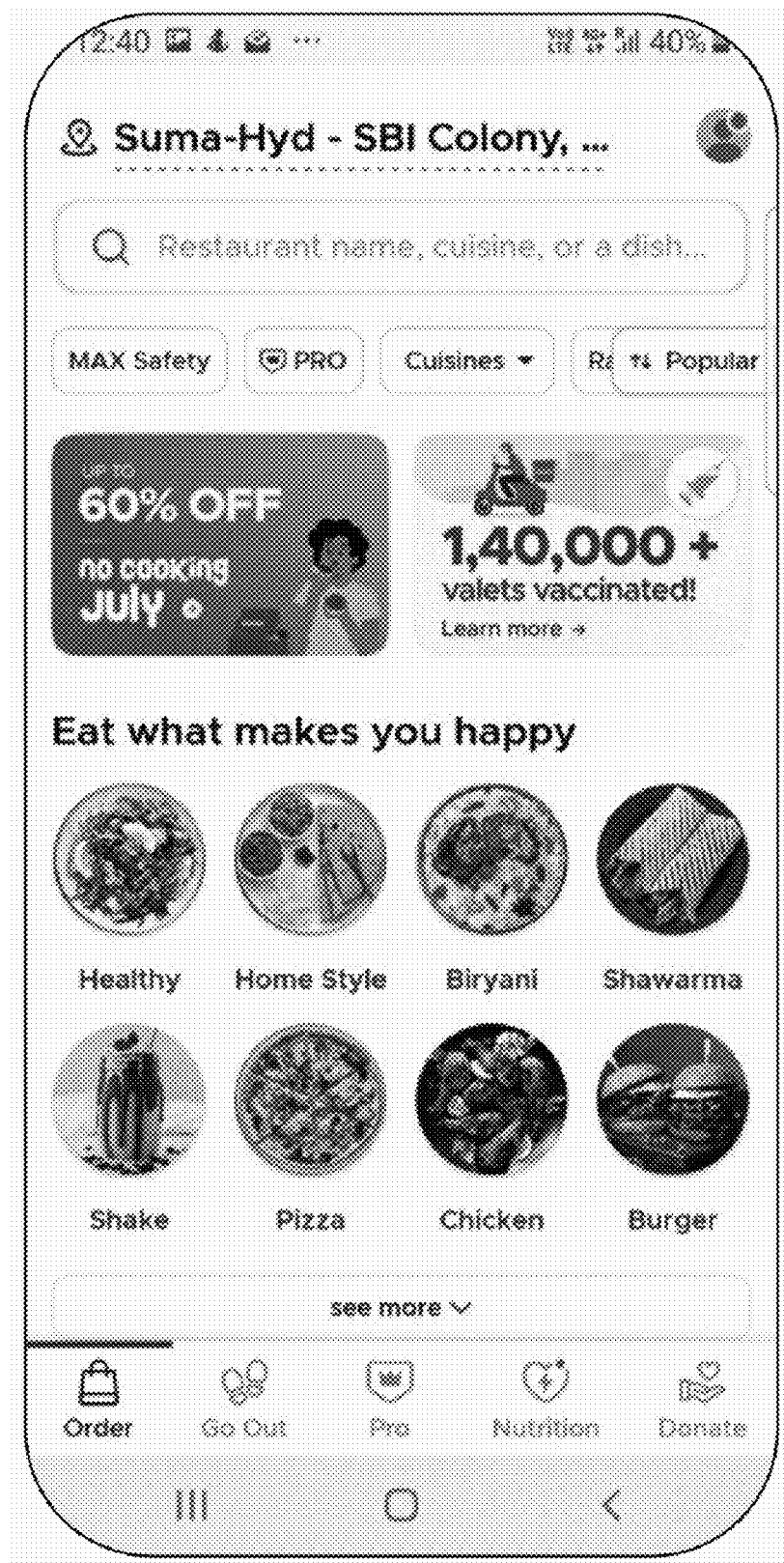
Figure 32A:
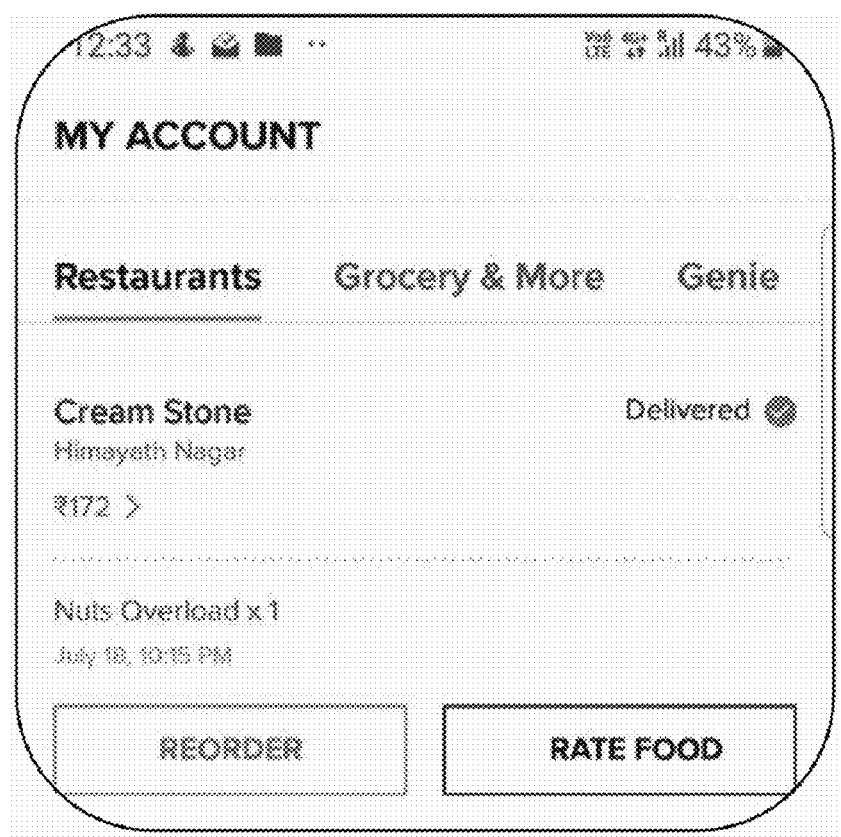
Figure 32B:
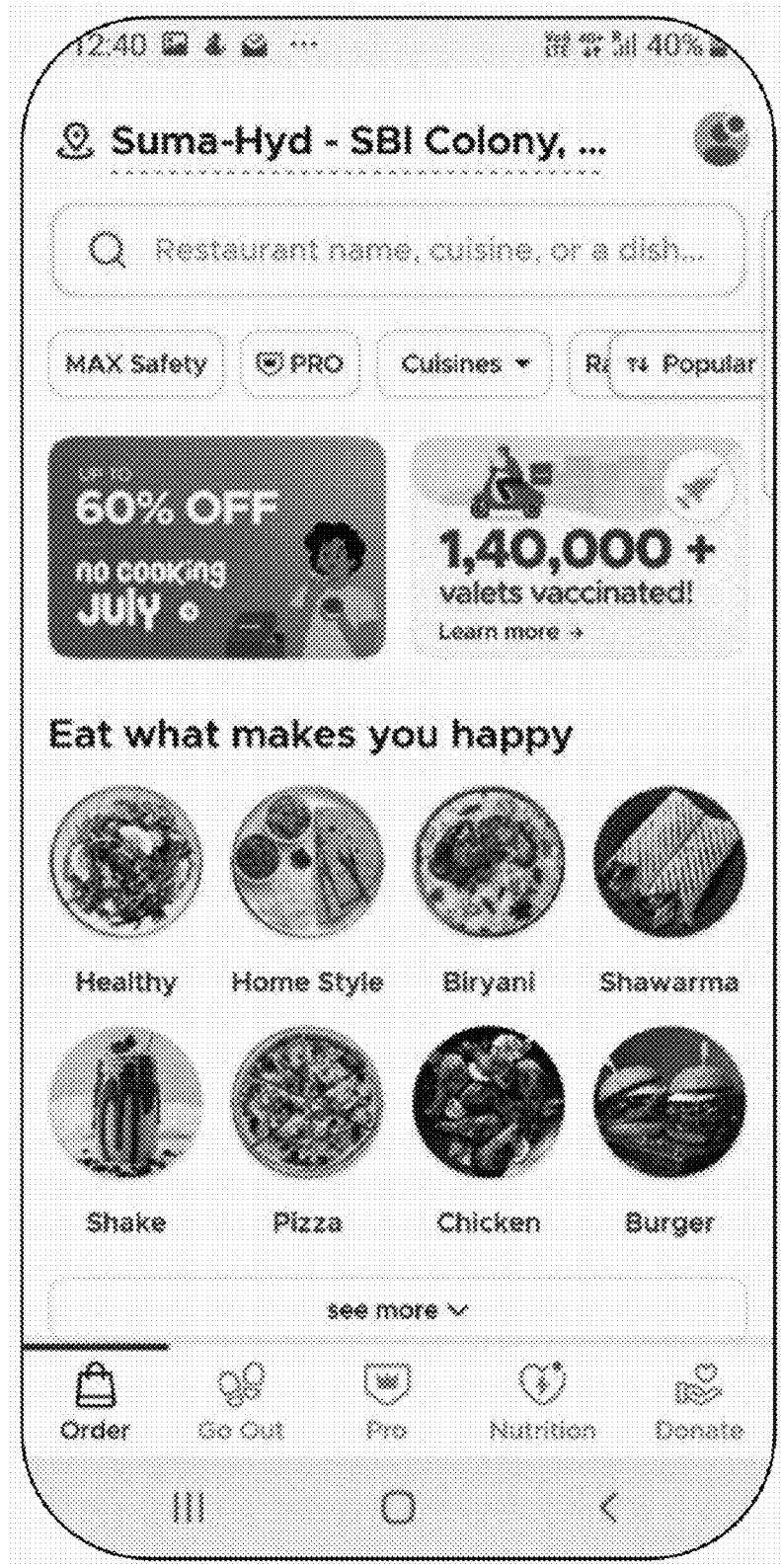
Figure 33A:
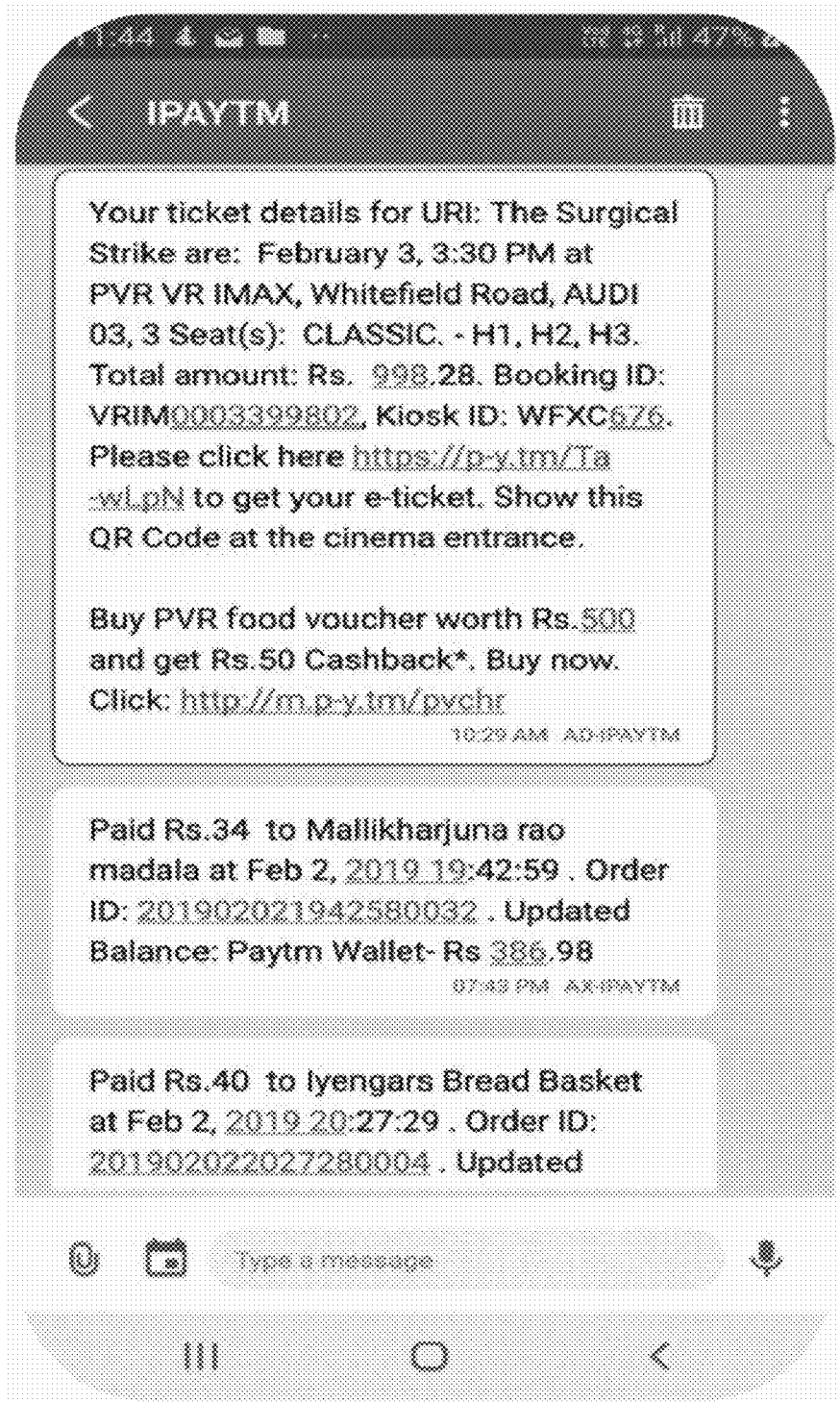
FIGS. 33A, 33B, 34A, and 34B illustrate an example in which an electronic device provides connected actions by propagating actions to a connected device, according to various embodiments.
Figure 33B:
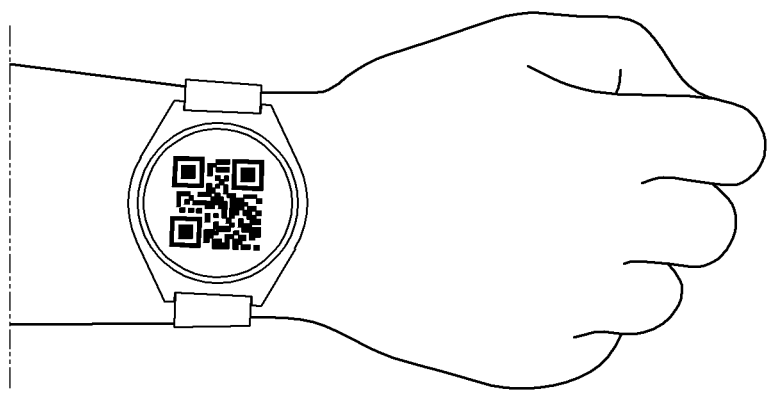
Figure 34A:
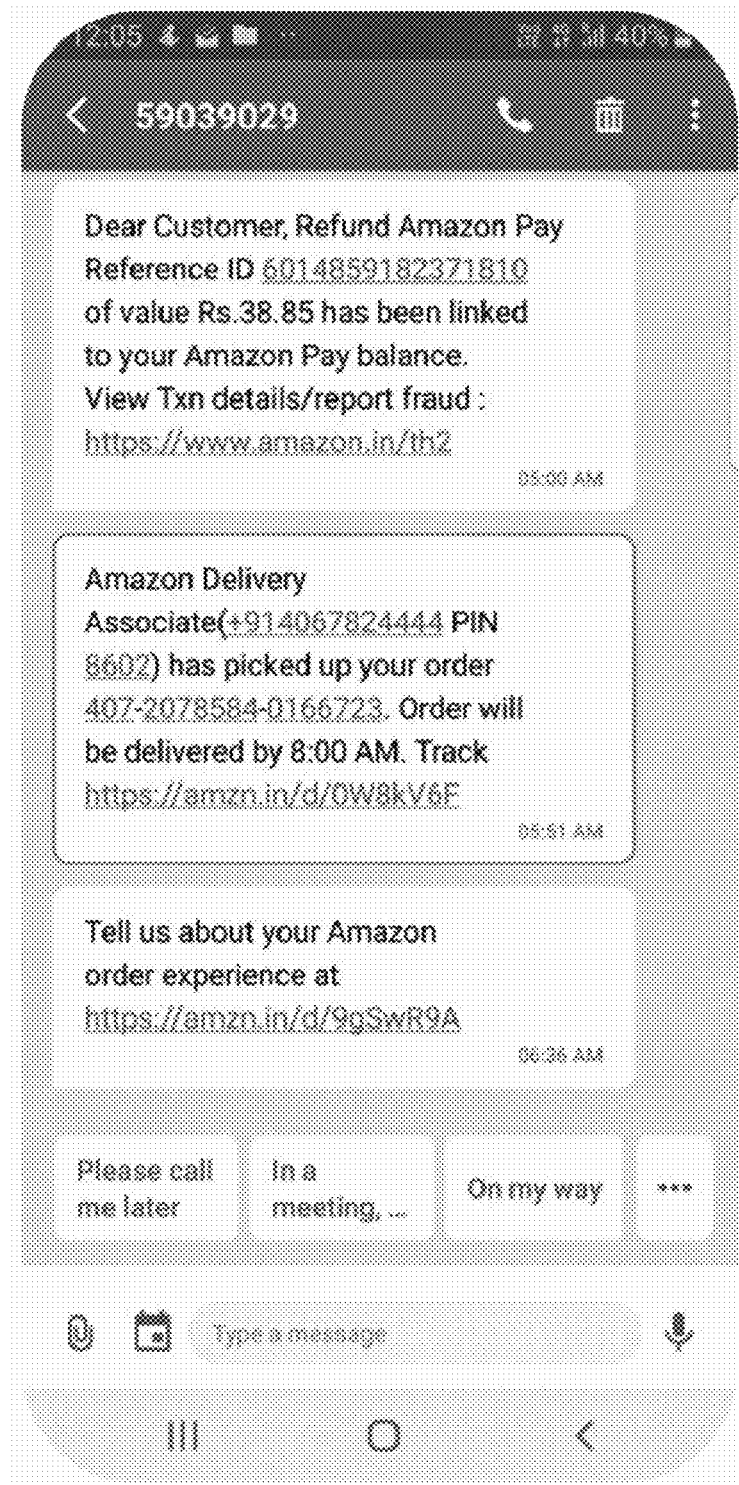
Figure 34B:
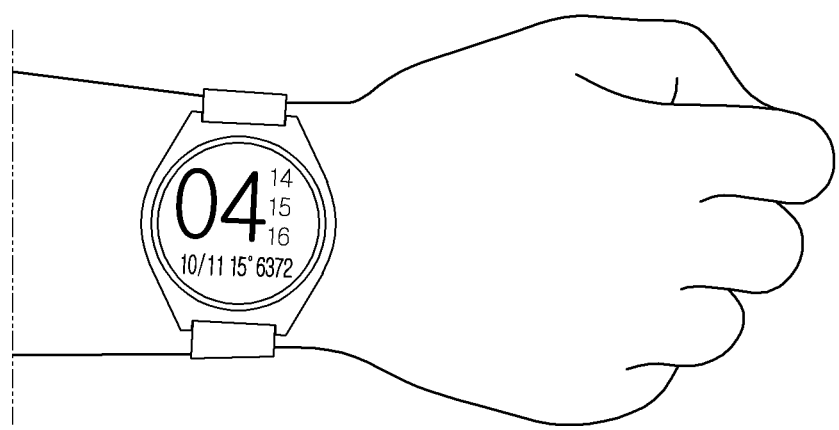
Figure 35A:
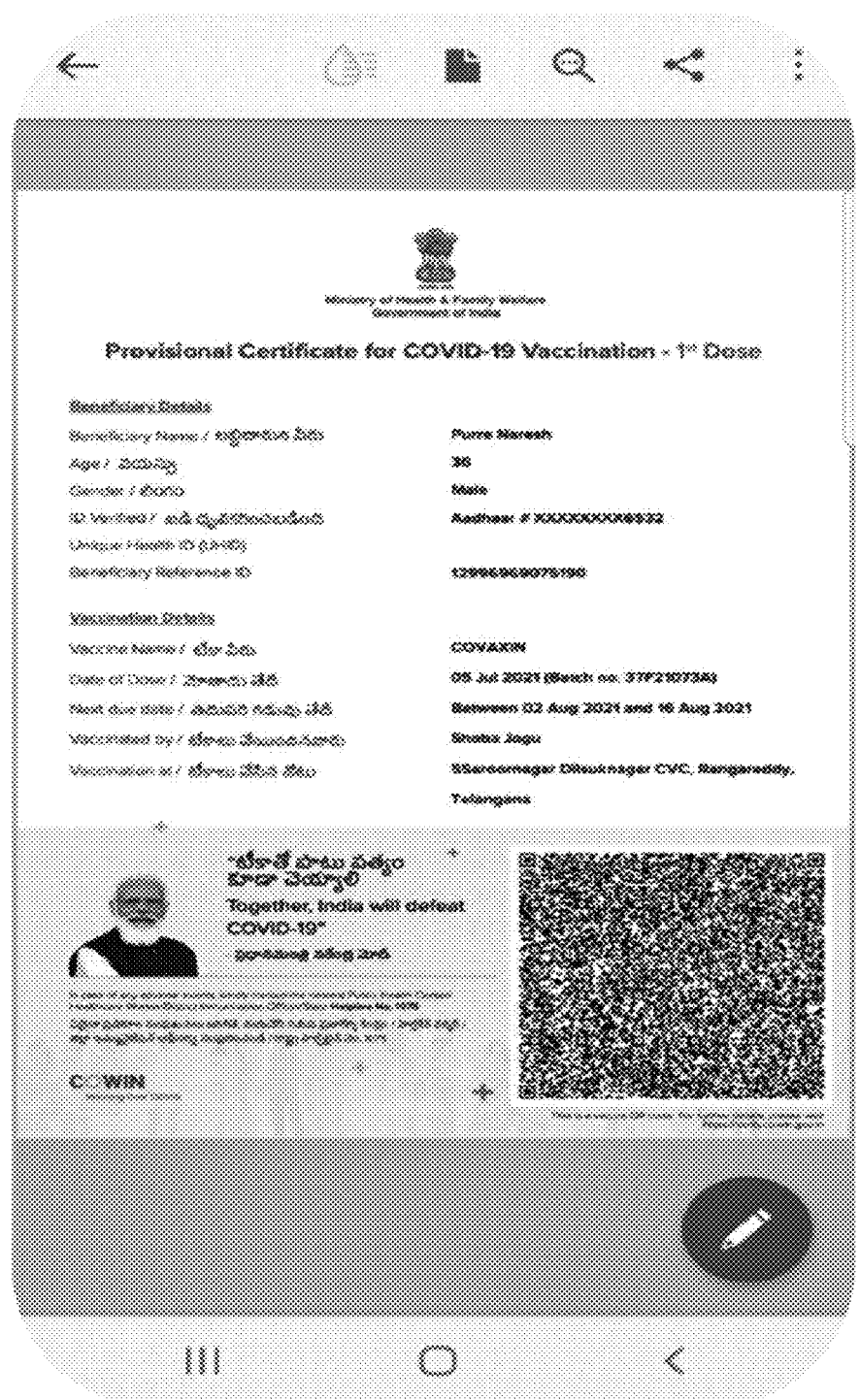
FIGS. 35A, 35B, 36A, 36B, and 36C illustrate an example in which an electronic device provides connected actions by considering data available across applications, according to various embodiments.
Figure 35B:
Figure 36A:
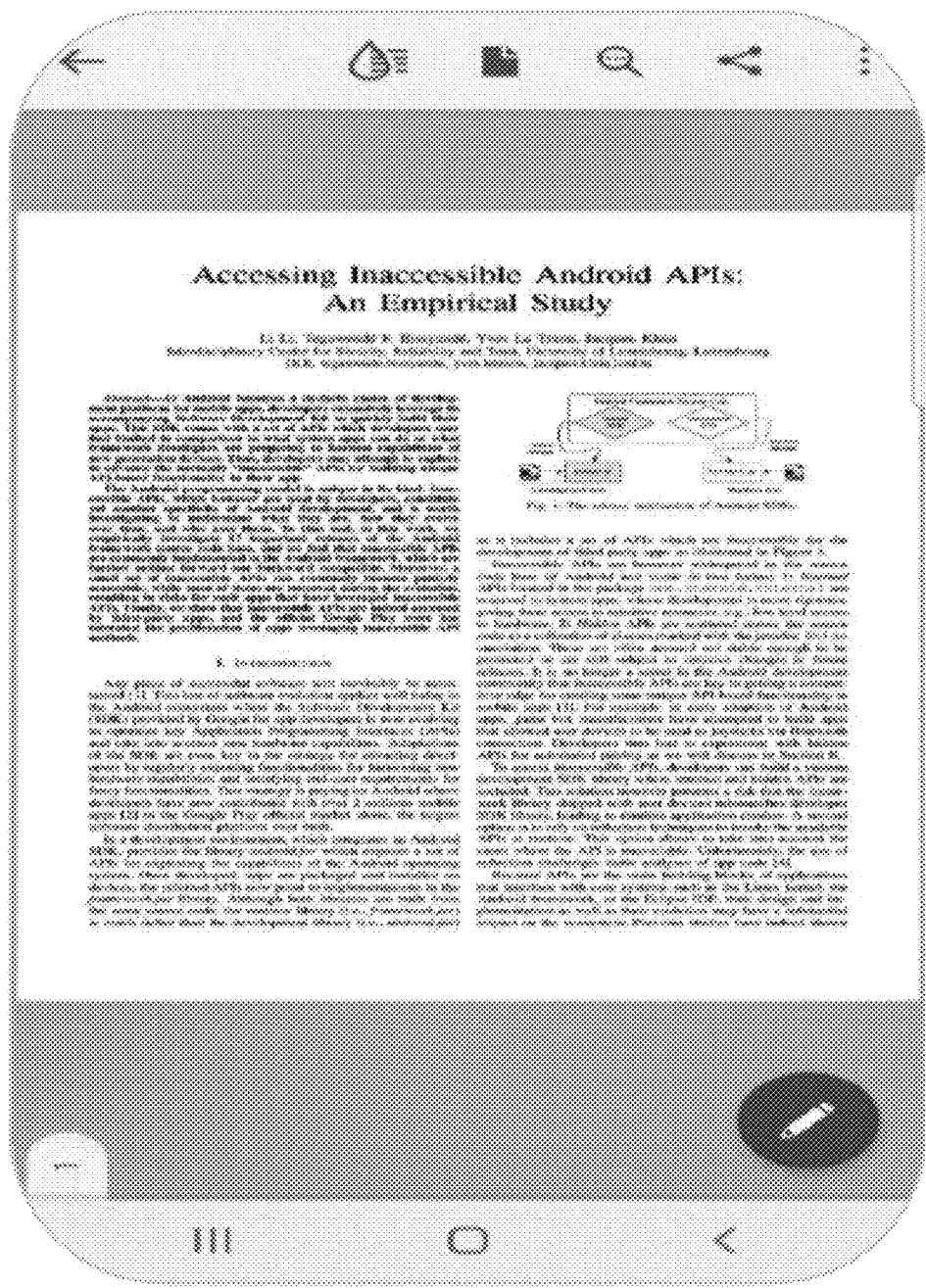
Figure 36B:
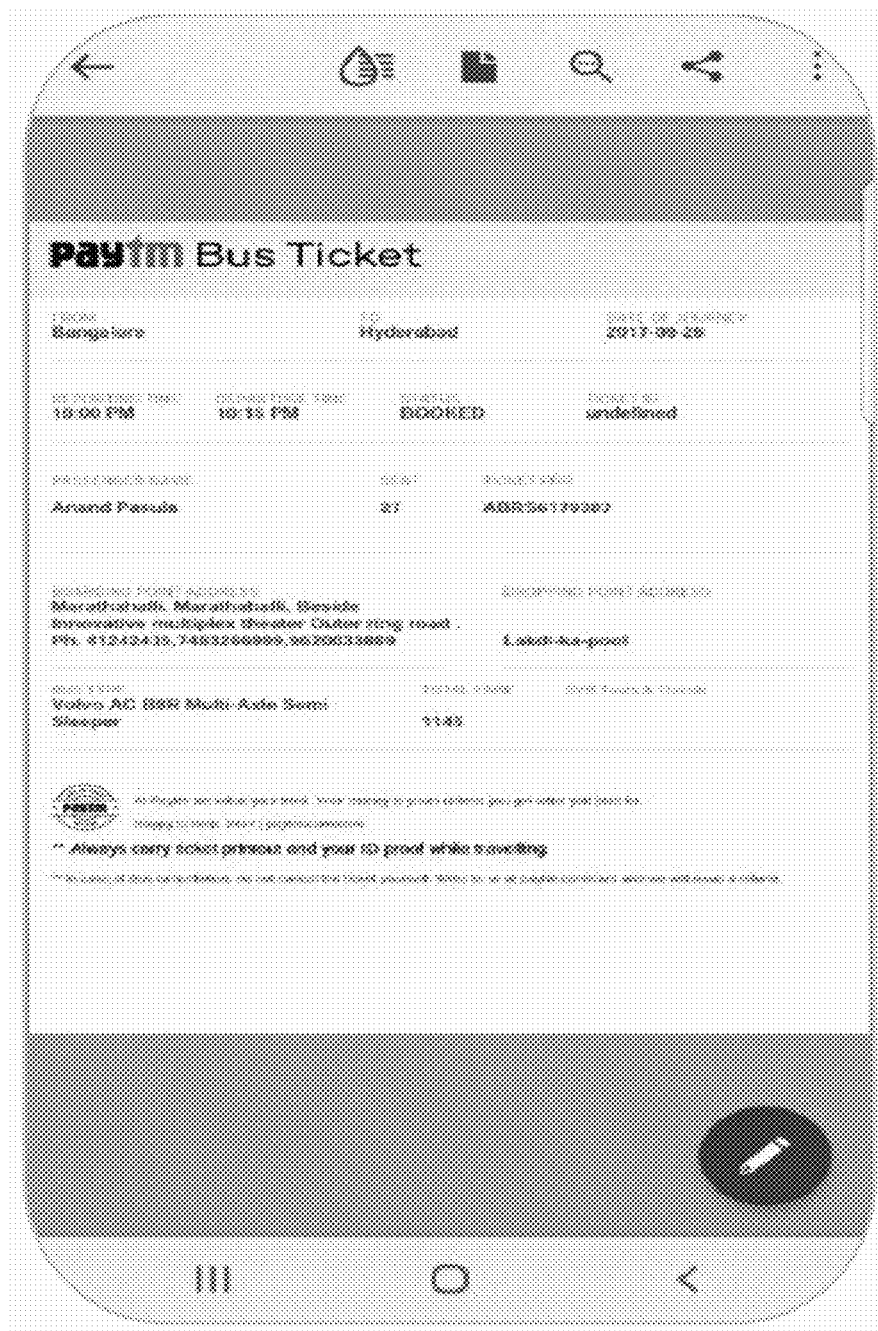
Figure 36C:
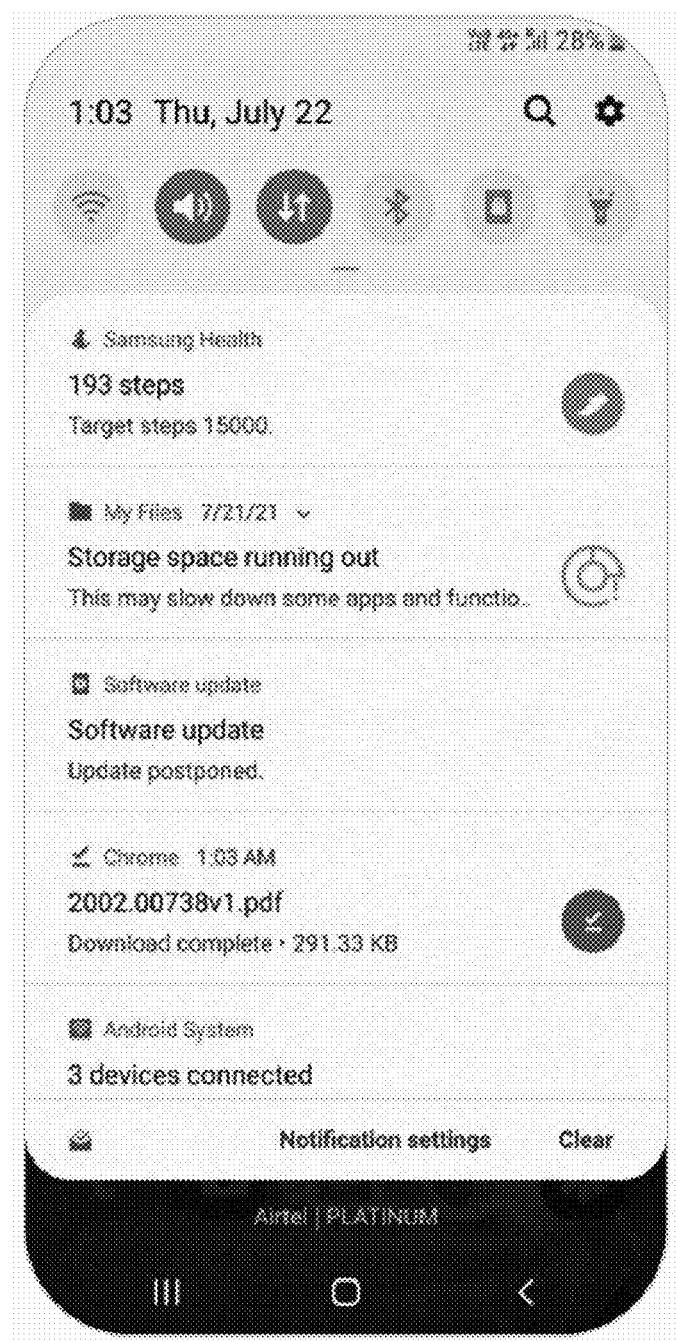

FIG. 30 illustrates an example in which operations of a reasoning engine are depicted, according to various embodiments. The user next actions after clicking on suggested actions are used to improve future action using a reasoning engine. The reasoning engine is trained in two phases (i.e., learning phase and inference phase). In the learning phase, the controller receives the action items and the action items are pre-processed by fusing application action with context. The pre-processed action items are trained using the Support Vector Machine (SVM) techniques and user behavior drift adjustment. A Bayesian model processes the pre-processed action items based on the relationship between the user behavior drift adjustment and the user action.

User Next Actions after clicking on Suggested Actions will be used to improve Future Action. Based on the User Interaction with the given Suggestion, User Behavior will be learned with a parameter like User Action Consumption (Clicked), Swiped Away, Removed along with Current Context which are fed into Bayesian Model to learn Behavior.

When Similar Input Text is received into the device, the reasoning engine will suggest whether providing Action will be useful or not based on previous history and suggestion made accordingly.

FIGS. 31A, 31B, 32A, and 32B illustrate an example in which the electronic device provides the connected actions by considering data available across the applications, according to various embodiments. Using the proposed method, connected actions can be shown on similar applications based on the data from different applications. Consider an example in which the user of the user device (102) orders a food item in a first food delivery application. Over a period of time, various data (e.g., cuisine name, restaurant name, application type or the like) is stored in the first food delivery application. Various data is used for actions suggestion in the applications. Based on the proposed method, the various data from the first food delivery application along with type of the application is considered, so when the user of the user device 102 launches the similar application (e.g., second food delivery application), similar actions (e.g., order cuisine or the like) will be suggested to the user. This improves the user experience.

Based on the proposed method, the action suggestion will be shown based on the location. Consider an example in which the user of the user device 102 orders a food item in the first food delivery application. Over the period of time, various data (e.g., cuisine name, restaurant name, application type or the like) is stored in the first food delivery application. Various data is used for actions suggestion in the applications. Further, in the messaging application, the friends are discussed as "John: When you are in Hyderbad Don't forget to try out Paradise Biryani; Joseph: Bring these items for me from Film City when you are visiting that place". The various data from the first food delivery application along with type of the application and the data from the messaging application are considered, so when the user of the user device 102 launches the similar application (e.g., second food delivery application) in the specified location (i.e., Film City at Hyderbad), similar actions (e.g., Paradise Biryani) will be suggested to the user. This improves the user experience.

FIGS. 33A, 33B, 34A, and 34B illustrate an example in which the electronic device provides the connected actions by propagating actions to a connected device, according to various embodiments. The proposed method provides the connected actions by propagating actions to the connected device. In an example, when the user is in travel and reaches the airport, the action (i.e., showing scanning code) can be propagated to smart watch so that the user can be easily scannable without taking out smart phone. In another example, the user books the movie ticket and reaches the theatre, the action (i.e., showing scanning code) can be propagated to the smart watch so that the user can be easily scannable without taking out the smart phone.

In an example, when the user of the user device 102 gets a delivery message and the user goes to pick the parcel for which PIN shall be shown. Based on the proposed method, the content/action will be routed to the smart watch as the user may carry only watch with him/not the smart phone.

FIGS. 35A, 35B, 36A, 36B, and 36C illustrate an example in which the electronic device provides the connected actions by considering data available across applications, according to various embodiments. In an example, Cowin site is opened for the 2nd dose booking and PDF content was downloaded after 1st Dose, so that the PDF content will be parsed & associated action will be shown based on the proposed method. Hence, when the user of the user device 102 goes to the same website, the content related will be saved and associated Actions like "Book for 2nd will be shown to the user.

Based on the behavioural understanding of the user, the actions will be shown to the user by consolidating the data in the user device 102. Consider an example, the user downloads a particular type of a file and after downloading, the user suggests to open file/share file using various applications over the period of time. Hence, after incoming file content is downloaded and analyzed, respective actions (e.g., read file or share file) are suggested to the user.

Figure 37A:
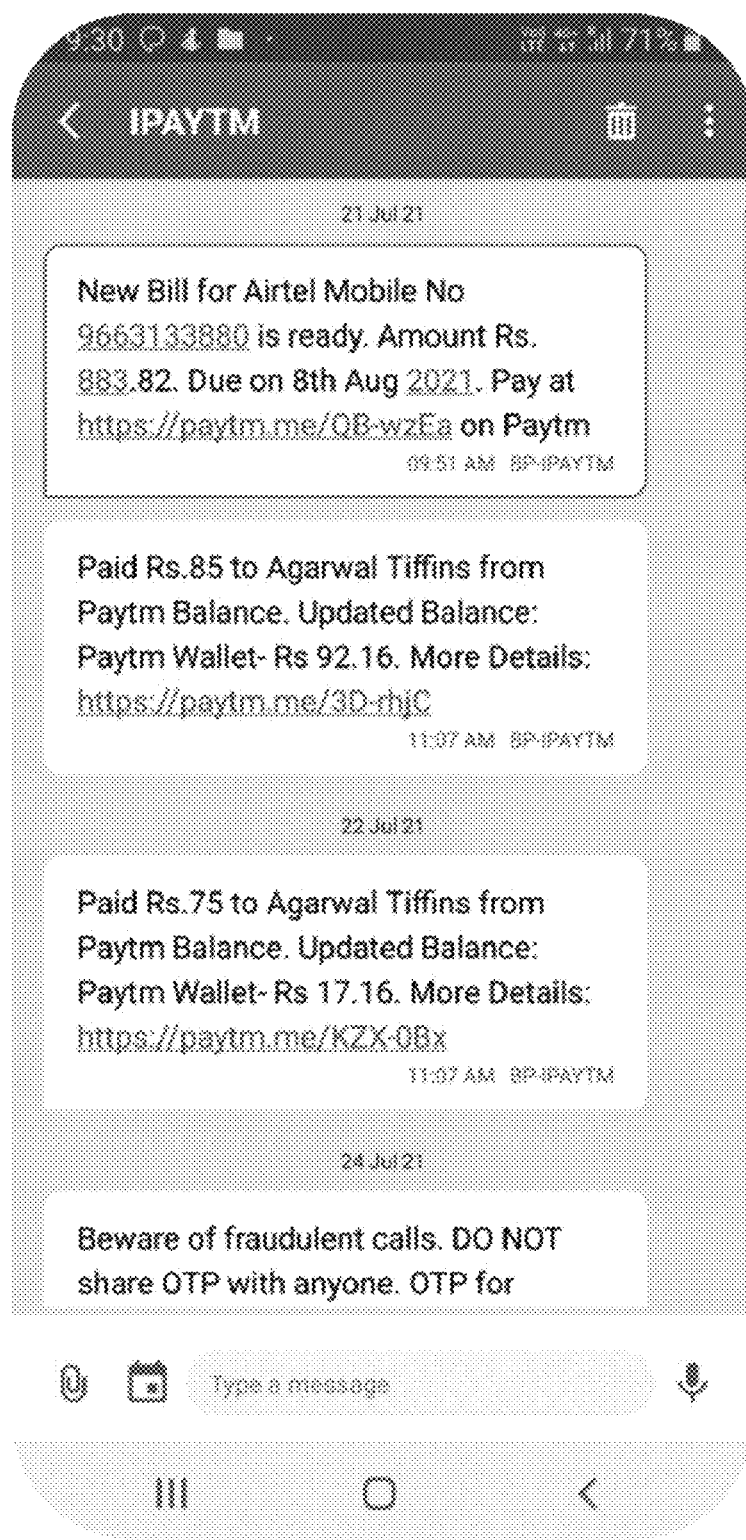
FIGS. 37A and FIG. 37B illustrate an example in which an electronic device provides connected actions through content parsing, according to various embodiments as disclosed herein.
Figure 37B:
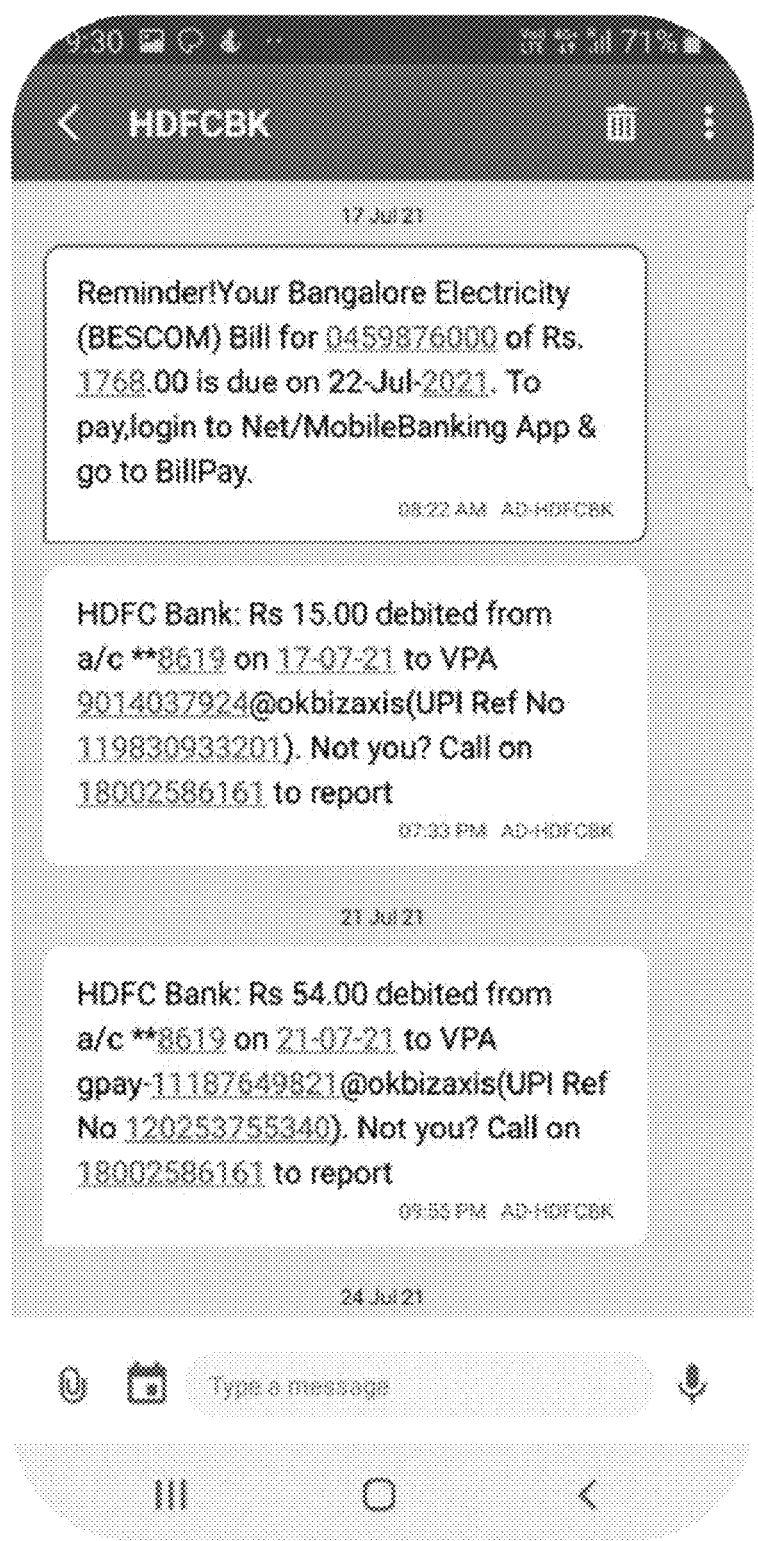

FIGS. 37A and 37B illustrate an example in which the electronic device provides connected actions through content parsing, according to various embodiments. The proposed method provides the connected actions through content parsing. In an example, a message is received from PayTM® and the content is parsed for bill information and pay through the AirtelMoney® is suggested as it is regular mode of payment for the user. In an example, though, the message is received from HDFC bank®. The content is parsed for bill information and pay through PayTM® is suggested as it is regular mode of payment for the user.

Figure 38:
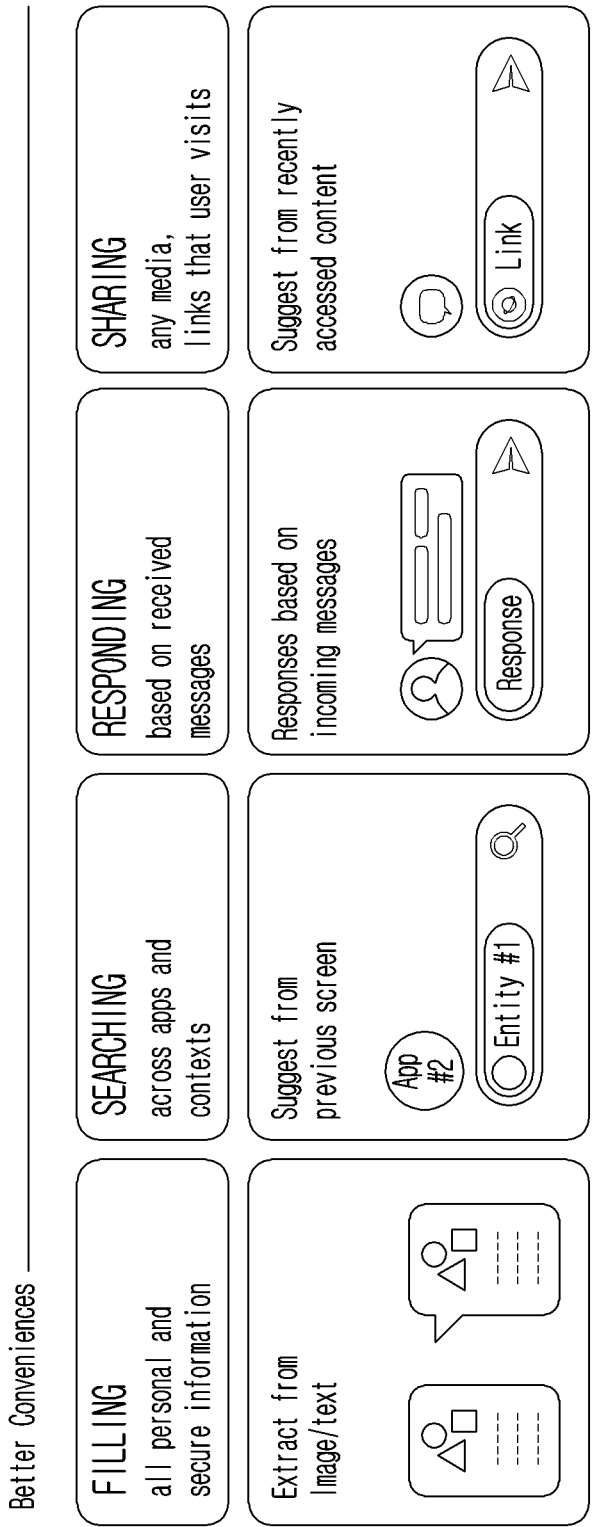
FIG. 38 illustrate an example in which an electronic device provides an input suggestion based on a deep screen capture, according to various embodiments.

FIG. 38 illustrates an example in which the user device 102 provides an input suggestion based on deep screen capture, according to various embodiments.

As illustrated, FIG. 38 depicts deep screen capture to provide recommendations to the user. This can provide input suggestion by extracting relationships and interest on the screens, by providing input suggestions based on interest and relationship extraction. This can also provide relationship and interest extraction on the screen by resolving co-references within screen and extracting relationship (Screen based Co-reference Resolution, after structured interpretation). Extracting interest region on the screen, upon structured interpretation of screen content. Extracting content on the screen based on screen's identified interest region.

Therefore, deep screen capturing can be provided for an on-device AI method for providing connected actions by consolidation of the content that user receives in the device framework data like (Notification, Screen Data, Clipboard, Text Selected), Core App Data (Messages, Notes, Media, Contact etc.), App Activity (App Actions/Usage), Device Data, Near By Device and User Context through Data Mashup.

Dynamism in providing connected action through user behavioral pattern/reasoning, next set of things user does after consuming/acting upon suggestions. Similar application data/usage has been considered while constructing the suggestion (User Behavioural Reasoning & Similar Application Data). Intelligent mechanism which can identify the duplicate data received from multiple sources like Message, Images, Files, Notification and Construct Single entry for Connected Actions (Multi Modal Data Similarity to Single Connected Actions).

Hence, methods and systems to provide input suggestions using deep screen capture in which one screen understanding framework includes: screen understanding, field classification on the screen, screen intelligence (interest & Relationship); input suggestions such as fill suggest, search suggest, response suggest, share suggest, emoji suggest.

In an embodiment, the system and method provides structured interpretation of the screen content using segmented screen tree. Screen understanding: in-depth understanding of the screen content for various screen types (Conversation Screen Understanding, Media Screen Understanding, etc.).

In an embodiment, the system and method is for field classification with screen-based TF-IDF. Field classification by understanding screen content—TF-IDF based extraction by mapping the views using N-Array Depth First traversal, Field Classification as system component to enable system wide user cases.

System and Method for relationship extraction among the content on the screen, and providing input suggestions. Resolving co-references within screen and extracting relationship (Screen based Co-reference Resolution, after structured interpretation)

System and Method for interest extraction on the screen, and providing input suggestions. Extracting interest region on the screen, upon structured interpretation of screen content and Extracting content on the screen based on screen's identified interest region.

Figure 39:
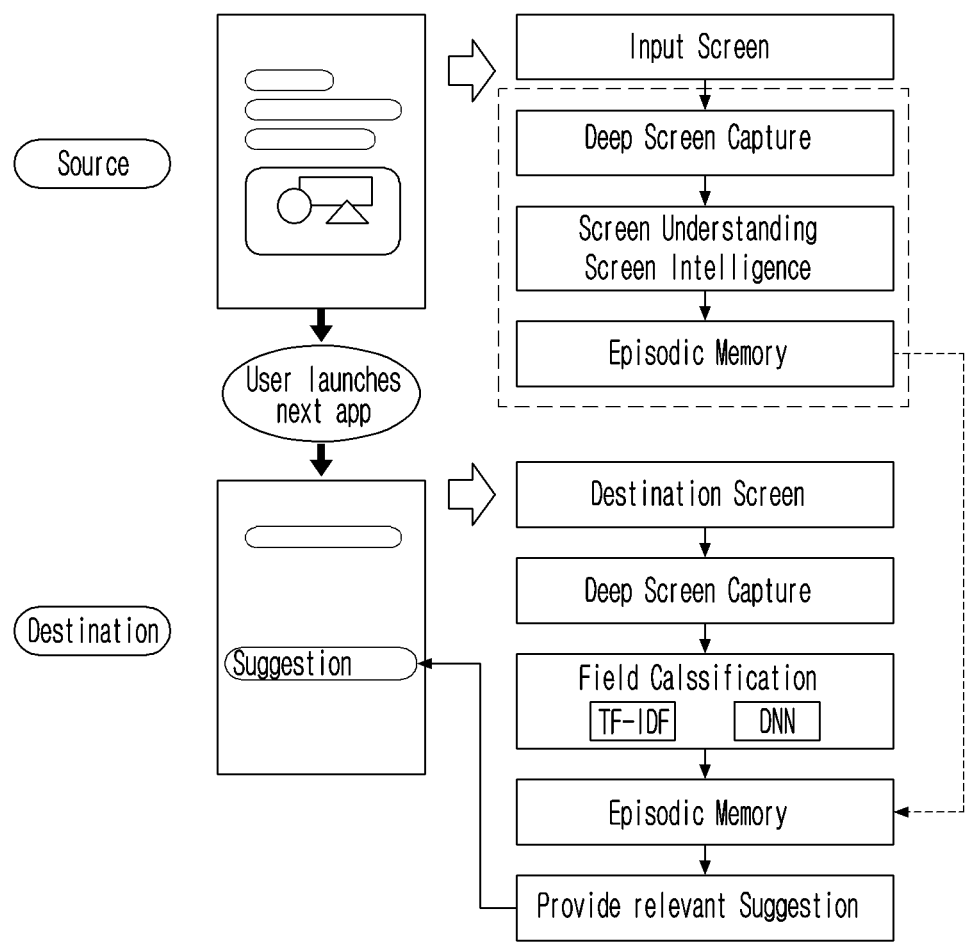
FIG. 39 illustrate an example in which an electronic device provides a fill suggest option in between the applications, according to various embodiments.

FIG. 39 illustrates an example in which the user device 102 provides a fill suggest option in between the applications, according to various embodiments. As shown in the FIG. 39, the user device 102 provides the fill suggest option in between the source application to the destination application by understanding the screen using the deep screen capture. In an example, the user receives the message with the payee bank details (e.g., Contact Info.: Address, Email, Name; Bank Info.: Bank Name, Recipient, Account No; and Login Info.: Username and password) in a first message application. Based on the deep screen capture, the details from the message application (e.g., Contact Info.: Address, Email, Name; Bank Info.: Bank Name, Recipient, Account No; and Login Info.: Username and password) are suggested intelligently to the second application (e.g., payment application or the like) based on the field the user clicks on the second application. This results in improving the user experience.

Figure 40:
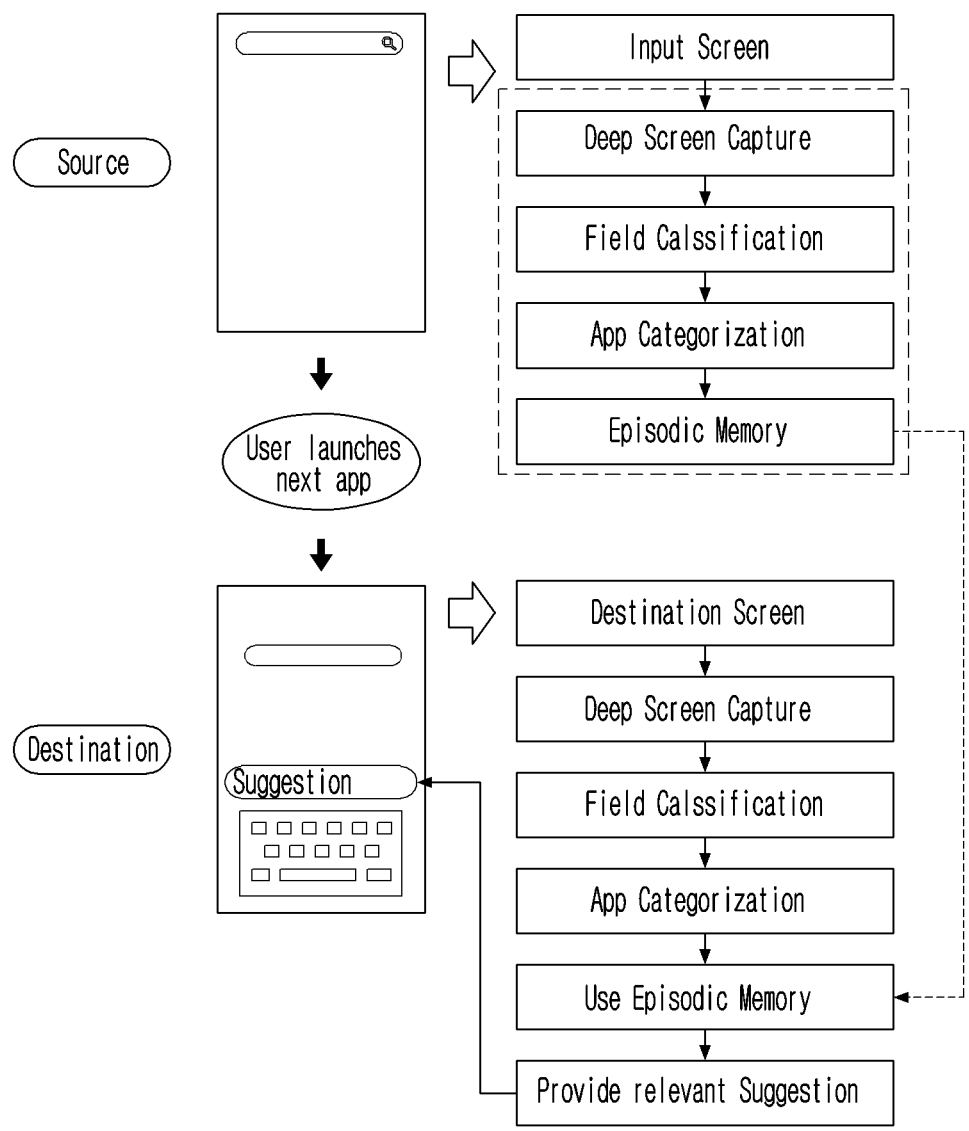
FIG. 40 and FIG. 41 illustrate an example in which an electronic device provides a search suggest option in between the applications, according to various embodiments.
Figure 41:
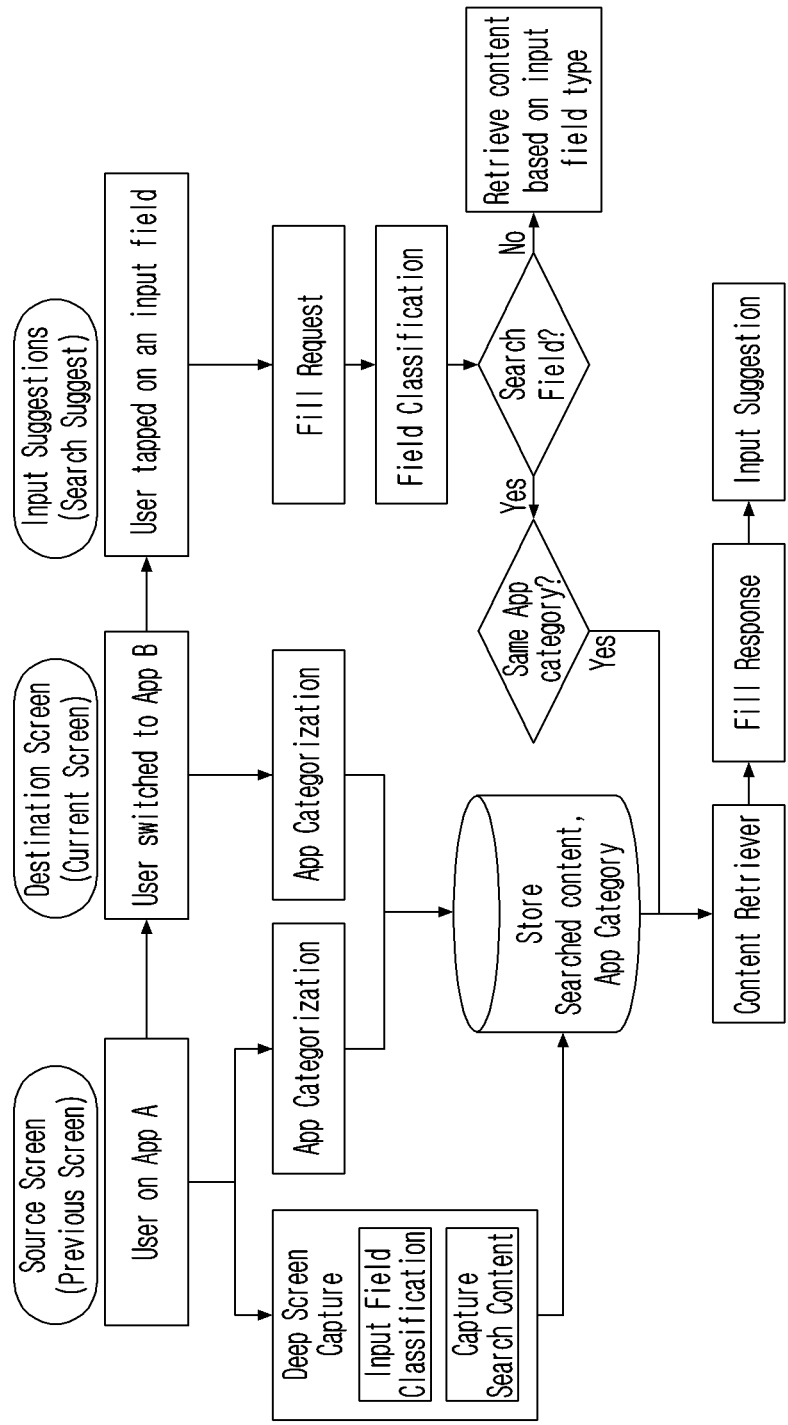

FIG. 40 and FIG. 41 illustrate an example in which the user device 102 provides a search suggest option in between the applications, according to various embodiments. As shown in the FIGS. 40 and 41, the user device 102 provides the search suggest option in between the source application to the destination application by understanding the screen using the deep screen capture. In an example, the user of the user device 102 can't find a show on a first movie streaming application. Based on the proposed method, using the keyword, the method searches the movies in the different movie streaming applications running in the user device 102.

Similarly, the user of the user device 102 checks multiple applications for price for buying products. Similarly, the user of the user device 102 checks better options to eat on different food applications. This results in improving the user experience for showing better results.

As shown in the FIG. 41, the user of the user device 102 searches the keyword on the on first application (i.e., App A) and switches to the second application (i.e., App B) to search for same keyword. Based on the proposed method, the user device 102 stores the searched content and app category in the memory. In the next time, the user tapped on an input field on a third application and the third application determines that the searched content and app category are same, then the third application provides the input suggestion to the user.

Figure 42:
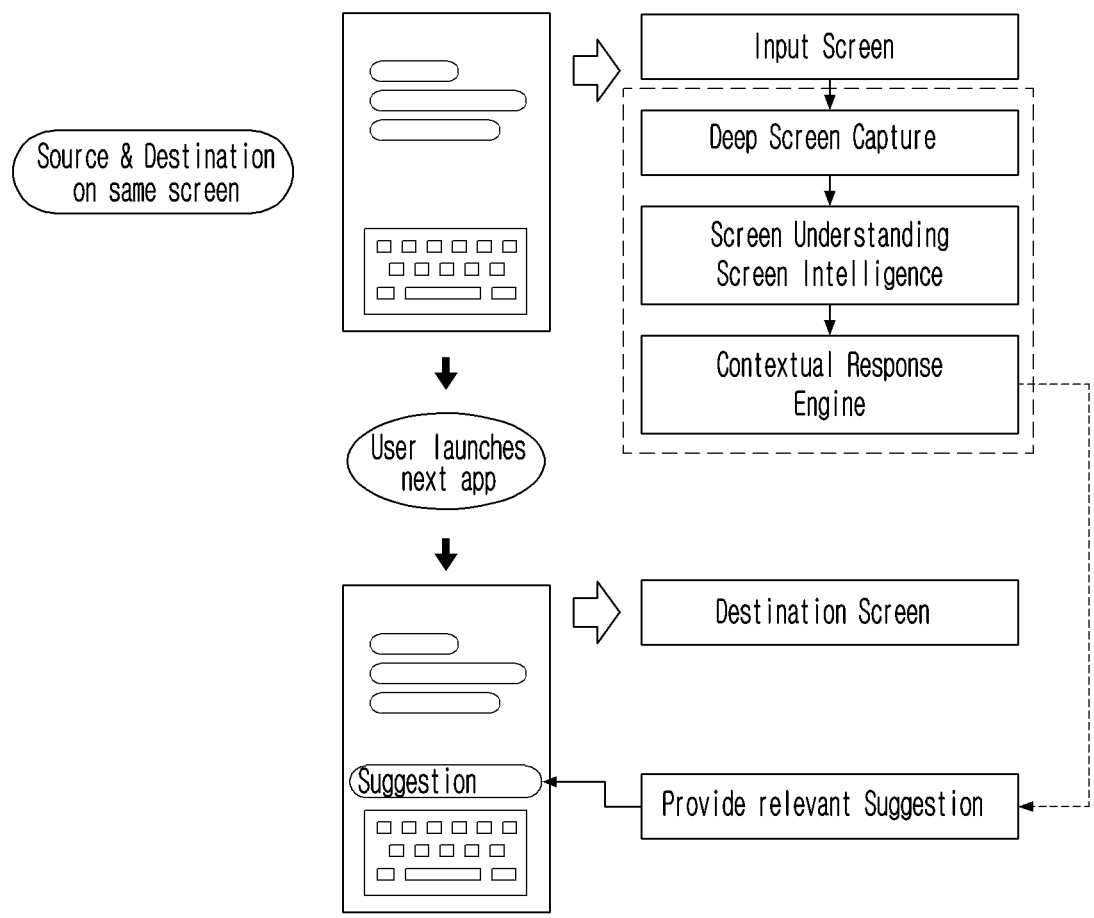
FIG. 42 and FIG. 43 illustrate an example in which an electronic device provides a response suggest option in between the applications, according to various embodiments.
Figure 43:
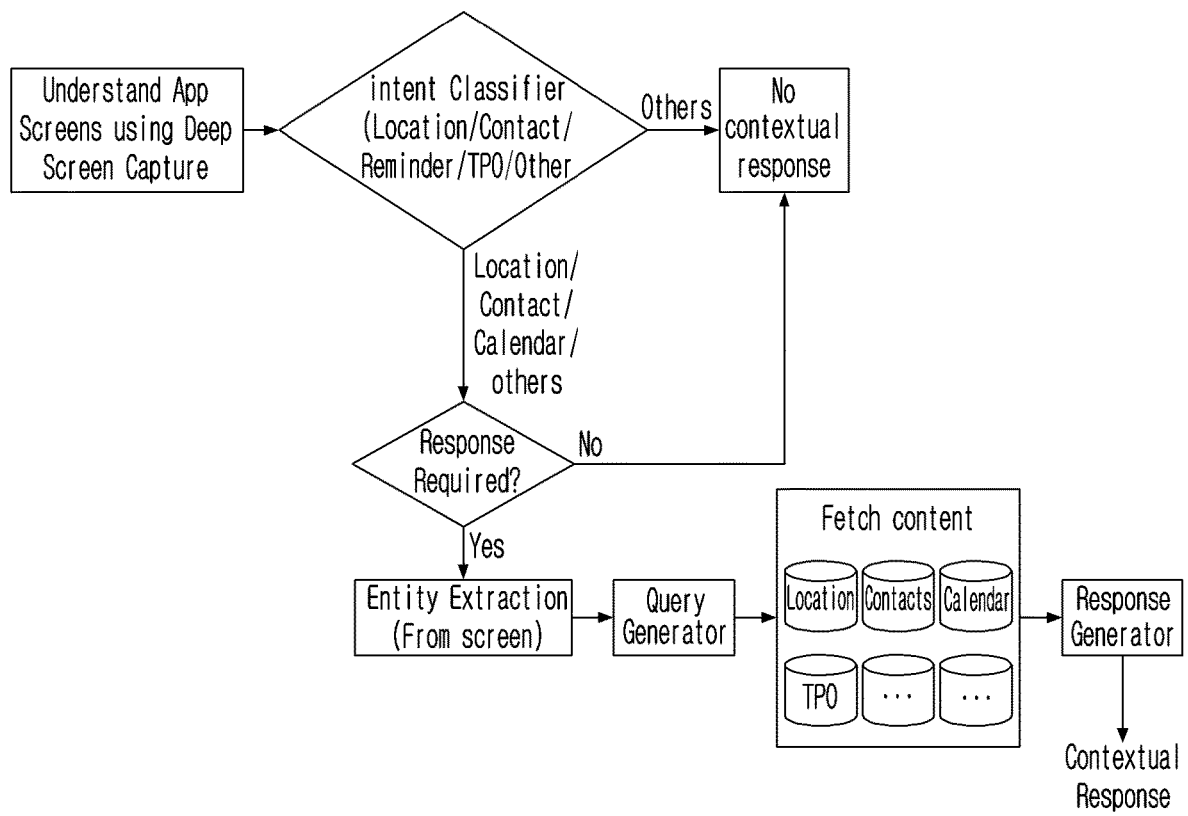

FIG. 42 and FIG. 43 illustrate an example in which the user device 102 provides a response suggest option in between the applications, according to various embodiments. As shown in FIGS. 42 and 43, the user device 102 provides the response suggest option in between the source application to the destination application by understanding the screen using the deep screen capture. The proposed method provides the reply on-the-go with relevant as well as personalized suggestions. In an embodiment, the smart reply in a keyboard requiring understanding of complete screen. As shown in the FIG. 43, the proposed method receives the message and classifies the intent in the message. Further, the method detects the response and extracts the entity in the message. Further, the method retrieves the content and generates the response.

Figure 44:
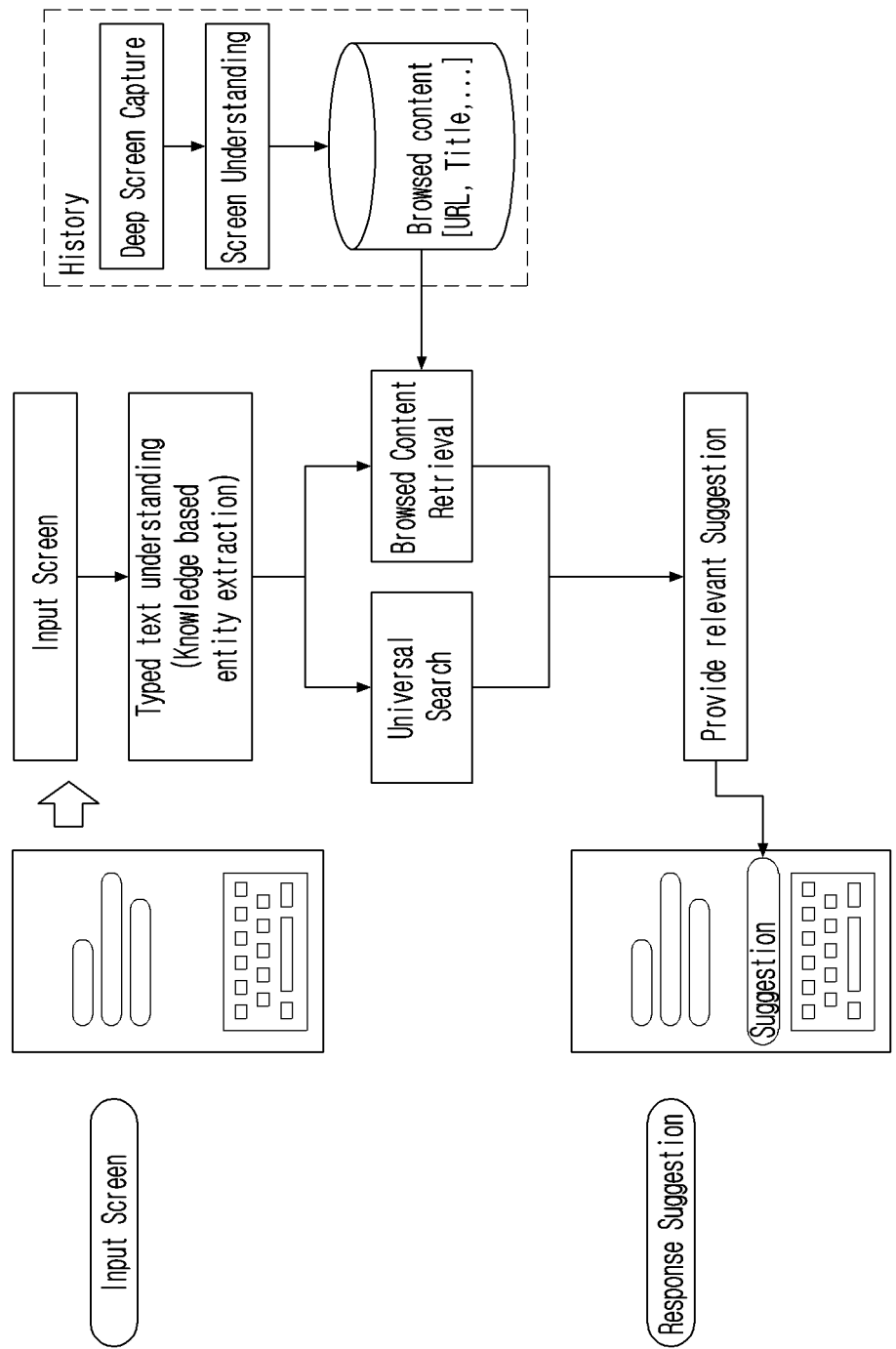
FIG. 44 illustrate example in which an electronic device provides a share suggest option in between the applications, according to various embodiments.

FIG. 44 illustrates an example in which the user device 102 provides the share suggest option in between the applications, according to various embodiments. As shown in FIG. 44, the user device 102 provides the share suggest option in between the source application to the destination application by understanding the screen using the deep screen capture. In an embodiment, the required information or content is shared without switching between the applications. In an example, the user of the user device 102 browses some gifts for a friend in a chat application and switches from the chat application to a browser application to search for gifts. The suggesting recently viewed links from the browser in conversations and switches back to chat applications. All the gifts browsed are suggested on the chat applications.

Figure 45:
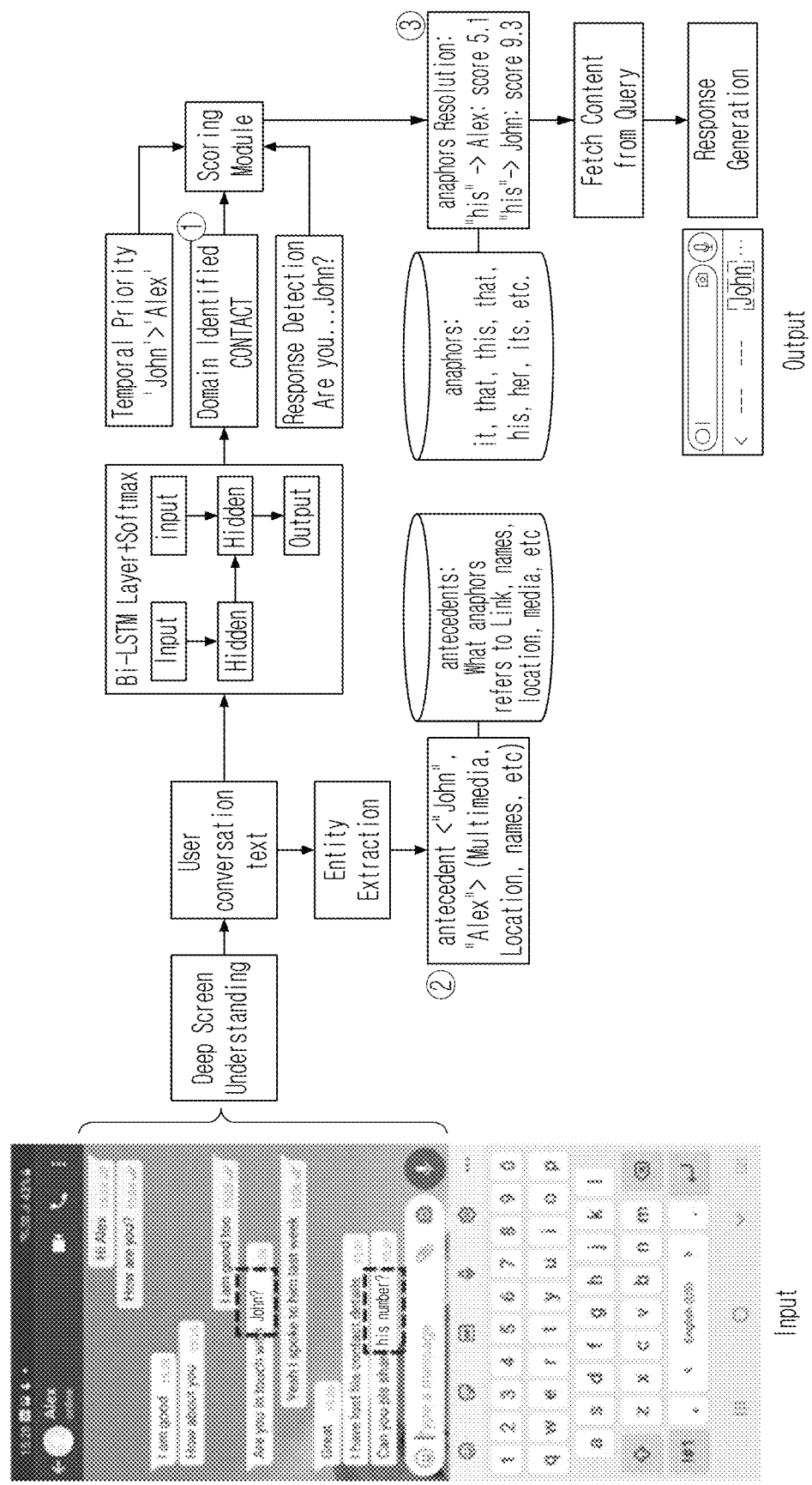
FIG. 45 illustrate an example in which an electronic device performs relationship extraction operations, according to various embodiments.

FIG. 45 illustrates an example in which the user device 102 performs the relationship extraction operations, according to various embodiments. The user device 102 collects the user input and represents it in terms of a vector of floating point feature vectors and passes above vector of vectors both in forward and backward direction through a Bi-LSTM to understand the domain/intent of the conversational text. Further, the user device 102 processes the input to generate antecedents list and feeds the domain output from to a scoring module which returns most probable antecedent from an antecedent list populated before. Further, the user device 102 generates the query and fetches the required information from the content database (DB) show desired suggestion using the response generation module.

Figure 46:
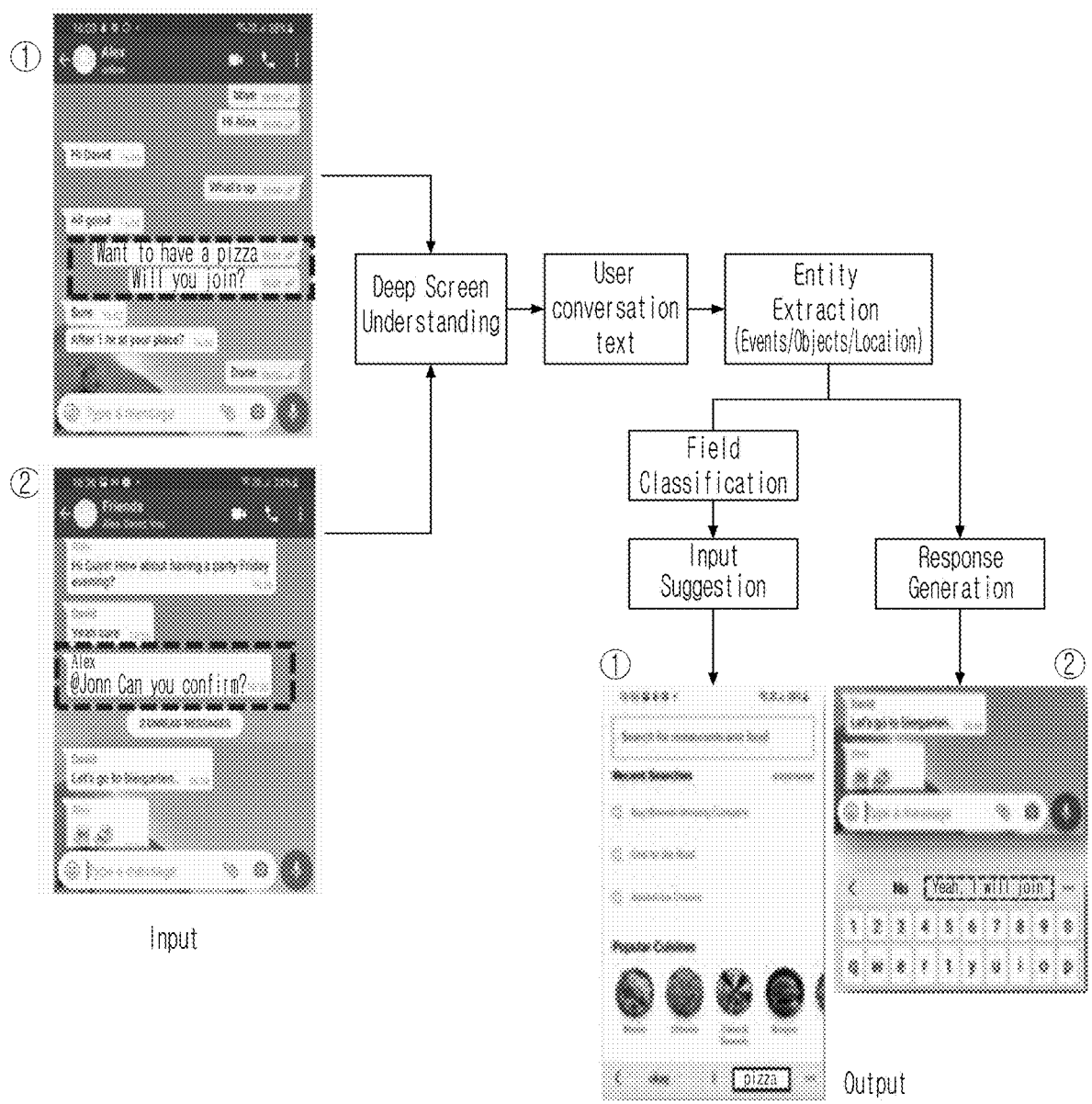
FIG. 46 illustrate an example in which an electronic device performs an interest extraction operation, according to various embodiments.

FIG. 46 illustrates an example in which the user device 102 performs the interest extraction operation, according to various embodiments. The user device 102 revises the user conversation text and performs the entity extraction and field classification in the user conversation text. Based on the entity extraction and field classification, the user device 102 understands the priority and provides the response based on the priority. In an example, the user device 102 understands interest on the screen and provides prediction in next screen/application. In another example, the user device 102 understands which message user needs to respond and understands priority of messages. Further, the user device 102 provides the response based on prioritized message.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

What is claimed is:

1. A method for providing at least one recommendation, the method comprising:
    collecting, by a user device, at least one content from a plurality of sources on the user device;
    feeding, by the user device, the collected at least one content to a data mashup model;
    identifying, by the user device, a plurality of data types of the collected at least one content using the data mashup model;
    determining, by the user device, one or more relationships among the data types using the data mashup model;
    predicting, by the user device, one or more possible recommendations to be performed by a user as an outcome of the determined relationships using the data mashup model;
    detecting, by the user device, at least one input field requiring at least one user input in the plurality of sources displayed on the user device, wherein the at least one input field is classified based on a screen-field matrix storing weights of input fields across different screens;
    fetching, by the user device, at least one candidate content, wherein the at least one candidate content is based on the at least one detected input field; and
    recommending, by the user device, the at least one fetched candidate content to the user of the user device.

2. The method as claimed in claim 1, further comprising:
    analyzing, by the user device, at least one content captured from the plurality of sources displayed on a screen of the user device;
    generating, by the user device, at least one logical tree structure based on the at least one analyzed content; and
    fetching, by the user device, at least one candidate content from the logical tree structure.

3. The method as claimed in claim 2,
    wherein the recommended at least one fetched candidate content is generated by analyzing at least one content captured from the plurality of sources displayed on the user device,
    wherein the recommended at least one fetched candidate content is recommended based on information regarding at least one action performed by the user of the user device,
    wherein the at least one logical tree structure is generated by determining one or more relationships among the data types using the data mashup model, and
    wherein the at least one input field requiring at least one user input in the plurality of sources displayed on the user device is detected based on the outcome of the determined relationships using the data mashup model.

4. The method as claimed in claim 2, wherein generating the at least one logical tree structure based on the at least one analyzed content comprises receiving at least one screen of the user device, retrieving at least one content capture event, dynamically creating a segmented screen tree, identifying and associating an identifier based on screen type or categories, dynamically traversing the segmented screen tree using the associated identifier, and providing a structured interpretation of the screen content.

5. The method as claimed in claim 2, wherein the at least one input field is classified by identifying information from at least one input type of at least one screen of the user device-, retrieving tags, and preparing at least one term and at least one field list.

6. The method as claimed in claim 2, wherein the at least one candidate content is recommended based on extracting a relationship and at least one interest on at least one screen of the user device.

7. The method as claimed in claim 3, wherein the recommended at least one fetched candidate content is recommended based on previously-generated information regarding at least one action of the user and analyzing of at least one content captured on the user device.

8. The method as claimed in claim 6, wherein extracting the relationship and at least one interest on at least one screen is based on resolving co-references within at least one screen, extracting an interest region of at least one screen associated with a structured interpretation of at least one screen of the user device.

9. The method as claimed in claim 6, wherein extracting the relationship on at least one screen of the user device is based on identifying at least one interest region of at least one screen of the user device.

10. A user device for providing at least one recommendation, the user device comprising:
    a memory;
    a controller;
    a hardware processor configured to:
        collect at least one content from a plurality of sources on the user device;
        feed the collected at least one content to a data mashup model;
        identify a plurality of data types of the collected at least one content using the data mashup model;
        determine one or more relationships among the data types using the data mashup model;
        predict one or more possible recommendations to be performed by a user as an outcome of the determined relationships using the data mashup model;
        detect at least one input field requiring at least one user input in the plurality of sources displayed on the user device, wherein the at least one input field is classified based on a screen-field matrix storing weights of input fields across different screens;
        fetch at least one candidate content,
    wherein the at least one candidate content is based on the at least one detected input field; and
        recommend the at least one fetched candidate content to the user of the user device.

11. The user device as claimed in claim 10, wherein the hardware processor is configured to:
    analyze at least one content captured from the plurality of sources displayed on a screen of the user device;
    generate at least one logical tree structure based on the at least one analyzed content; and
    fetch the at least one candidate content from the logical tree structure.

12. The user device as claimed in claim 11,
    wherein the recommended at least one fetched candidate content is generated by analyzing at least one content captured from the plurality of sources displayed on the user device,
    wherein the recommended at least one fetched candidate content is recommended based on information regarding at least one action performed by the user of the user device, wherein the at least one logical tree structure is generated by determining one or more relationships among the data types using the data mashup model, and wherein the at least one input field requiring at least one user input in the plurality of sources displayed on the user device is detected based on an outcome of the determined relationships using the data mashup model.

13. The user device as claimed in claim 12, wherein the recommended at least one fetched candidate content is recommended based on previously-generated information regarding at least one action of the user and analyzing of at least one content captured on the user device.

\* \* \* \* \*